United States Patent [19]

Foster et al.

[11] 4,413,322
[45] Nov. 1, 1983

[54] AUTOMATIC WAYPOINT AREA NAVIGATION SYSTEM

[75] Inventors: George B. Foster, Worthington; Paul D. Gibbs, Blacklick; Michael A. Smyser, Galena, all of Ohio

[73] Assignee: Foster Airdata Systems Inc., Columbus, Ohio

[21] Appl. No.: 217,417

[22] Filed: Dec. 17, 1980

[51] Int. Cl.³ .............................................. G06F 15/50
[52] U.S. Cl. .................................... 364/448; 364/444; 364/451
[58] Field of Search ............... 364/444, 446, 448, 451; 343/112 R, 112 C, 112 D

[56] References Cited

U.S. PATENT DOCUMENTS

| | | | |
|---|---|---|---|
| 3,414,901 | 12/1968 | Perkins et al. | 343/107 |
| 3,460,146 | 8/1969 | White et al. | 343/112 |
| 3,644,928 | 2/1972 | Wright | 343/106 R |
| 3,652,837 | 3/1972 | Perkins | 364/449 |
| 3,659,291 | 4/1972 | Anthony | 343/6 R |
| 3,691,361 | 9/1972 | Perkins | 364/449 |
| 3,787,860 | 1/1974 | Greatline et al. | 343/106 R |
| 3,851,159 | 11/1974 | Games et al. | 364/449 |
| 4,220,994 | 9/1980 | Hendrickson | 364/450 |

Primary Examiner—Jerry Smith
Attorney, Agent, or Firm—Cushman, Darby & Cushman

[57] ABSTRACT

An area navigation device automatically establishes waypoints along an RNAV course line intersecting with the four cardinal radials of VORTAC stations. For a given VORTAC station, the pilot selects any of the four cardinal radials and is automatically provided with the distance from the VORTAC station, along that cardinal radial, as the intersection with his selected RNAV course line. Thus, a pilot can quickly sequence through the cardinal radials and quickly ascertain the availability of waypoints along that radial. After an automatically generated cardinal waypoint is selected, it is automatically entered into memory dedicated to that waypoint for later recall and conventional use in area navigation.

42 Claims, 18 Drawing Figures

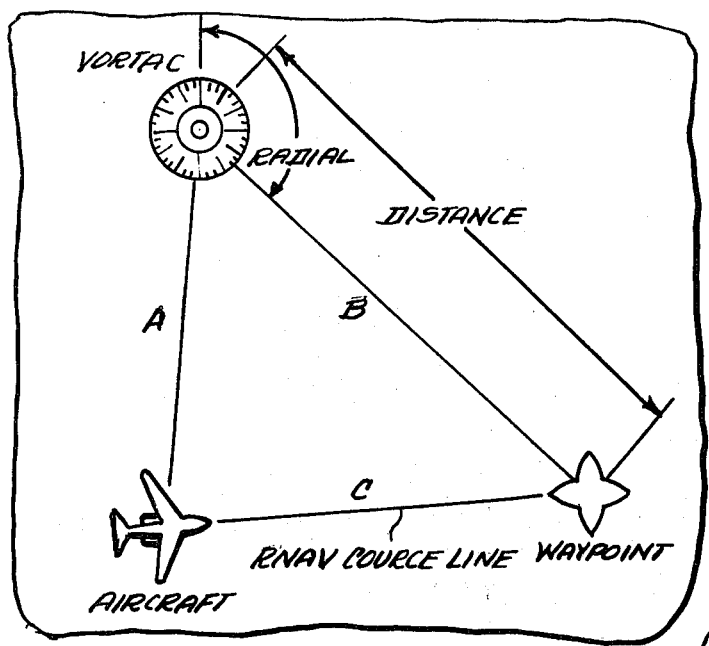
FIG. 3
FIG. 4
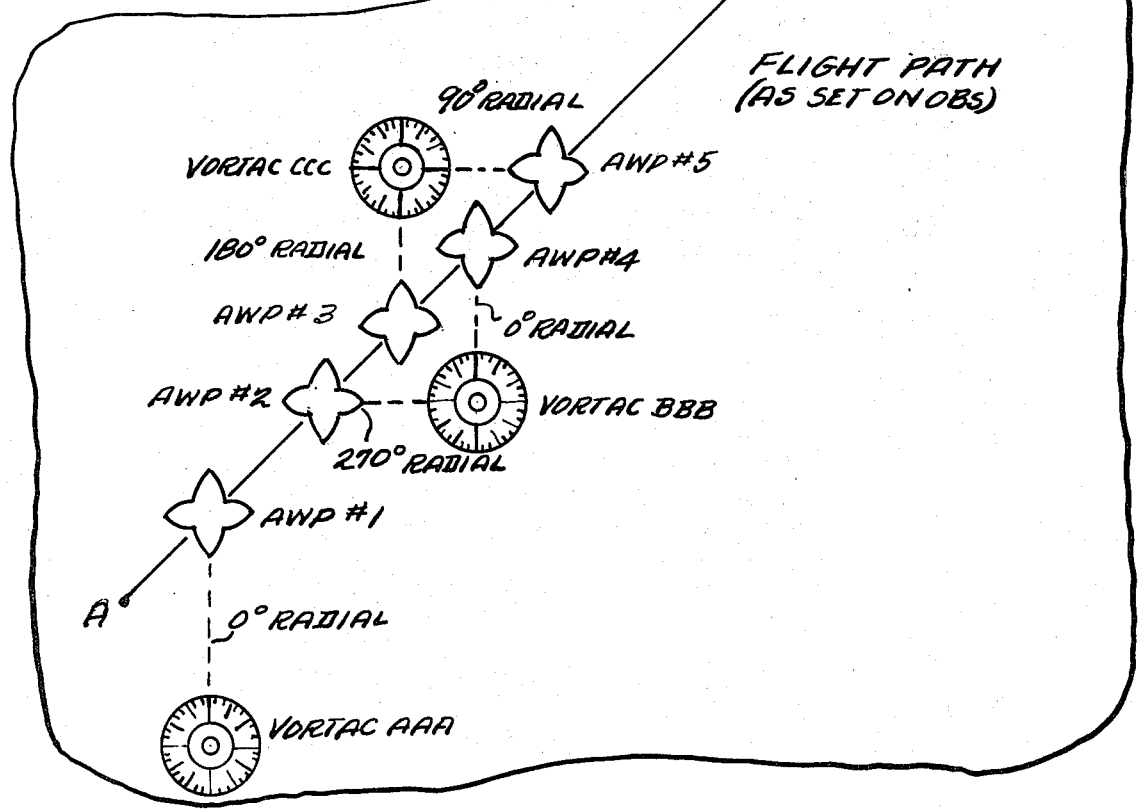

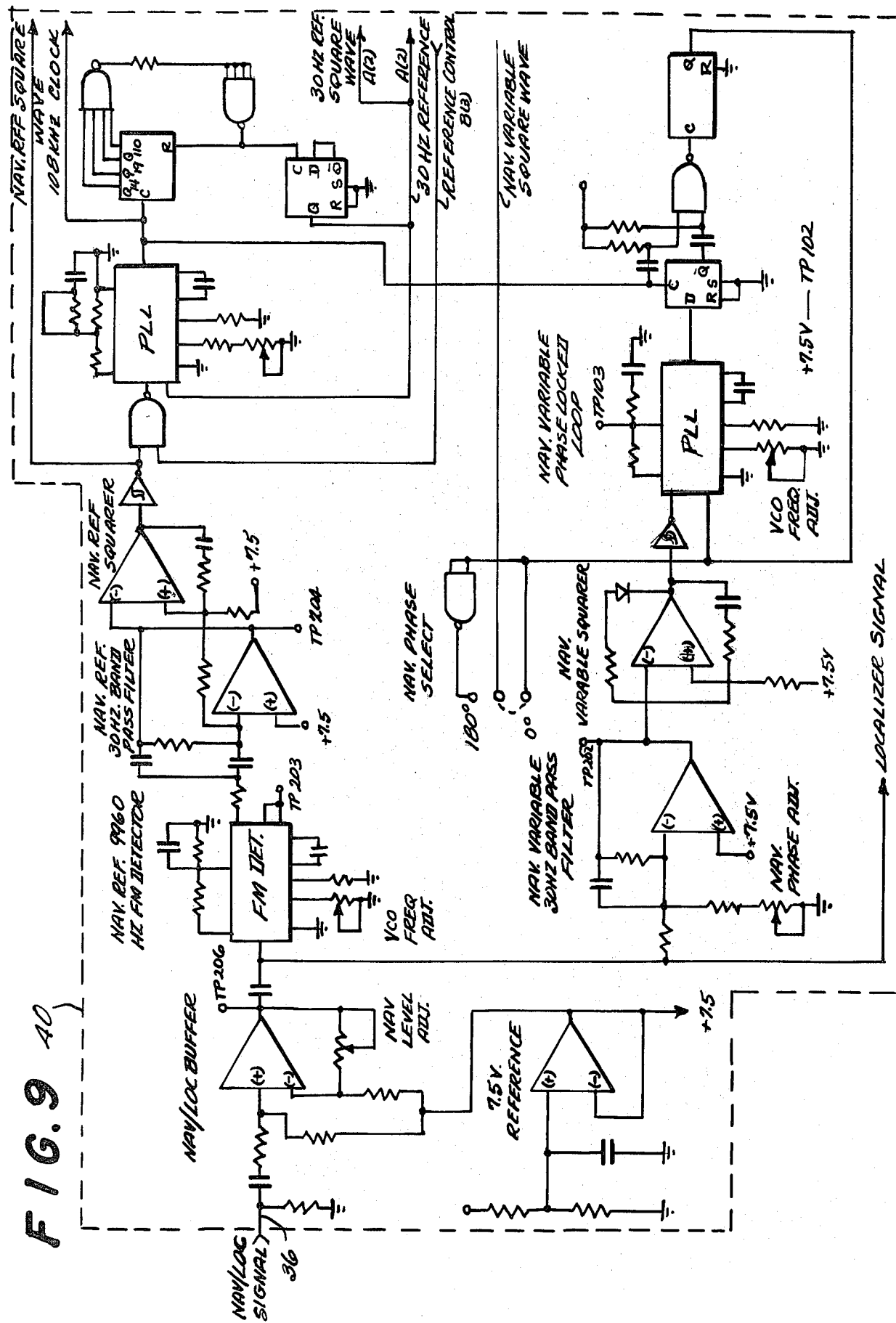

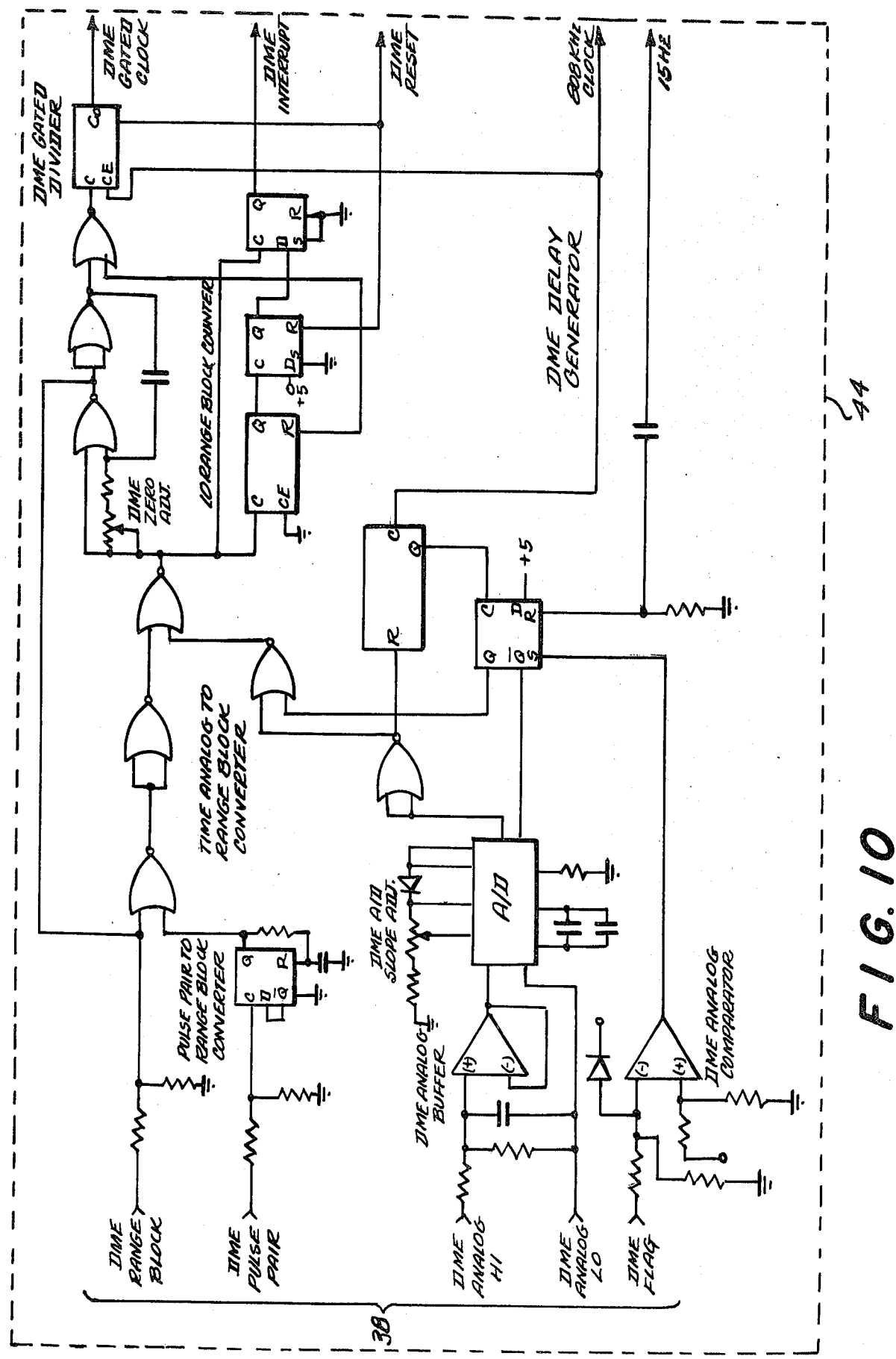

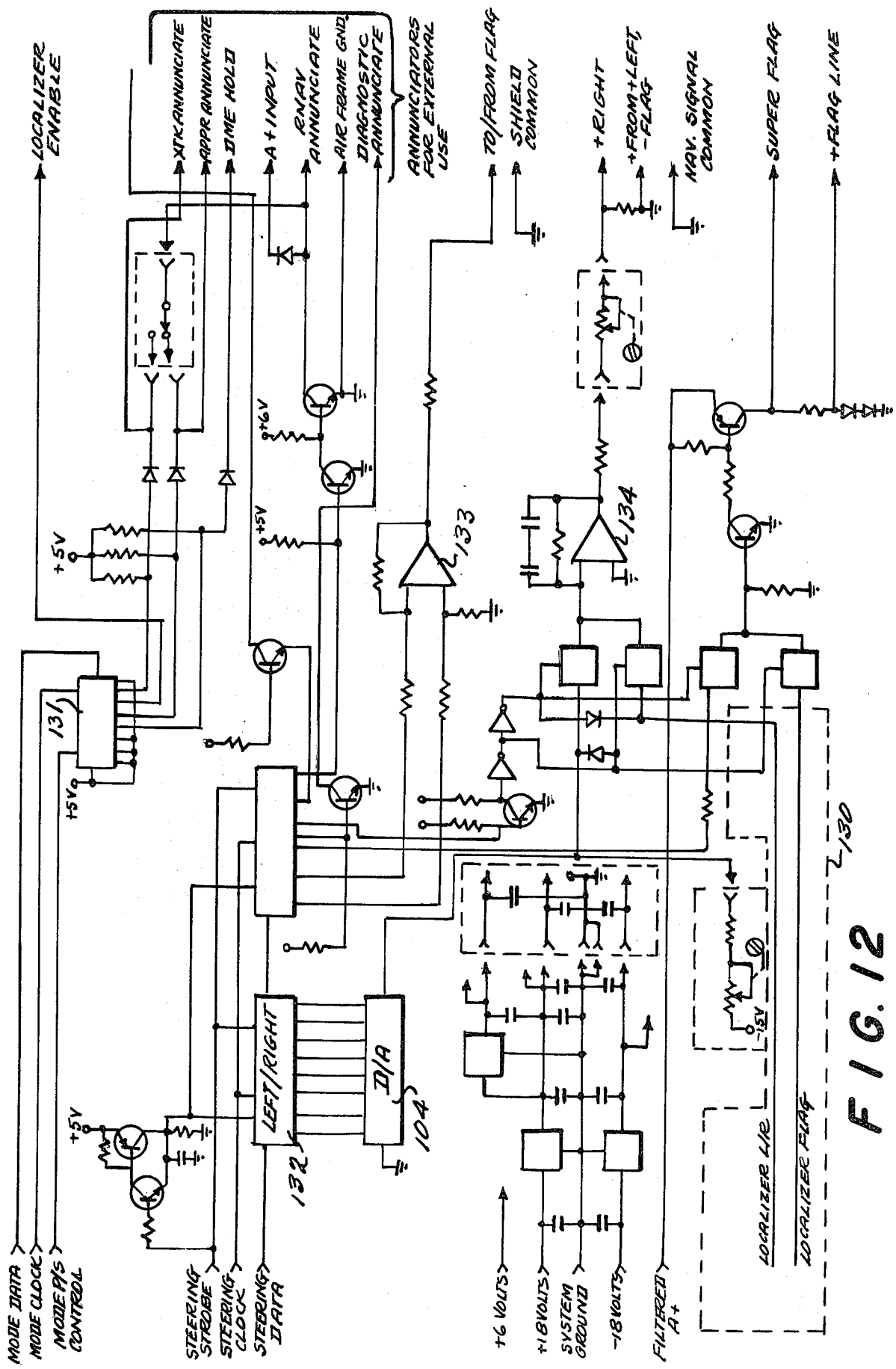

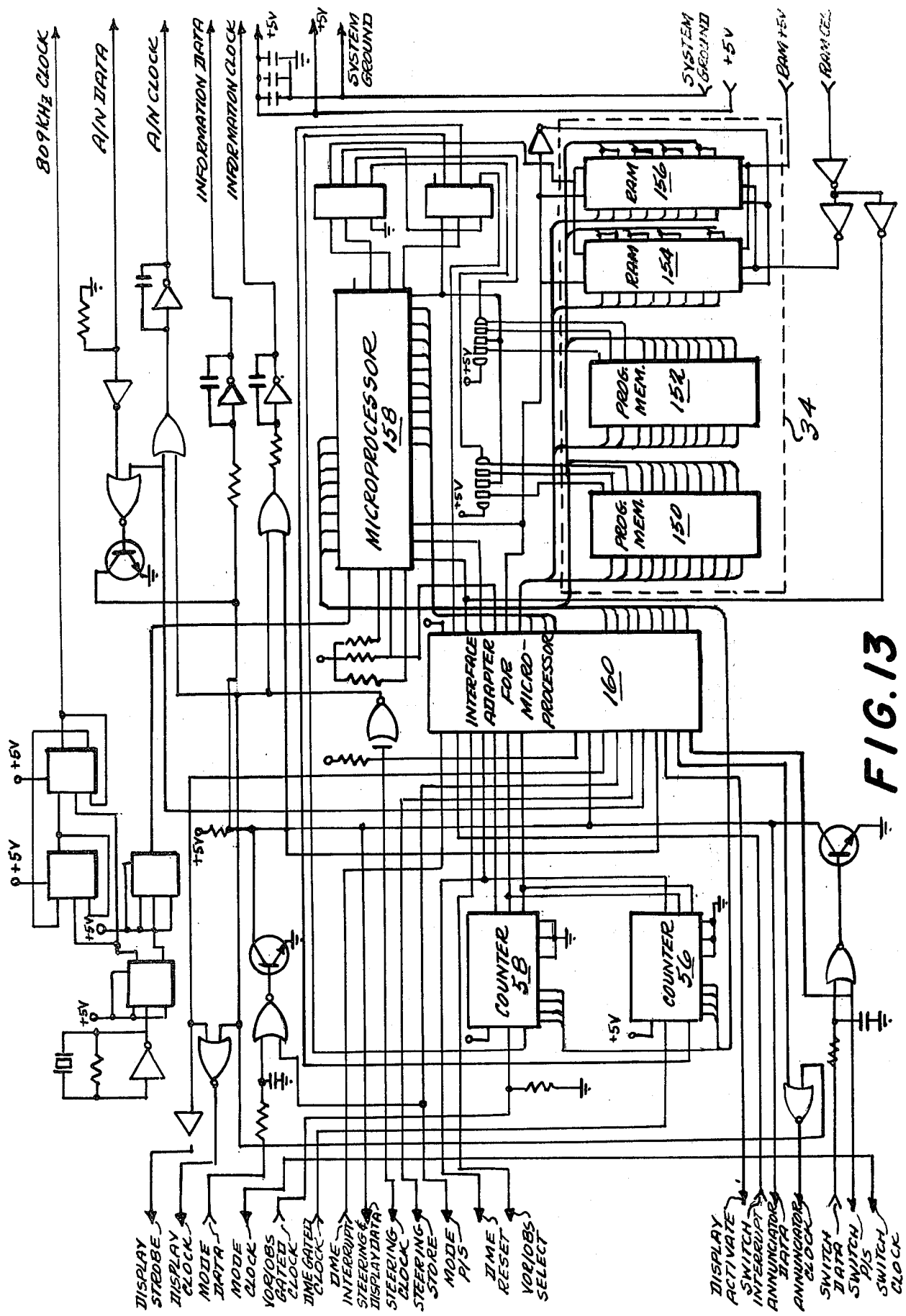

AUTOMATIC WAYPOINT AREA NAVIGATION SYSTEM

BACKGROUND OF THE INVENTION

This invention relates generally to aircraft navigation devices, and more particularly to area navigation devices, known in the art as "RNAV" devices. Specifically, the present invention automatically generates waypoints on the four cardinal radials of VORTAC stations wherever those radials happen to intersect the intended flight path. In a presently preferred embodiment, the automatic cardinal waypoint arrangement is incorporated into an RNAV device so as to form an integral part thereof. This application is related to our copending, commonly assigned design patent application Ser. No. 217,382 filed concurrently herewith on Dec. 17, 1980 for Faceplate Including Controls and Digital Readout of Aeronautical Radio Navigation Device.

To help understand the prior art background of the invention, reference should initially be made to FIGS. 1–3. In FIG. 1, there is shown in block diagram, a typical arrangement for a known RNAV device 20. RNAV device 20 is intended for use in combination with at least one conventional navigational system 26 including a VOR output providing the radial course (angular bearing) of an aircraft position with respect to a VORTAC station to which the navigation system is tuned; and a DME (distance measuring equipment) output indicating the distance (range) of the aircraft position from/to that VORTAC station. In addition, RNAV device 20 is used in conjunction with an HSI/CDI (horizontal situation indicator/course deviation indicator) having a steering needle, an omnidirectional bearing selector (OBS) and a "To/From" flag. Such devices are well known and therefore, they will not be discussed in further detail.

A conventional RNAV device, such as RNAV device 20, allows a pilot to establish a waypoint at any arbitrary position that can be defined with respect to a VORTAC station (as long as the pilot can define the radial/distance position of the waypoint with respect to the VORTAC station). Once the pilot has entered data representing the waypoint into RNAV 20, it keeps track of the aircraft's current position with respect to the VORTAC station and reckons the appropriate course to the waypoint established by the pilot. Using an HSI/CDI with a steering needle and an OBS input or other means for navigating along a desired bearing to or from the waypoint, the pilot can fly the RNAV course reckoned by RNAV 20. Thus, RNAV devices have made it possible to define a direct flight path from one way point to another by allowing a pilot to establish intermediate "imaginary" waypoints, not necessarily coincident with VORTAC stations, eliminating the prior necessity of establishing a flight path directly from VORTAC station to VORTAC station. Concurrently, the RNAV device continuously reckons the distance from the aircraft to its designated waypoint.

Referring now to FIG. 2, there is shown a graphical plot illustrating the typical use of a conventional RNAV. Using an RNAV, a pilot can navigate directly from a point of departure A to a destination B by establishing "imaginary" waypoints such as WP#1, WP#2 and WP#3. These "imaginary" waypoints are generally not located at VORTAC stations. Rather, each waypoint is defined with respect to a VORTAC station. Generally, the first VORTAC to be used is near the departure airport. In this example, the first VORTAC used is VORTAC XXX. The pilot selects the location of WP#1 along his route and defines the position or "address" of that waypoint as a radial bearing and distance from VORTAC XXX. Typically, the pilot determines the position of the waypoint with the aid of a map and plotting devices. In the example shown in FIG. 2, the position of WP#1 is 120° radial bearing (from magnetic north) and 37 nautical miles (NM) distance from VORTAC XXX.

Using other convenient VORTAC stations along the route such as VORTAC YYY and VORTAC ZZZ, WP#2 and WP#3 are defined. WP#2 is defined as 9° bearing and 41 NM range from VORTAC YYY. WP#3 is defined as the 350° radial and 45 NM distance from VORTAC ZZZ.

Typically, before the pilot departs, he enters several waypoint addresses into the memory of RNAV 20 and his desired course bearing from A to B into the OBS. After lift off, navigational system 26, supplying radial bearing and distance information to RNAV 20, is tuned to the frequency of VORTAC XXX. RNAV 20 keeps track of the aircraft's position with respect to VORTAC XXX and notes its progress toward the pilot defined WP#1. The pilot can use his RNAV driven HSI/CDI to fly the desired RNAV course (input via the OBS and calculated by RNAV 20) to reach WP#1. At some point along his RNAV course, after passing WP#1, the pilot tunes his navigational system so as to receive the signal from VORTAC YYY and continues flying the desired RNAV course as directed by the HSI/CDI to reach WP#2, and so on.

Referring now to FIG. 3 there is graphically depicted the classic RNAV triangle. This triangle indicates the manner in which known RNAV devices, such as RNAV 20 drive the HSI/CDI so as to permit the pilot to establish a course to a desired waypoint.

The pilot defines a desired waypoint along his flight path. The waypoint is defined by its radial bearing and distance from a selected VORTAC station. Thus the waypoint is defined by a waypoint position vector (known in the art as the "B" vector). The waypoint position vector is entered into the RNAV device as the waypoint address. The aircraft's present position is automatically defined by a radial (bearing) and distance to the aircraft from the selected VORTAC station. Thus, there is defined an aircraft present position vector (known in the art as the "A" vector). The aircraft present position vector is provided as a second input to RNAV device 20 by navigational system 26. RNAV 20 uses the waypoint position vector ("B" vector) and aircraft present position vector ("A" vector) to compute the bearing and range (distance) to the waypoint from the aircraft's present position. This bearing and range, so computed, constitutes the RNAV course line (known in the art as the "C" vector) and it can then be compared to the desired course line entered via the OBS to compute and provide appropriate drive signals to the HSI/CDI. The waypoint address, aircraft present position and the computed bearing and range from the aircraft to the waypoint form the classic RNAV triangle shown in FIG. 3. Of course, there are many different RNAV devices in current use and they may calculate the RNAV course line according to a variety of different methods. However, they are all based upon the classic RNAV triangle shown in FIG. 3.

Typically, RNAV 20 also compares the desired OBS course setting, entered by the pilot from the aircraft's HSI/CDI, with the computed bearing (RNAV course line-"C" vector) and displays the difference as a linear course line deviation on a left/right steering needle.

The use of conventional RNAV thus enhances a pilot's ability to fly more directly from point to point rather than from VORTAC station to VORTAC station. However, the use of conventional RNAV requires the pilot to establish the imaginary waypoints independent of the RNAV device. The pilot must, with the aid of his maps and plotting instruments, determine the position of a desired waypoint and then enter data defining that position into RNAV device 20. Only then can RNAV device 20 compute an RNAV course to that waypoint. Thus substantial pilot attention is required which may divert his attention from other matters.

SUMMARY OF THE INVENTION

The automatic cardinal waypoint arrangement according to the present invention provides an increased level of sophistication over conventional RNAV devices. The arrangement automatically determines waypoints along the desired RNAV course line and enters them into the RNAV device. Specifically, the invention determines whether the cardinal radials (0°, 90°, 180° and 270°) of a VORTAC station intersect an RNAV course line being flown and, if so, the position of such an intersection. The intersections, in essence, become waypoints along the RNAV course line.

Referring now to FIG. 4, there is shown a graphical representation of the functional application of the automatic waypoint arrangement according to the present invention. It is assumed that an aircraft is departing from point A and is flying a direct RNAV route to destination point B and that the pilot has entered the desired overall magnetic course from A to B via the OBS. After lifting off, the pilot tunes his navigational receiver to VORTAC AAA. VORTAC AAA has four (4) cardinal radials (0°, 90°, 180° and 270°). After activating the automatic waypoint arrangement, he can select each of the cardinal radials. For each such selection, the automatic waypoint arrangement automatically determines whether the cardinal radial selected intersects the RNAV course being flown. In the example shown, when the 0° radial is selected for VORTAC AAA, the automatic waypoint arrangement determines that the 0° radial of VORTAC AAA intersects the RNAV course at a 30 NM range. Thus AWP#1 is automatically established along the 0° radial of VORTAC AAA. Of course, AWP#1 is defined with respect to VORTAC station AAA, i.e. 0° bearing and 30 NM range.

Of course the pilot could have preset the cardinal radial to the 0° cardinal radial through inspection of his chart and observing the relationship of the planned flight path to VORTAC AAA and the 0° radial.

Further along the flight path, the pilot may tune his navigational system to VORTAC BBB. By sequencing through the various cardinal radials he locates two intersections of cardinal radials with his RNAV course line. One such intersection is along the 270° radial and the other intersection is along the 0° radial (AWP#2 and AWP#4, respectively) defined with respect to this VORTAC station. AWP#4, along the 0° radial is automatically displayed by the arrangement as 0° bearing and 20 NM and AWP#2 is automatically displayed as 270° bearing and 20 NM distance from VORTAC BBB.

The pilot selects the most convenient cardinal waypoint for use in navigating along that portion of his RNAV flight path that he is on. In this case, AWP#2 is convenient and is selected (e.g., by depressing a single switch). Once selected, AWP#2 is automatically treated as any other waypoint. The RNAV device keeps track of the position of the aircraft with respect to VORTAC BBB and provides the appropriate information on its display and to an associated HSI/CDI to enable the pilot to steer a course to AWP#2.

As the flight progresses farther along the flight path, it may be convenient to define a third automatic waypoint (AWP#3). AWP#3 is defined with respect to VORTAC CCC. After tuning his navigational receiver to VORTAC CCC, the pilot selects various cardinal radials, causing the automatic cardinal waypoint arrangement to compute the position of any waypoint (intersections) that may exist along the selected radial. In this case, there are two waypoints on cardinal radials from VORTAC CCC. AWP#5 is located on the 90° radial at 20 NM and AWP#3 is located on the 180° radial at 20 NM. In this case, it is convenient to utilize AWP#3 for the next leg of the flight path.

As the flight further progresses, the pilot may find it useful to define and navigate toward AWP#4, automatically computed along the 0° radial VORTAC BBB. This particular waypoint was previously computed and noted by the pilot but disregarded in favor of a more convenient waypoint (AWP#2) for an earlier portion of the RNAV flight path. Now, however, it becomes convenient to utilize AWP#4 to navigate that portion of the flight path between AWP#3 and AWP#4. Similarly, for that portion of the flight path between AWP#4 and AWP#5, the pilot may find it useful to utilize AWP#5, located on the 90° cardinal radial of VORTAC CCC. This waypoint was also previously computed, but disregarded in favor of AWP#3 for an earlier leg of the flight path.

As the pilot approaches destination point B, he may find it useful to automatically compute a final automatic waypoint (final AWP) near the destination. In this example, VORTAC DDD is located near the destination airport. As the aircraft nears the destination area, the pilot tunes to VORTAC DDD on his navigational receiver and selects the various cardinal radials. He notes that there is a waypoint (intersection with his flight path) along the 180° radial from VORTAC DDD. In this case, the automatic waypoint is at 180° bearing, 30 NM range from VORTAC DDD.

The use of the automatic waypoint arrangement according to the present invention, frees the pilot from independent plotting and computation of waypoints along his flight path.

In its preferred embodiment, the automatic cardinal waypoint arrangement, according to the present invention, is incorporated as an integral part of an RNAV device. It is difficult to describe in detail the best mode or presently preferred embodiment of the automatic cardinal waypoint arrangement, according to the present invention, without also disclosing in some detail and discussing the entire RNAV device into which it is incorporated and of which it forms an integral part. Thus, an RNAV device, incorporating the automatic cardinal waypoint arrangement of the present invention, is described in the Detailed Description of the Preferred Embodiment to follow. The RNAV device set forth is the presently preferred embodiment and represents the best mode for practicing the invention known to the inventors at the time of the filing of the application for this patent (i.e., the actually commercialized embodiment).

The RNAV device, according to the present invention, is structured, in its preferred embodiment as a microprocessor-based system including a firmware module (a programmable read only memory having a program stored therein). The firmware, in essence, transforms the microprocessor-based system into a special purpose machine providing the various functional operations of the RNAV device including the automatic cardinal waypoint feature. Of course, the RNAV device could be constructed using only "hardware" logic circuits, using discrete logic gates, for all functions implemented by the firmware. Present economies, however, render such an approach impractical.

Briefly, the overall architecture of the RNAV, according to the present invention, includes input circuits for processing the VOR and DME signals from a navigation receiver; and input circuits for processing an OBS course signal defining a pilot-selected course entered via HSI/CDI equipment.

Various controls and processing circuits allow a pilot to enter data and call for data retrieval. Annunciators and a data display provide data readout to the pilot. Circuitry is provided for driving a steering needle and "To/From" flag of an HSI/CDI. As stated, the heart of the RNAV is a microprocessor, associated PROM and related signal processing and clock generating circuits. The PROM includes firmware controlling all operations and computations.

The overall firmware-controlled operation causes the RNAV to generally follow an executive or main program in which the various RNAV inputs are read, computations are made and data is displayed. Associated with the controls for data input is an interrupt arrangement for diverting the attention of the microprocessor from is normal executive routine to allow specific data entry and retrieval as desired by the pilot, such as entering a new waypoint or reading out current aircraft position and ground speed.

The present invention provides a navigation device for use with a conventional navigation system and conventional HSI/CDI having an OBS in providing navigation information to waypoint locations defined with respect to a given VORTAC station, the device including memory means for storing digital data representing waypoints; means for reading data from the navigation receiver and determining the present position of the aircraft with respect to a VORTAC Station; means for reading from the OBS, the desired course of the aircraft; cardinal radial means for automatically determining whether a predetermined radial of the VORTAC station intersects the aircraft's desired course and if so, the location of such intersection which defines a waypoint; and means for automatically entering, into the memory means data representing the waypoint.

BRIEF DESCRIPTION OF THE DRAWINGS

The invention will be better understood by reference to the following detailed description and the claims when read in conjunction with the Figures wherein:

FIG. 3 is a graphical representation of the classic RNAV triangle illustrating how a conventional RNAV establishes bearing and distance (c) to a pilot calculated waypoint based upon an aircraft present position vector (A) and an waypoint position vector (B);

FIG. 4 is a graphical representation illustrating the automatic cardinal waypoint feature of the present invention;

FIG. 9 is a detailed schematic diagram showing part of VOR demodulator and A/D converter 40;

FIG. 10 is a detailed schematic diagram showing DME conditioning circuits 44;

FIG. 12 is a detailed schematic diagram showing various portions of RNAV 24 according to the present invention;

FIG. 13 is a detailed schematic diagram showing microprocessor and related interface circuits 32 and memory 34;

DETAILED DESCRIPTION OF THE PREFERRED EMBODIMENT

Overview-System Architecture

Figure 1:
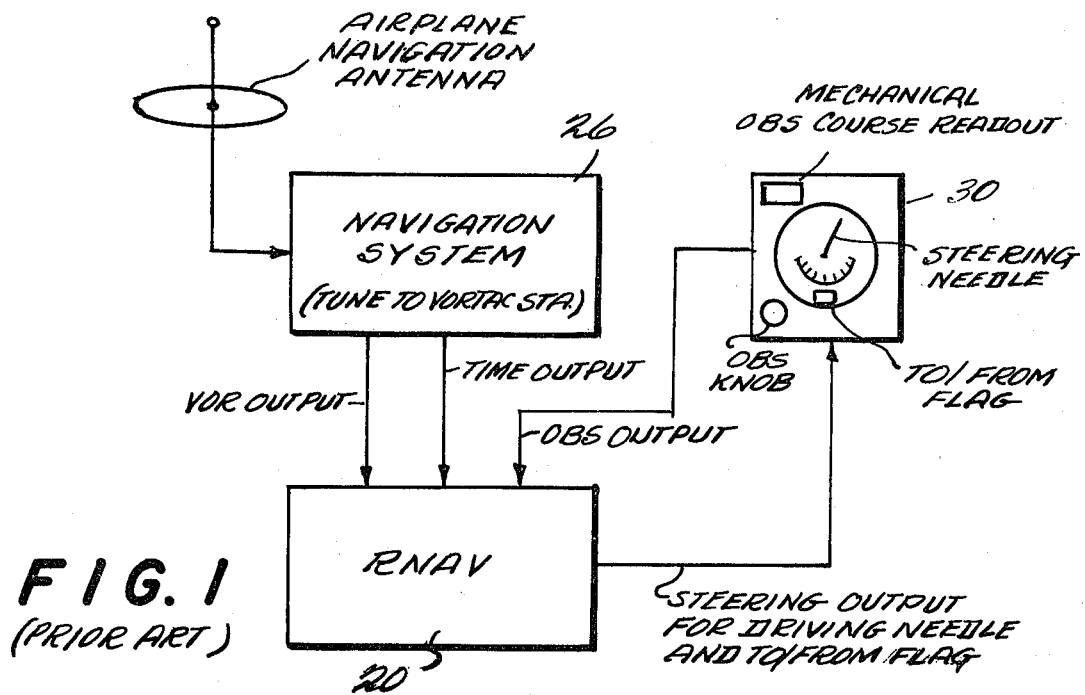
FIG. 1 is a functional block diagram representing the manner in which a conventional area navigation (RNAV) device is used in combination with a navigation receiver and horizontal situation indicator/course deviation indicator (HSI/CDI)
Figure 2:
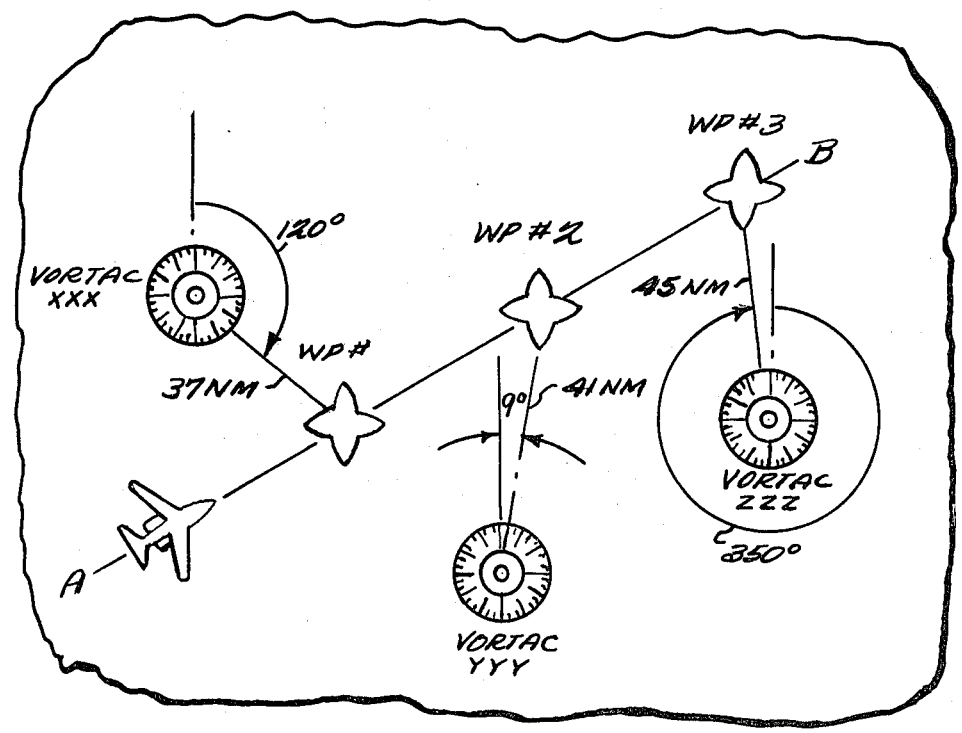
FIG. 2 is a graphical representation of the manner in which conventional RNAV is utilized illustrating the creation of pilot calculated waypoints from a point of departure A to a designation B.
Figure 5:
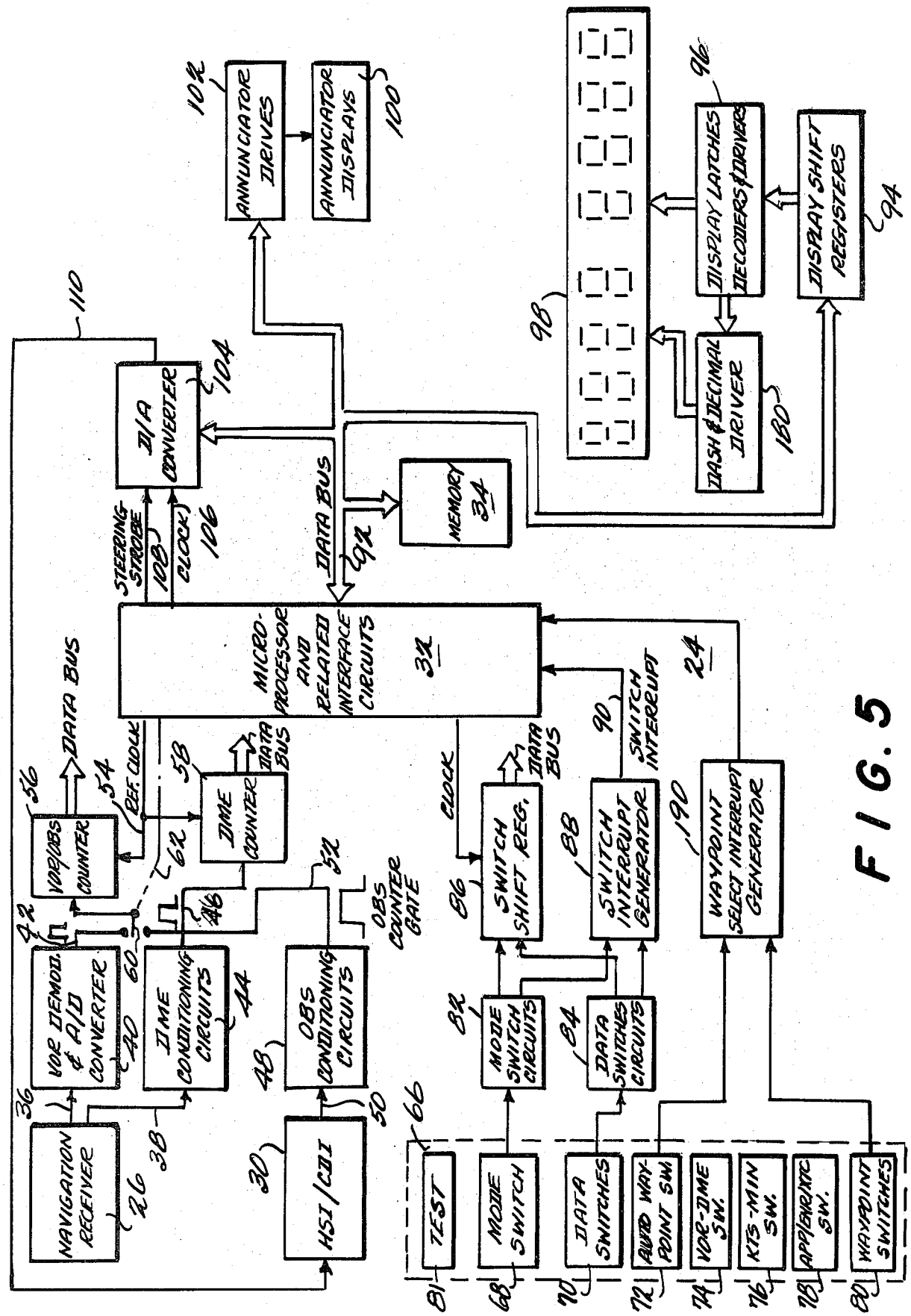
FIG. 5 is a functional block diagram showing the overall architecture of the RNAV device according to the present invention embodying the automatic cardinal waypoint feature.

Referring now to FIG. 5 there is shown a functional block diagram of the RNAV device incorporating automatic cardinal waypoint, according to the present invention. Aside from navigation system 26 and HSI/CDI 30, all other blocks shown in the Figure are parts of the RNAV device according to the present invention. The RNAV device including the automatic cardinal waypoint arrangement according to the present invention is referred to in general by reference numeral 24 throughout this description.

As previously stated, the overall architecture of RNAV 24 includes a microprocessor and related interface circuits 32 (hereinafter referred to simply as "microprocessor") implementing a firmware program stored in memory 34 to create a "special purpose" computer-based system. RNAV 24 receives VOR and DME signal outputs on signal lines 36 and 38, respectively from navigational receiver 26. The VOR signal is processed by VOR demodulator and A/D converter circuits 40 to produce a VOR counter gate on a signal line 42. The DME signal is processed by DME conditioning circuits 44 to produce a DME counter gate on a signal line 46. OBS conditioning circuits 48 receive an OBS course selection signal on a signal line 50 from HSI/CDI 30 and provide an OBS counter gate on a signal line 52. The VOR, DME and OBS counter gates on signal lines 42, 46 and 52 respectively, gate counters which count in accordance with a reference clock signal provided by microprocessor 32 on a signal line 54. The VOR and OBS counter gates control, in the alternative, a VOR/OBS counter 56. The DME counter gate controls a DME counter 58. A switch 60 automatically operated via a signal line 62 from microprocessor 32 selects whether OBS counter 56 will be gated by the VOR counter gate on signal line 42 or the OBS counter gate on line 52. RNAV 24 also includes its own localizer for convenience in airport approaches and its own Radial Magnetic Indicator (RMI) circuitry. However, the localizer and its associated circuitry and the RMI form no part of the present invention. Accordingly, the localizer and RMI circuits are not shown in FIG. 5; however; they are shown in the detailed schematics of RNAV 24 shown in FIGS. 9 to 17 for the sake of completeness. Thus, blocks 40, 44, 48, 56 and 58 operate to automatically supply RNAV 24 with data from navigation receiver 26 and HSI/CDI 30. They do not operate on pilot entered data via various operational switches actuated by the pilot.

Pilot entered data (operating mode selection, and the like) are entered via manual controls 66. Controls 66 for selecting the various operational modes of RNAV 24 include a mode switch 68, data switches 70 for entering waypoint data and making various selections, an automatic waypoint switch 72, a VOR-DME switch 74, a KTS-MIN (knots-minutes) switch 76, an APP/ENR/XTK (approach/enroute/cross-track) steering mode selecting switch 78, four (4) waypoint switches 80 and a test switch 81. Mode switch 68 includes the following selectable positions: OFF, VOR/LOC (VOR/LOCALIZER), CRS/XTK (CROSS/TRACK) RNAV, RAD/DIST (RADIAL/DISTANCE), FREQ/ELEV (FREQUENCY/ELEVATION) and SET (set waypoint). Mode switch 68 is coupled to mode switch circuits 82 and data switches 70 are coupled to data switch circuits 84. The outputs from mode switch circuits 82 and data switch circuits 84 are coupled to switch shift registers 86 which store data entered via mode switch 68 and data switches 70. In addition, the outputs of mode switch circuits 82 and data switch circuits 84 are coupled to an interrupt generator 88 which provides a switch interrupt signal on a signal line 90 to microprocessor 32. Thus, all pilot entered mode selection and data entry is via controls 68 and 70 and blocks, 82, 84, 86 and 88 to microprocessor 32.

Computed and other data is delivered to the pilot via the various blocks shown in the right half of FIG. 5. Digital data to be displayed is coupled via the data bus 92 to display shift registers 94. The outputs of display shift registers 94 are coupled to display latches, decoders, and drivers 96 which actually drive a data display 98 including eight numerical readout elements. These numerical readout elements are shown in the Figure illustrating all 8's, a typical test pattern display. RNAV 24 includes annunciator displays 100 which permit multifunctional use of the various data displays and input controls. The annunciator displays are driven by annunciator drives 102, which receive data from microprocessor 32. As will be more fully described later, annunciator displays 100 include lamps with corresponding front panel indicia representing KTS (knots), BRG (bearing), VOR, MIN (minutes), RNG (range), DME, FRQ (frequency), RAD (radial), CRS, L (left), R (right), XTK (cross-track), DST (distance), and ELV (elevation). In addition, annunciator displays 100 include lamps optically coupled with the four waypoint switches 80 to indicate which of four waypoints are being actively navigated or programmed. The activation of the fifth or automatic waypoint is optically annunciated by a lamp behind the autowaypoint switch 72.

RNAV 24 also includes D/A converter 104 receiving data signals from data bus 92, clock signals via a line 106 and a steering strobe signal via a line 108. D/A converter 104 provides steering and flag control signals to HSI/CDI 30 via a line 110.

The ornamental features of the face plate (not shown) and arrangement of controls 66, annunciator displays 100 and display elements 98 of RNAV 24 are shown in our co-pending, commonly assigned application for design patent Ser. No. 217,382 filed concurrently herewith on Dec. 17, 1980.

FUNCTIONAL DESCRIPTION OF OPERATIONAL MODES

The following is a functional description of the various operations that occur within RNAV 24 in each of its modes of operation as selected via controls 66.

VOR/LOC: With mode switch 68 in the VOR/LOC position, RNAV 24 operates in a VOR localizer (LOC) mode. In this mode RNAV 24 merely operates as a conventional navigational receiver/converter such as navigation receiver 26 would operate in combination with an HSI/CDI such as HSI/CDI 30. RNAV 24 identifies and displays via elements 98 the bearing and range to a VORTAC station tuned-in on navigation receiver 26. Thus, if a pilot establishes a flight plan from one VORTAC station to the next (as is commonly done in the absence of an RNAV device), he could simply fly in VOR/LOC mode and steer a course defined by the bearing to the VORTAC station as displayed. Operation in the VOR/LOC mode does not involve any of the computations normally associated with conventional RNAV devices. The bearing and range are displayed by elements 98 corresponding to the current bearing and range to the VORTAC station. While bearing and range are being displayed in this mode, the VOR and DME annunciator lamps are lighted. In order to fly a course directly to the VORTAC station, a pilot could consult his magnetic compass and steer his aircraft so as to maintain a magnetic compass heading corresponding to the bearing displayed on display elements 98. Operating with an HSI/CDI having an OBS, the pilot could consult the course defined by the bearing displayed by elements 98 set the OBS to "steer" the displayed bearing and then steer a course so as to maintain a "centered" HSI/CDI steering needle.

Operating in the VOR/LOC mode, the bearing and DME information displayed via elements 98 merely indicates the direction (bearing) to fly to get to the VORTAC station tuned in and the range to that station from the aircraft's present position.

While operating in the VOR/LOC mode, if a ground controller inquires as to the aircraft's present position, the pilot can depress VOR-DME pushbutton switch 74. Depressing switch 74 causes elements 98 to display the reciprocal of the bearing to the VORTAC station. Thus, the present position of the aircraft is defined as a bearing and range from the VORTAC station, i.e. the aircraft is on the 91° radial at 26.5 NM from the VORTAC station XXX.

Also, while operating in the VOR/LOC mode, if the (KTS-MIN) (knots-minutes) pushbutton switch 76 is pressed, RNAV 24 calculates the aircraft's ground speed towards the received VORTAC station. This computation is carried out by the determining the rate of change of distance (displayed as the range) over a predetermined distance and computing the ground speed corresponding to that rate of change of distance. The distance (range) to the VORTAC station is then divided by the computed ground speed to derive the estimated time required to reach the VORTAC station which is displayed in minutes. Both ground speed in KTS and time in MINS are displayed via elements 98. During such display the KTS and MINS annunciator lamps are lighted.

The VOR/LOC mode can also be used for localizer operation at an airport approach. For such operation, the internal localizer (not shown in FIG. 5) would be used. As previously stated, the localizer forms no part of the invention herein claimed. It is shown in the detailed schematics only for the sake of completeness in detailing the entire RNAV device which is the best mode implementation of the present invention.

CRS/XTK: The (cross track) CRS/XTK position of mode switch 68 actually defines two separate and distinct modes of operation. A first mode of operation is defined when the cross track switch position has been selected immediately after operation in the RNAV mode; and a second operating mode is selected when the immediately preceding operation was in the VOR/LOC mode.

Upon switching mode switch 68 from VOR/LOC position to the CRS/XTK position, RNAV 24 displays the course selected by the OBS of an HSI/CDI operating in conjunction with RNAV 24. In this mode, RNAV 24 provides an accurate digital display via elements 98 of the course (bearing) selected by the pilot and entered via the OBS course selector knob. This readout generally provides a more accurate indication of the course than could be obtained merely from the mechanical dial indicator of the OBS. In essence RNAV 24 operates in this mode as a course enunciator. If the pilot desires to set a course via the OBS course selection knob even more accurately, depressing the test pushbutton switch 81 causes the display to read out in 10ths of a degree of range. Thus, operating in the CRS/XTK position of switch 68 following immediately preceding operation in the VOR/LOC position, RNAV 24 operates, in essence, as an electronic substitute for the mechanical indicator of the OBS associated with RNAV 24.

However, if the CRS/XTK position of switch 68 is selected following immediately preceding RNAV position operation (to be discussed below) RNAV 24 operates in a "parallel" track offset mode (in addition to the course mode). The pilot can select an offset course parallel to the "programmed" RNAV course the offset being up to a maximum of 20 miles.

RNAV 24 provides linear (constant course width) HSI/CDI steering information on signal line 110 when operating in the RNAV mode (discussed below) with enroute (ENR), approach (APP) or cross track (XTK) steering. The three different types of steering are selectable, in the alternative, via APP/ENR/XTK switch 78.

Course width provided across the HSI/CDI scale is in nautical miles and remains constant regardless of the range of an aircraft to a waypoint. The CDI/HSI needle remains centered when the aircraft is on the course line to the waypoint as selected by the OBS. The pilot can thus instantly determine the aircraft's exact distance from the intended course line by simply observing the relative position of the HSI/CDI needle. When using linear steering, the passing of a waypoint is indicated by transition of the HSI/CDI flag from "to" to "from". Waypoint passage can also be verified by observing the point at which the range display reaches its lowest value before beginning to count back up. With switch 78 in the enroute (ENR) position, full scale of the HSI/CDI is a constant ±5 NM. Moving switch 78 to the approach (APR) position increases the HSI/CDI steering resolution so that full scale course width is ±1.25 NM. Approach mode steering is generally used on RNAV instrument approaches after passage of the final approach fix. Moving switch 78 to the cross track (XTK) position allows RNAV 24 to be programmed to establish a parallel course line up to 20 NM on either side of an RNAV course. When cross track (XTK) steering has been selected, the HSI/CDI steering needle centers when the aircraft is on the programmed parallel offset course. As with enroute steering, full scale HSI/CDI needle deflection is ±5 NM.

RNAV: When switch 68 is in the RNAV position, RNAV 24 operates in the "RNAV" mode. In the RNAV mode, RNAV 24 navigates to a waypoint selected from one of up to five (5) waypoints previously "memorized". For the purposes of navigating in the RNAV mode, it does not matter whether the waypoint being navigated to was obtained in the conventional manner, i.e. by being "programmed" in by the pilot or whether the waypoint was obtained automatically using the automatic cardinal waypoint feature of this invention. Regardless of the manner in which a waypoint was obtained, in the RNAV mode, RNAV 24 operates in accordance with the classic RNAV triangle shown in FIG. 3 and displays the bearing and range to the waypoint being navigated. RNAV 24 is capable of storing five (5) different waypoints including four (4) conventional and a fifth "automatic" cardinal waypoint. The fifth waypoint may also be programmed as a conventional waypoint. It also has the capability of being programmed to enter as a waypoint the aircraft "present position" as the instant radial and distance from the VORTAC.

Figures 6, 14:
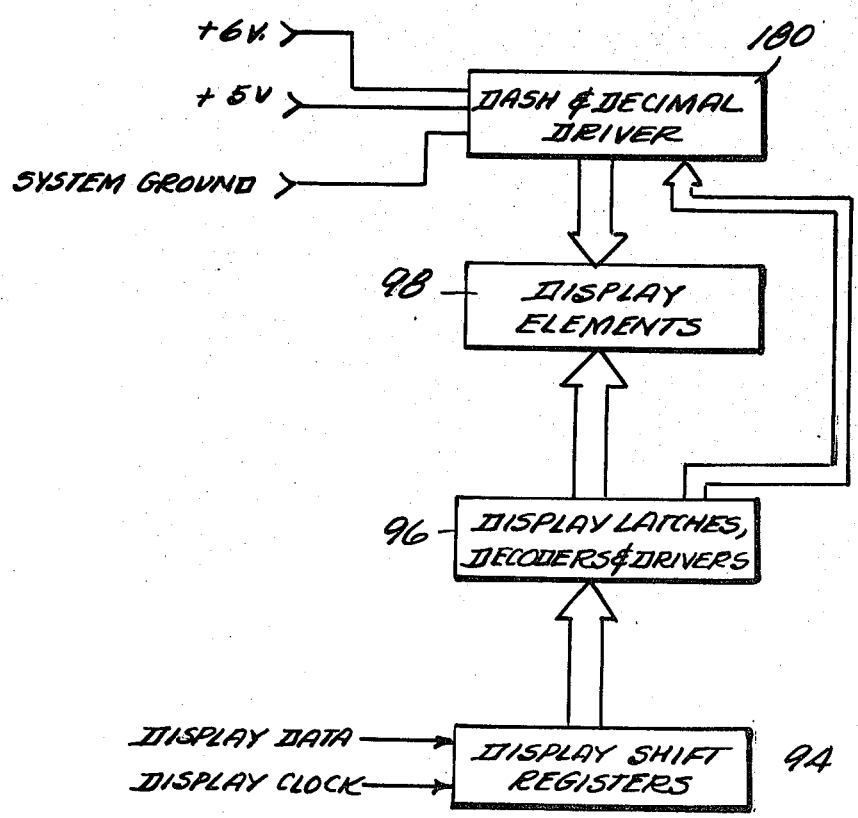
FIG. 6 is a graphical representation of a portion of memory 34 (shown in FIG. 5) dedicated for waypoint data and illustrating the scratch pad memory in which a pilot can write frequency and elevation data related to the VORTAC station to which the various waypoints are referenced.
FIG. 14 is a functional block diagram showing the data display circuitry.

Referring to FIG. 6 there is diagrammed a portion of memory 34 dedicated to waypoint storage. Memory 34 actually includes two (2) EPROMS 150 and 152 (shown in FIG. 13) in which the system firmware is stored, and two RAMS 154 and 156 (also shown in FIG. 13) used for data storage and manipulation. That portion of memory 34 dedicated to waypoint storage is in RAMS 154 and 156. RNAV 24 can navigate in the RNAV mode to any one of up to five (5) waypoints stored in a block of memory 34 dedicated to waypoint storage.

Within memory 34 there are twenty separate and distinct blocks of memory dedicated for the storage of waypoint information. Data related to five separate and distinct waypoints can be changed or reprogrammed as desired. For each waypoint, the waypoint position in terms of radial and distance can be stored. In addition, for convenience the pilot can enter both the frequency and elevation of the VORTAC station from which each waypoint is defined. In essence, the frequency and elevation memory blocks are merely scratch pad memories used for the sole purpose of reminding the pilot as to frequency and elevation of the VORTAC station from which a waypoint is defined. The data is not used in any computation.

The radial and distance data, however, is utilized for RNAV navigation. In essence, the radial and distance data defines the waypoint position vector (shown in FIG. 3) for each waypoint. When operating in the RNAV mode, RNAV 24 periodically (several times each second) consults the radial and distance information stored in the appropriate memory blocks and then uses that information along with the aircraft present position vector information obtained from navigation receiver 26 to calculate the aircraft bearing and range to the waypoint.

Operating in the RNAV mode, RNAV 24 navigates to whichever way-point is pilot selected by depressing the corresponding one of pushbutton switches 80 or 72. By pressing and holding one of the waypoint select switches 80, data from the corresponding bearing and range blocks of memory 34 is displayed via elements 98. An annunciator light optically coupled with the selected switch is lighted to indicate the active waypoint.

RAD/DIST: When switch 68 is in the RAD/DIST position, RNAV 24 operates in the RAD/DIST mode. Operation in this mode is indicated by the lighting of RAD and DIST lamps of annunciator displays 100. In the RAD/DIST mode, elements 98 display the bearing and distances of the waypoint being navigated to. The information displayed in this mode is identical to the information displayed when operating in the RNAV mode and the pilot simultaneously presses and holds pushbutton switch 80 corresponding to the waypoint being navigated to. However, in the RAD/DIST mode, it is not necessary to maintain pressure on a switch 80.

In the RAD/DIST mode, it is possible to manually enter or program a waypoint into one of the dedicated memory blocks of memory 34. Pressing one of the pushbutton switches 80 allows the writing into a memory block of waypoint information. This writing is accomplished by manipulation of data switches 70. The RAD/DIST mode of operation is indicated by the particular waypoint switch 80 being lighted intermittently by an enunciator lamp of annunciator displays 100. The bearing and range being manually entered appear on display elements 98. By programming in this manner, it is possible to enter four (4) separate and distinct waypoints (#1–#4). Also, the fifth waypoint could additionally be programmed in similar manner if desired.

FREQ/ELEV: When switch 68 is in the FREQ/ELEV position, the pilot can enter data relating to the frequency of the VORTAC station from which a waypoint is defined. In addition, the pilot can enter the elevation of that station. This mode allows the pilot access to the scratch pad memory for recording frequency and elevation information as shown in FIG. 6.

The data stored in this scratch pad memory is merely for the operational convenience of the pilot. It is not used for computation in any manner. In this mode the FREQ and ELEV annunciator lamps are lighted.

SET: With switch 68 in the SET AUTO mode position, RNAV 24 operates in a "set automatic cardinal waypoint" mode. Selection of this mode is indicated by the lighting of a lamp associated with switch 72, enunciator drive and display. In this mode, RNAV 24 automatically generates a waypoint on a selected one of the four (4) cardinal radials from the VORTAC station to which navigational receiver 26 is tuned. When operating in this mode, rotating data switches 70 causes the device to sequence through the four (4) cardinal radials (0°, 90°, 180°, 270°). The cardinal radial, selected is displayed via elements 98. For each such cardinal radial, RNAV 24 automatically determines whether the radial intersects the desired RNAV route being flown. If there is such an intersection, the distance from the VORTAC station along that cardinal radial to the WPT is computed. The intersection point can become the 5th or automatic waypoint. By turning data switches 70, RNAV 24 sequences through the four (4) cardinal radials, and computes the waypoints, if any, along each. The pilot can select a convenient waypoint from among those automatically determined or from chart inspection of the relation of the cardinal radials to his selected course.

After an automatically computed cardinal waypoint has been selected and stored in memory, the pilot can depress AUTO WPT pushbutton switch 72, while operating in the RNAV mode to navigate to the automatic waypoint. A block of memory within memory 34 is dedicated to the fifth (Automatic waypoint) in the same manner as it is to the other four and data can be entered therein and used for navigation in the RNAV mode.

A particular operational advantage derived from the automatic waypoint feature of RNAV 24 is related to the automatic programming of a waypoint. When operating in the RAD/DIST mode and the autowaypoint program button is activated for programming, then when the VOR/DME button 74 is depressed, the current position of the aircraft (which is then displayed as a radial and distance with respect to a VORTAC station) is stored as the fifth or automatic waypoint. Thus, if the aircraft is flying over a landmark, such as the end of a runway, and the pilot wishes to return to the landmark later, he can simply set that particular location as the automatic waypoint. Later, that information can be recalled simply by pressing AUTO WPT switch 72.

EXECUTIVE ROUTINE

As previously stated, all functional operations of RNAV are carried out by a microprocessor based system, the overall architecture of which was described with respect to FIG. 5. Firmware stored in memory 34 (including EPROMs 150 and 152) control the operations of RNAV 24 including the reading of data from navigational receiver 25, data from the OBS of HSI/CDI 30, pilot-entered data via controls 66, display data by display elements 98, annunciator displays via annunciator drives 102 and annunciator displays 100 and signals via signal line 110 for driving a steering needle of HSI/CDI 30. The firmwave for implementing these functions includes an executive program that is executed repetitively. Various flags and interrupts divert microprocessor 32 from the executive program to carry out subroutines associated with the specific flags and interrupts. Although the entire executive program is not flow charted, the important features thereof are flow charted in FIG. 7.

Figure 7:
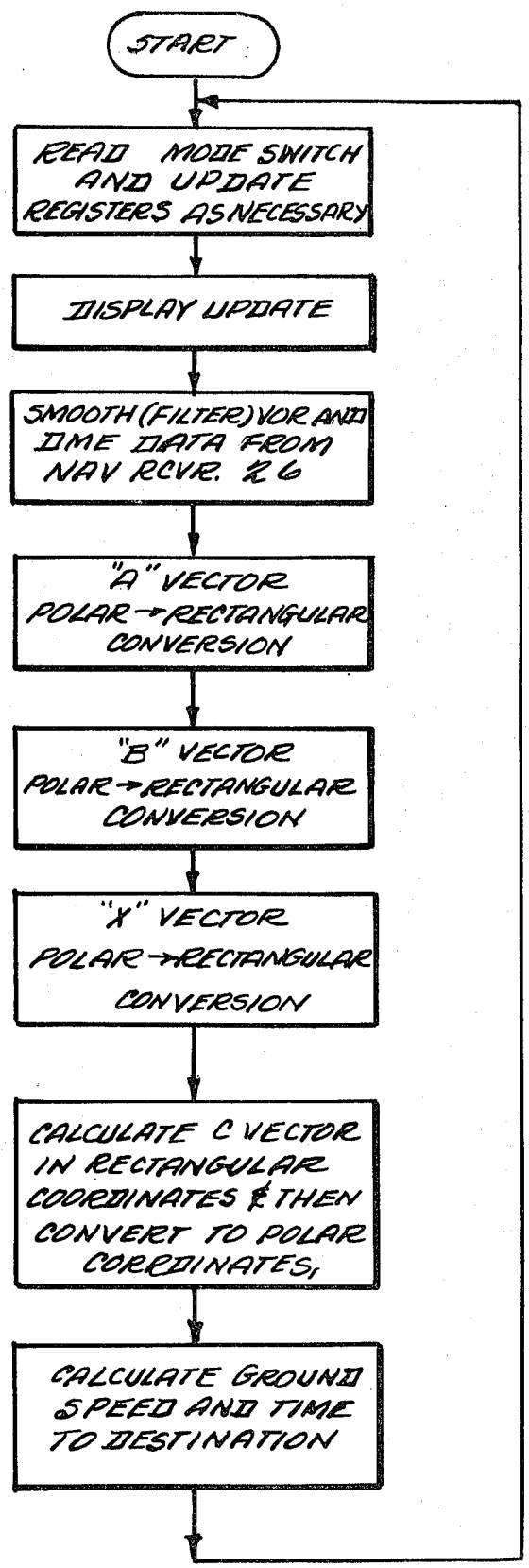
FIG. 7 is a flow chart illustrating the main features of the executive program stored as firmware in EPROMS 150 and 152.

Referring now to the FIG. 7 flow chart, the executive program begins by causing a reading of the mode selected via switch 69 and an updating a mode switch shift register 69 (shown in FIG. 16) which is part of mode switch circuits 82 (shown in FIG. 5). After the mode is read and mode switch shift register 69 is updated as necessary, DME and VOR data read from navigation receiver 26 via blocks 40, 56, 44, and 58 are digitally smoothed (filtered). Then, the aircraft present position vector (A vector shown in FIG. 3) is converted from polar to rectangular coordinates. After the A vector conversion, the waypoint present position vector (B vector shown in FIG. 3) is converted from polar to rectangular coordinates. After the polar to rectangular conversion of the B vector, "X" vector used for cross track steering (if selected) is converted from polar to rectangular coordinates. Following conversion of the X vector, the RNAV (C vector shown in FIG. 3) is computed in rectangular coordinates and the result is converted from rectangular coordinates to polar coordinates for display. After conversion of the C vector to polar coordinates, ground speed and time to destination are calculated for display in the event they are called for appropriate actuation of the KTS-MIN switch 76.

Associated with the executive program are three flag routines including an automatic waypoint sub-routine, a steering output sub-routine, and a VOR/DME smoothing sub-routine. The automatic waypoint sub-routine is flow charted in FIG. 8 and executes the automatic computation of cardinal waypoints. The steering output sub-routine determines the appropriate steering signals to be coupled via signal line 110 to the steering needle of HSI/CDI 30. The VOR/DME smoothing sub-routine provides the smoothing (filtering) of the count data derived from the VOR/DME outputs of navigation receiver 26.

The flag sub-routines are executed in response to a flag being set either on an interrupt basis or as a result of various tests that are ongoing during various of the routines. A flag register includes memory space dedicated for each of a plurality of flags. As flags are generated on either an interrupt basis or as a result of a test response, the flag is noted in the register. Periodically, the flag register is consulted and the presence of a particular flag causes a jump to a particular flag routine.

The various flag routines are prioritized such that if plural flags are set, the routines are executed in a predetermined manner. The highest priority flag routine is the automatic waypoint sub-routine. If the automatic waypoint flag in the flag register is set, the executive jumps to the automatic waypoint sub-routine (shown in flow chart form in FIG. 8). If the automatic waypoint flag is set, the first time after it is set that the flag register is consulted, the executive jumps to the automatic waypoint sub-routine.

In addition to the flag routines, there are a plurality of interrupt routines. In addition to a general interrupt, there are several sources of specific interrupts. One such specific interrupt is a DME interrupt which indicates that the DME counter 58 has a number ready for microprocessor 32 to read. A second interrupt is a switch interrupt generated by switch interrupt generator 88. The switch interrupt indicates that a switch has been depressed or changed. Also, there is a general timer interrupt that occurs every one hundred milliseconds.

Each of the interrupts causes the microprocessor to go through a series of tests to determine which specific interrupt caused the interrupt. A priority is established in this testing. For example, the first test is whether or not the interrupt was caused by a switch interrupt from switch interrupt generator 88. If switch interrupt generator 88 was the source of the interrupt, the switch data is read and the executive jumps to the appropriate subroutine for handling whatever has occurred. If however, the interrupt was a DME interrupt, then microprocessor 32 reads the contents of DME counter 58 and then returns to whatever it was doing prior to the interrupt. The last interrupt tested is a timer interrupt. On each time interrupt, switch 60 shown in FIG. 5 switches between VOR conditioning circuits 40 and OBS conditioning circuits 48 which share VOR/OBS counter 56. The changing of switch 60 initiates a read of the data stored in counter 56 on the next interrupt. In essence, switch 60 is telling the system to alternately measure the VOR output and the OBS output of HSI/CDI 30. On odd interrupts, the VOR output of navigation receiver 26 is read and on even interrupts the OBS output of HSI/CID 30 is read. Once information is read from counter 56 and stored, switch 60 moves to its other position. Then a master counter is reset and the smoothing flag is set to force the filtering of the data at some later time.

After OBS data is read via line 52 and switch 60 and OBS information is stored, then DME information is read from DME counter 58. When this occurs, a steering flag and the auto waypoint flag are set in the flag register. In the event that mode switch 68 is in the "SET" position, the next time the flag register is consulted, the executive will jump to the automatic waypoint sub-routine for calculation of an automatic cardinal waypoint. A program listing depiction of all of the firmware coding including the Executive Routine is printed out in an appendix to this application. The printout includes comments to aid in a full and complete understanding of the program.

AUTOMATIC CARDINAL WAYPOINT SUBROUTINE

One aspect of the present invention is directed to the automatic computation and entry of waypoints along the cardinal radials of VORTAC stations that intersect the aircraft's intended flight path as entered on the OBS associated with HSI/CDI 30. In order to determine whether a waypoint exists along a cardinal radial of a particular VORTAC station, the pilot places mode switch 68 in the SET position so that RNAV 24 operates in the set automatic waypoint mode. While operating in this mode, manual adjusting data switches 70 causes a sequencing of the various cardinal radials (0°, 90°, 180° and 270°) and their display by elements 98. For each such cardinal radial, RNAV 24 computes the distance along that cardinal radial from the VORTAC station to the OBS selected flight path. If no intersection between selected cardinal radial and the flight path exists, an indication of dashes will be displayed by the range elements 98. Such a display could mean that the distance along that radial is too great (in the preferred embodiment, over 300 NM) or that based upon geography there is no intersection along that radial.

The actual computation of distance for each cardinal radial selected is carried out by an automatic waypoint subroutine which is part of the overall firmware stored within memory 34. This subroutine is detailed in FIGS. 8 and 8a.

Figure 8:
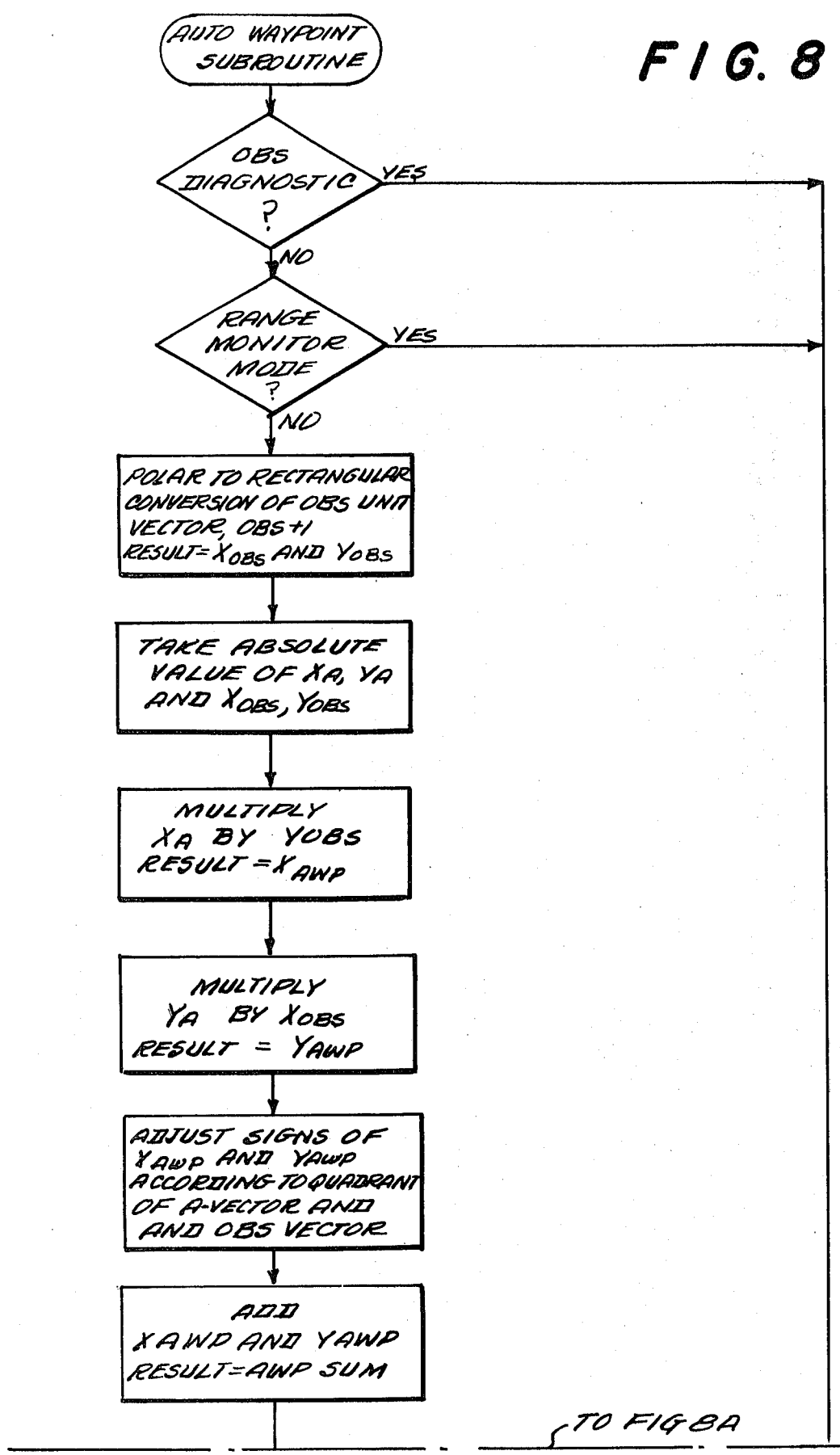
FIGS. 8 and 8a together provide a flow chart illustrating the automatic waypoint subroutine stored as firmware in EPROMS 150 and 152 (part of memory 34)
Figure 8A:
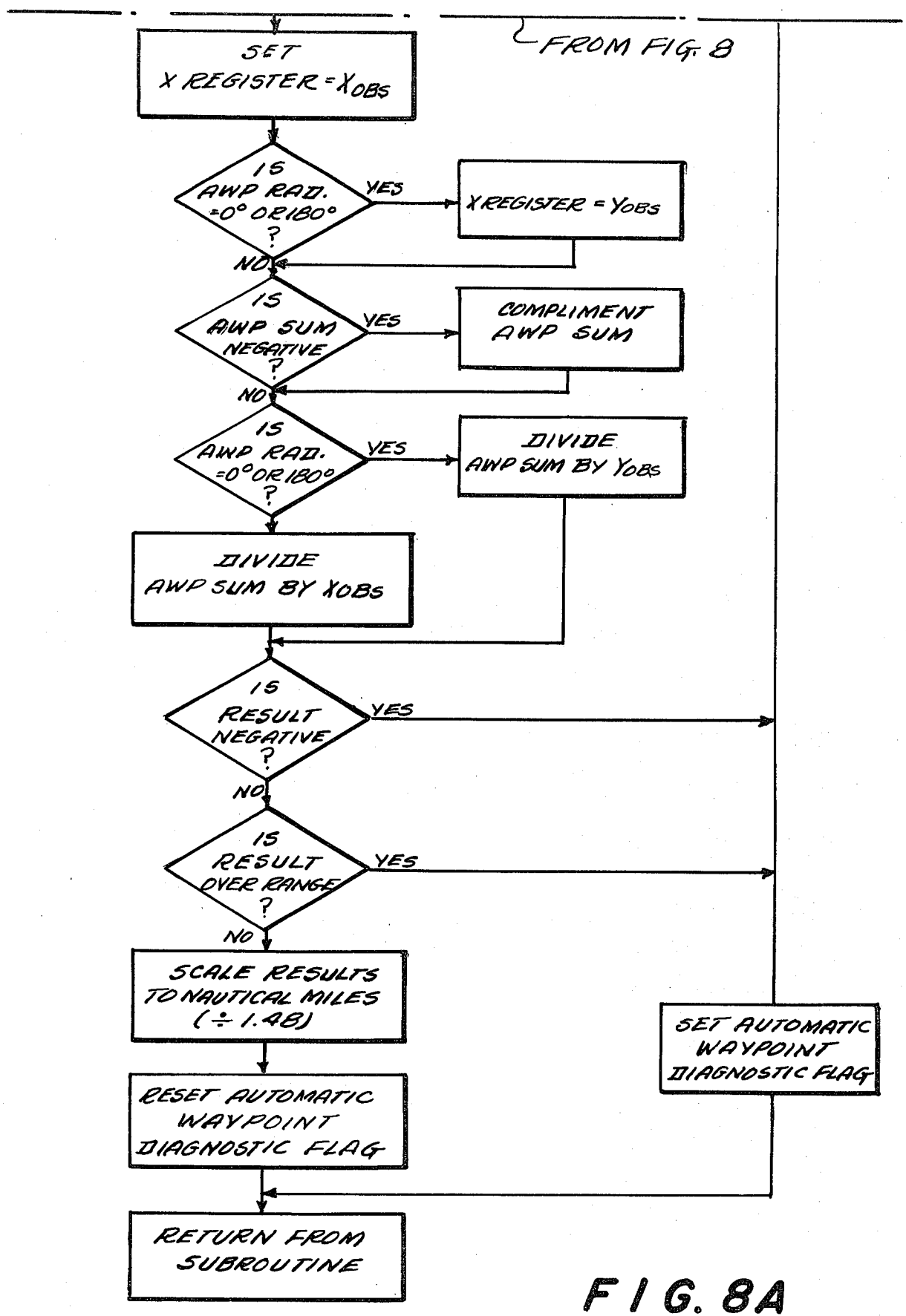

Referring now to FIGS. 8 and 8a, there is shown a flow chart of the automatic waypoint subroutine. As used in this flow chart, $X_a$ and $Y_a$ represent the rectangular components of the aircraft's present position, defined with respect to a VORTAC station; the OBS represents the OBS course angle (bearing) as set by the pilot via the OBS associated with HSI/CDI 30; and AWP RAD represents the automatic waypoint radial.

The overall structure of the firmware routine stored in memory 34 includes an executive routine which calls for the performance of various functions by subroutines. Such functions include various diagnostics, reading data from navigation receiver 26, reading data from HSI/CDI 30, etc. In addition, a flag routine, called by the executive routine, routinely surveys a flag register to note whether any of various flags have been set by interrupts occurring during the execution of an operational functional. Such interrupt generated flags include switch interrupts generated via interrupt generator 88 (shown in FIG. 5) and timer interrupts. Turning mode switch 68 to SET position creates an interrupt and sets a flag ultimately resulting in entry of the automatic waypoint subroutine. The overall purpose for the automatic waypoint subroutine is the computation of distance associated with each selected cardinal radial so that the pilot can immediately determine whether a waypoint exists, and if so, where that waypoint is along the cardinal radial.

Essentially, the automatic waypoint subroutine computes the distance for each cardinal radial selected according to the following formulas:

if $AWP$ rad $= 0°$, then $AWP$ dist $= \dfrac{[(X_A \times Y_{OBS}) - (Y_A \times X_{OBS})]}{Y_{OBS}}$ if $AWP$ rad $= 90°$, then $AWP$ dist $=$ $$\dfrac{[(Y_A \times X_{OBS}) - (X_A \times Y_{OBS})]}{X_{OBS}}$$

if $AWP$ rad $= 180°$, then $AWP$ dist $=$ $$\dfrac{[(Y_A \times X_{OBS}) - (X_A \times Y_{OBS})]}{Y_{OBS}}$$

if $AWP$ rad $= 270°$, then $AWP$ dist $=$ $$\dfrac{[(X_A \times Y_{OBS}) - (Y_A \times X_{OBS})]}{X_{OBS}}$$

After entry into the automatic waypoint sub-routine, the sub-routine performs an OBS diagnostic. This diagnostic tests whether the OBS is connected and working properly, i.e. if valid OBS information is being received on signal line 50, see FIG. 5. If the OBS signal is not defective, a test is performed to determine whether RNAV 24 is in a range monitor mode. The range monitor mode is not discussed in this patent. It pertains to an add-on device for use with RNAV 24 according to the present invention. Thus, the range monitor forms no part of the present invention. However, it is included in the sub-routine in order to insure full disclosure of the sub-routine as utilized in the preferred embodiment. If it is determined that RNAV 24 is not in the range monitor mode, the sub-routine performs a polar to rectangular conversion of the OBS unit vector to obtain the X and Y OBS components $X_{OBS}$ and $Y_{OBS}$.

After the X and Y OBS components have been obtained, the absolute value of $X_A$, $Y_A$, $X_{OBS}$, and $Y_{OBS}$ are computed. Then, $X_A$ is multiplied by $Y_{OBS}$ to obtain $X_{AWP}$ which is the X component of the automatic waypoint. Then, $Y_A$ is multiplied by $X_{OBS}$ to obtain $Y_{AWP}$ which is the Y component of the automatic waypoint. Then, the various signs of $X_{AWP}$ and $Y_{AWP}$ are adjusted according to the quadrant of the vector defining the aircraft present position with respect to the VORTAC and the quadrant of the OBS vector specifying the aircraft bearing (actual flight path). Then, $X_{AWP}$ and $Y_{AWP}$ are added to obtain AWP SUM. Then, an X register is set to the value of $X_{OBS}$. Actually, this step creates a pointer to the address where the value of $X_{OBS}$ is stored within memory 34.

After a pointer has been set to note the value of $X_{OBS}$, it is determined whether the automatic waypoint radial i.e. the cardinal radial selected, is zero degrees or 180 degrees. If so, then the X register is set to the value of $Y_{OBS}$. In fact, a pointer is established pointing to the address where the value of $Y_{OBS}$ is stored. If the cardinal radial selected is not zero degrees or 180 degrees then it is determined whether the value of AWP SUM is negative.

If the value of AWP SUM is negative then the value of AWP SUM is complemented. If the value of AWP SUM is not negative the value is not complemented. After the complementing step, it is again determined whether the cardinal radial being computed is zero or 180 degrees. If so, then AWP SUM is divided by the value of $Y_{OBS}$. If not, the value of AWP SUM is divided by $X_{OBS}$. In either case, it is then determined whether the result is negative. If so, there is an invalid computation and dashes will be displayed by element 98 pertaining to range. However, if the result is not negative, it is determined whether the result is over-range. In this case, over-range is greater than 299.9 NM. If the result is over-range, an invalid computation display occurs. However, if the result is not over-range, then the result is scaled into nautical miles. This scaling is obtained by division by a factor of 1.48. After scaling into nautical miles, the automatic waypoint diagnostic flag is reset and the sub-routine is exited.

DETAILED SCHEMATICS

Detailed schematic diagrams of RNAV 24, according to the present invention, are shown in FIGS. 9–17. These schematic diagrams, in conjunction with the complete program listing in the appendix for all of the firmware incorporated into RNAV 24, are intended to enable one of ordinary skill in the art to practice the present invention. Even though the schematic diagrams should be clear without detailed description thereof, various important features are described. The dotted line boxes drawn about various portions of the detailed circuit are labeled with reference numeral labels identifying corresponding boxes on the FIG. 5 block diagram. Where more than one such dashed line box correlates to a single block on FIG. 5, postscripts a, b—are utilized. For convenience, the circuit diagrams are presented in a format corresponding to the division of circuits into various circuit boards or sub-assemblies. Thus, various portions of the blocks shown in FIG. 5 may appear on different circuit boards or sub-assemblies.

FIG. 9 details the input portion of VOR D MOD and A/D converter 40. The input NAV/LOC signal is the VOR output from navigation receiver 26. In essence, a VORTAC station transmits a carrier containing 30 Hz. AM and a 9960 Hz. subcarrier containing 30 Hz. FM such that an aircraft, by detecting various phase relationships within the modulation, can determine its bearing with respect to the VORTAC station. Thus, VOR Demodulator and A/D converter 40 includes an NAV reference 9960 Hz. FM detector and means for detecting the phase of modulation with respect to a reference.

Referring to FIG. 10 there is shown a detailed schematic diagram of DME conditioning circuits 44. This circuit conditions the signals derived via line 38 from navigation receiver 26. DME conditioning circuits 44 are configured to accept inputs from three different types of navigation receivers 26 so that the various navigation receivers in common use can be accommodated by RNAV 24. Navigation receivers 26 using a range block output wherein the width of a range block pulse is proportional to the distance as determined by the distance measuring equipment of the navigation receiver, utilize the DME range block input. Navigation receivers 26 of the type that produce a DME pulse pair wherein the spacing of the pulse pair is proportional to the distance measured by the distance measuring equipment utilize the DME pulse pair input. Navigation receivers 26 having an analog output utilize the three inputs marked DME analog high, DME analog low, and DME flag.

Figure 11:
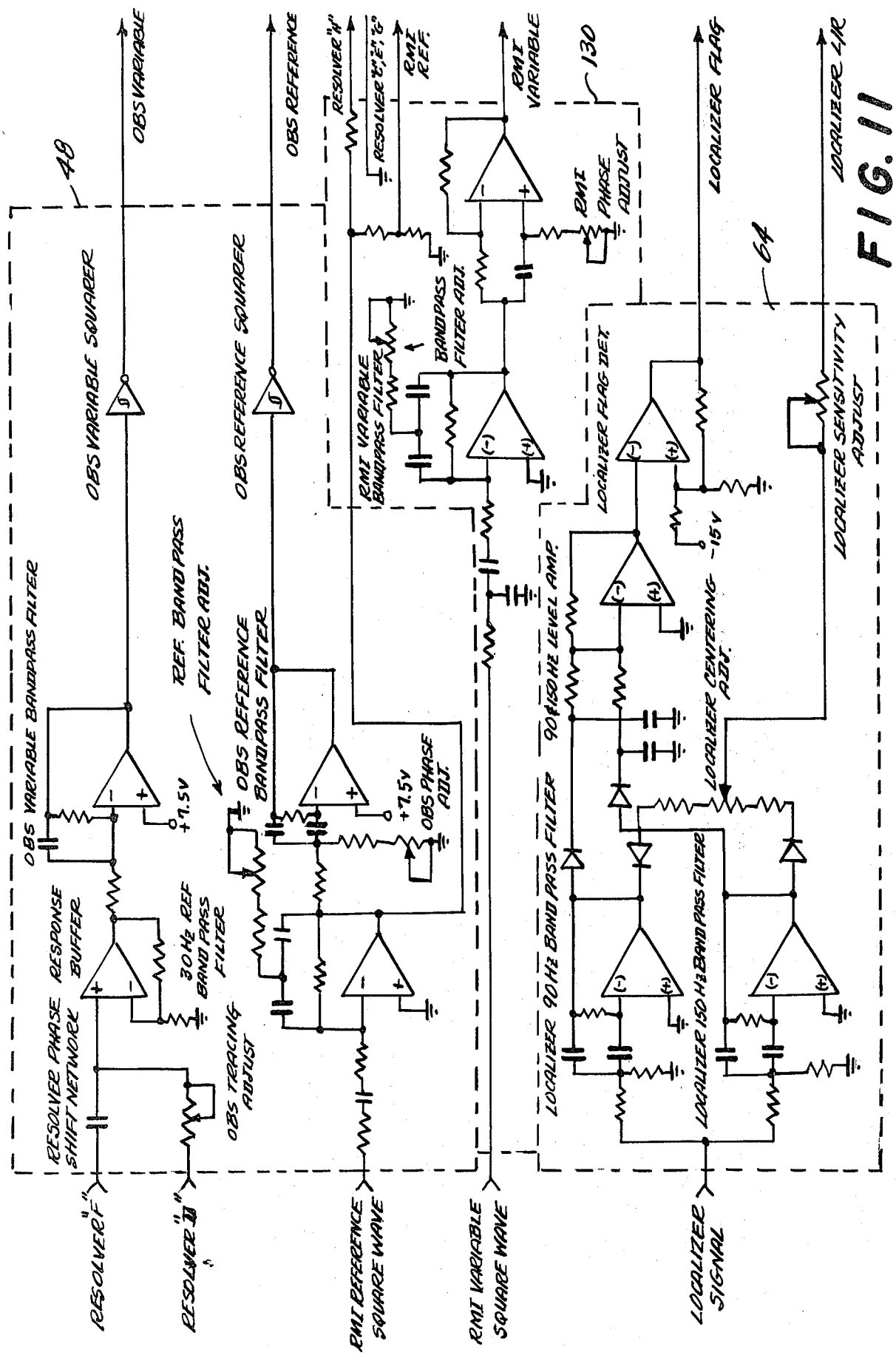
FIG. 11 is a detailed schematic diagram showing OBS conditioning circuits 48 and a localizer (not shown in FIG. 5)

Referring now to FIG. 11 there is shown a more detailed schematic of OBS conditioning circuits 48, localizer 64 and a radio magnetic indicator (RMI). Localizer 64 and RMI 130 are not essential to RNAV 24. However, because these circuits are included in the preferred embodiment of RNAV 24, they are set forth for the sake of completeness. They do not form any part of the present invention.

Referring now to FIG. 12 there are shown additional portions of RNAV 24 including a steering mode shift register 131 maintaining data related to the type of steering (approach, cross-track or enroute) selected; a left/right course deviation shift register 132 and D/A converter 104 (also shown in FIG. 5). Also included on this board are a TO/FROM amplifier 133 for during the TO/FROM flag of HSI/CDI 30 and a course deviation amplifier 134 for driving the steering needle of HSI/CDI 30.

Referring now to FIG. 13 there is shown a detailed schematic diagram of a circuit board on which are incorporated microprocessor and related interface circuits 32, memory 34, counter 56 and counter 58. Memory 34 includes two erasable programmable read only memories (EPROMSs) 150 and 152 and two random access memories (RAMs) 154 and 156. The firmware governing the overall opration of RNAV 24 is stored within EPROMs 150 and 152. As stated, a complete program listing with comments thereon is attached as an Appendix to this patent application. Microprocessor and related interface circuits 32 include a conventional microprocessor 158 and an interface adaptor 160 along with additional interface circuitry shown in this schematic.

Referring now to FIG. 14, there is shown a block diagram of a circuit board including display shift registers 94, display latches, decoders and drivers 96, dash and decimal driver 180 and display elements 98.

Figure 15:
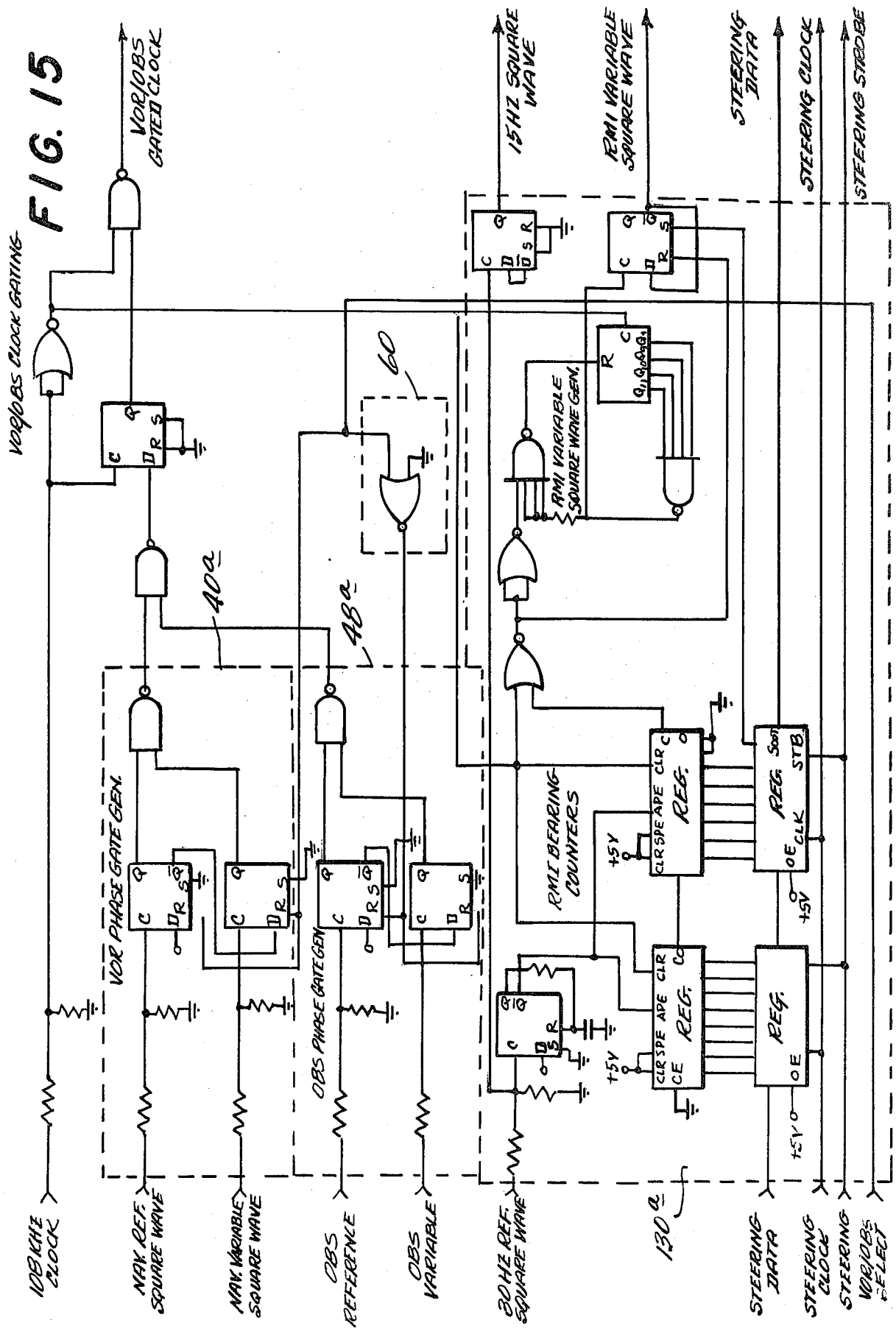
FIG. 15 is a detailed schematic diagram showing further detail of the VOR and OBS clock gating circuitry and the RMI (not a part of the present invention and not shown on FIG. 5)

Referring now to FIG. 15, there is shown detailed schematic diagram including additional portions of VOR d MOD and A/D converter 40, OBS conditioning circuit 48, switch 60, and RMI 130. Again, RMI 130 represents an "add-on" feature of RNAV 24 but forms no part of the present invention. Its use is in no way connected with the conventional navigation operation of RNAV 24 or the generating and storage of an automatic cardinal waypoint.

Figure 16:
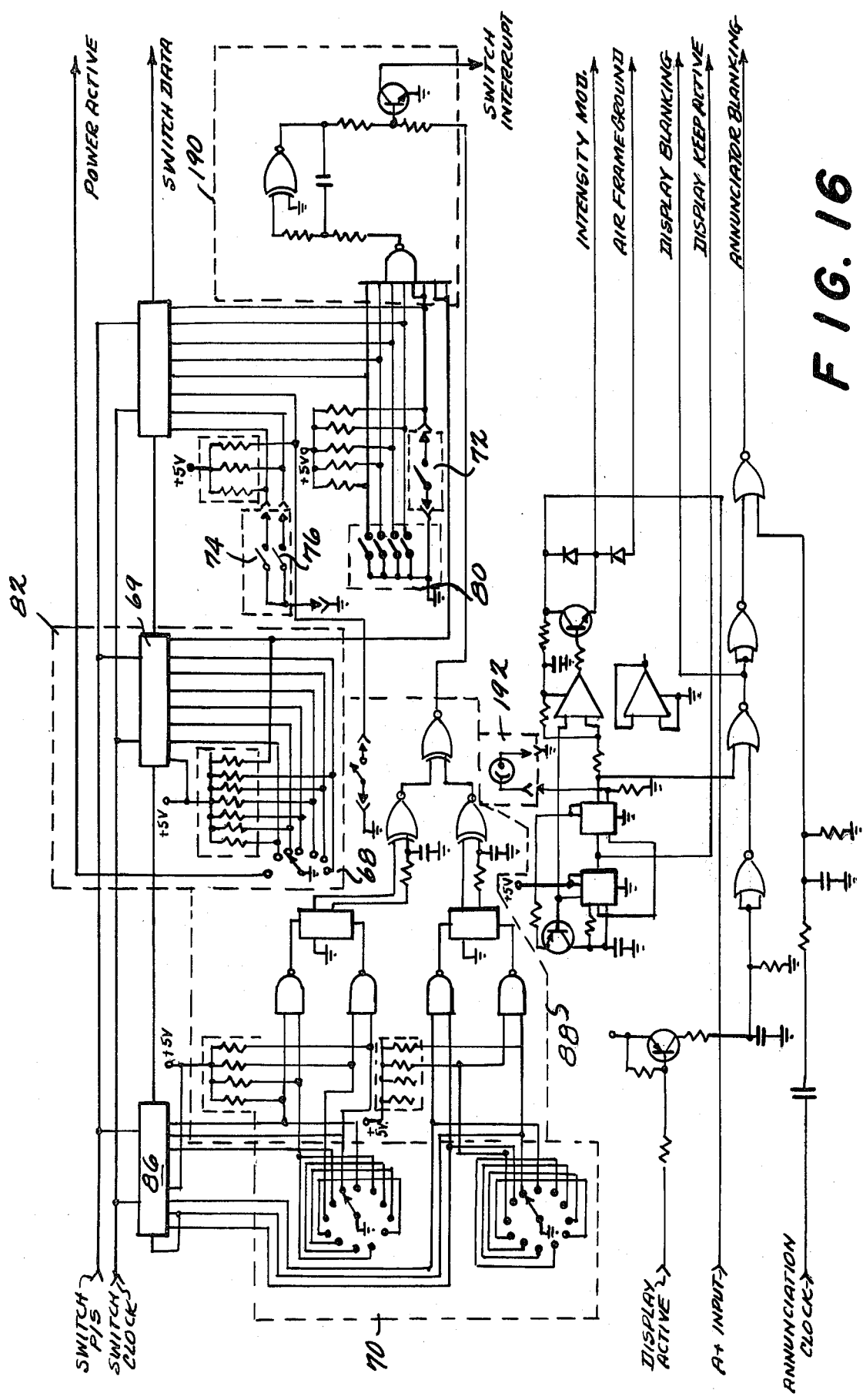
FIG. 16 is a detailed schematic diagram showing various data input circuits and mode control circuits.

Referring now to FIG. 16 there is shown a schematic diagram of another of the circuit boards for RNAV 24. This board includes data switches 70, mode switch 68, auto waypoint switch 72, VOR-DME switch 74, KTS-MIN 76 and waypoint switches 80. The board also includes a switch interrupt generator 88 and data switch shift register 86. Data switches 70, data switch shift register 86 and switch interrupt generator 88 are configured such that rotation of the data switches is interpreted as incremental changes of a data value. There are no fixed values related to the various switch positions. Rather, rotating data switches 70, merely increments or decrements, depending upon the direction of rotation, the values stored in data switch shift register 86. The circuitry on this board not related to the various switches pertains to display driving circuitry for determining the intensity to which various lamps acting as annunciators and display elements 98 will be driven. A photocell 192 senses the ambient light level within the cockpit of the aircraft and adjusts the various lamp intensities so as to achieve a comfortable reading level of all annunciators and displays. This portion of the circuitry is not shown on the FIG. 5 block diagram.

Figure 17:
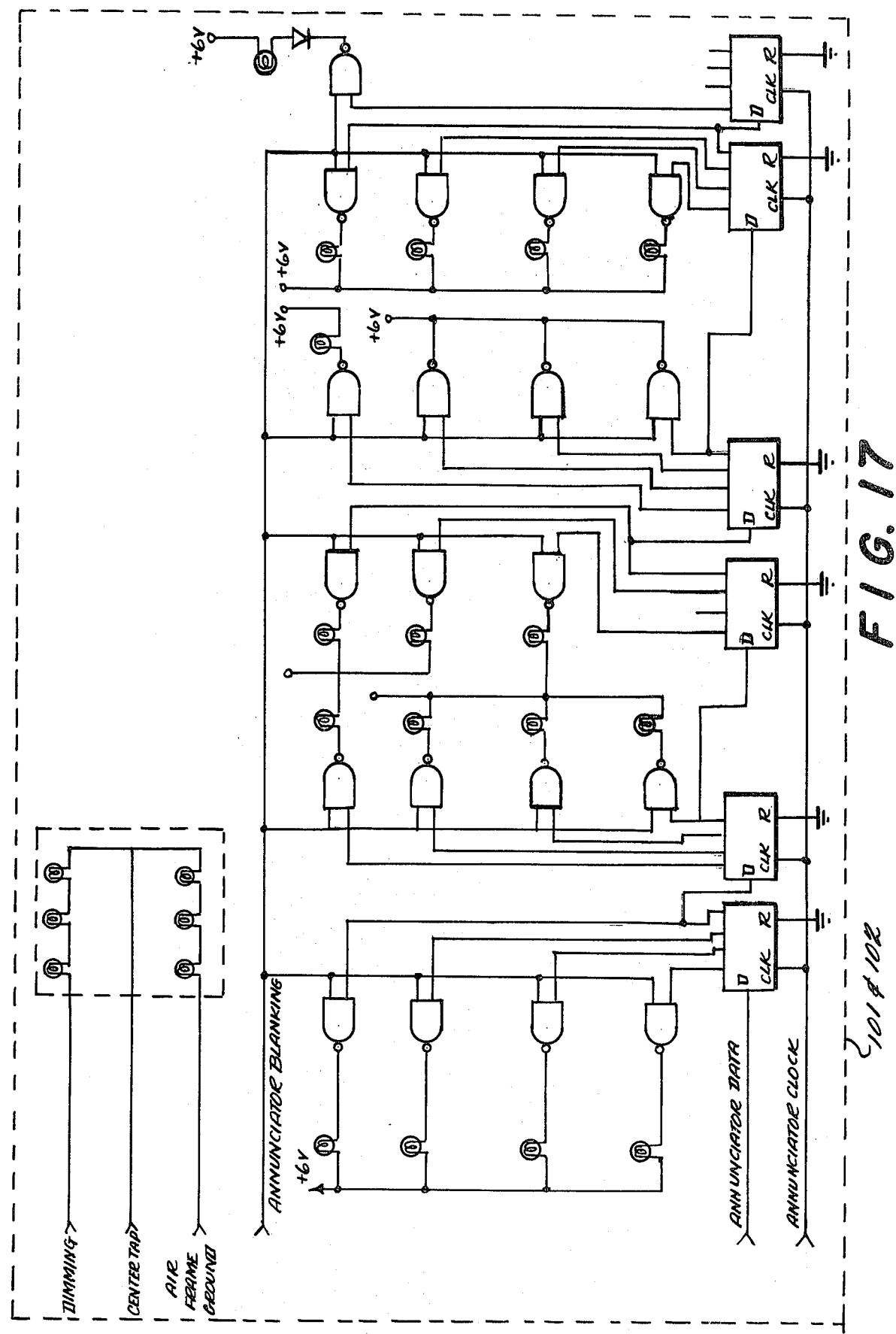
FIG. 17 is a detailed schematic diagram showing annunciator drivers and displays 102 and 100.

Referring now to FIG. 17, there is shown a detailed block diagram of annunciator drives 102 and annunciator displays 100. The annunciators are lamps coupled with various indicia marked on a front display panel of RNAV 24 to indicate various modes of operation and data entry and retrieval.

A suitable power supply can be provided for powering the various circuits shown in FIGS. 9-17.

There has therefore been provided an RNAV device incorporating means for automatically determining waypoints at the intersection of cardinal radials of VORTAC stations with an aircraft's intended RNAV course. Development of the automatic cardinal waypoint feature, particularly in combination with the availability of four (4) conventional ("hard") waypoints, makes possible a grealy simplified cockpit procedure for both enroute and near terminal navigation. A pilot has the opportunity to employ a standardized procedure for his arrival navigation in the arrival terminal area. The procedure utilizes the numbered waypoints in a specific manner to greatly minimize confusion among crew members and procedurizes the operation of a single pilot flight management. After entering the frequency of the first to be used VORTAC station prior to departure, the pilot determines an initial magnetic course line defining his path toward a destination and a suitable cardinal radial from that VORTAC station which provides a suitable waypoint intercept of his magnetic course line with that radial. The pilot has a choice of four cardinal radials (0°, 90°, 180° or 270°). For each cardinal radial selected, RNAV 24 automatically computes the range from the VORTAC station to the intercept point along the course line. The pilot can select any of the four radials by dialing or rotating the data knob. With the mode selector switch in the "SET" position, the value of a distance (range) appears in the righthand side of a digital display. This represents the position of the automatic waypoint from the VORTAC station defined by the range along the cardinal radial selected. A pilot can verify the proper value of the range appearing on the disply by scaling his chart used for trip planning. If the distance, as double-checked, is determined to be too great, the pilot may cause the distance to be made smaller by rotating his omni-directional bearing selector (OBS) to achieve that result. Thus, with the aid of automatic cardinal radials, the pilot can enter slight course corrections and refine his intended route from waypoint to waypoint. After navigating a first leg of the trip based on signals from a first VORTAC station, the pilot can tune in a second VORTAC station and repeat the same procedure. By noting his progress in using successive VORTAC stations and keeping track on his chart, the pilot can insure that the automatic waypoints are properly falling near his assumed flight path. The pilot can verify the proper setting of his OBS by observing where the course line lies along the cardinal radial selected. Alternatively, the pilot can judiciously correct for magnetic variation from one VORTAC station to another.

When an aircraft nears its destination or the initial arrival fix in a terminal area, the pilot may elect to use the "fifth" automatic waypoint in a different manner. During the enroute phase of flight, the automatic cardinal waypoint mode was used as the fifth waypoint. The fifth waypoint has additional capabilities in that, by placing the mode selector of RNAV 24 in the radial distance RAD/DIST position and selecting the fifth waypoint for programming, it may be used to enter a specific address waypoint (hard waypoint). For example, a pilot could plot a waypoint on destination from his last enroute VORTAC station. This provides a distance to go to initial approach fix or terminal arrival fix and time to go. This data will be based on reception of signals from an appropriate enroute VORTAC.

During this near to the end phase of flight, a pilot can determine the expected approach or approaches in use at his intended arrival airport. With this knowledge he can program the No. 1 hard waypoint as an initial approach fix or arrival fix based on radial and distance from the terminal VORTAC station. The terminal area VORTAC station may not be in use in this point of navigation because it still is at an excessive distance but will be used when the aircraft arrives in the terminal area and within the reception range thereof. Thus, the initial arrival fix can be programmed as a waypoint from two different VORTAC stations.

When the aircraft is able to receive the terminal area VORTAC station, the aircraft position data thus available can be used by selecting waypoint 1. Some time prior to arrival over waypoint 1 in the terminal area, the aircraft may come under radar vector control of the terminal area controller. Thus, the pilot may not actually pass over waypoint number 1 even though his prior clearance indicated that was the arrival fix. In any event, when the pilot comes within control of the approach controller, he is basically under radar vector navigation.

When it is determined that the aircraft will not be navigating over waypoint number 1 or if it has continued navigation to that fix, the pilot then selects waypoint 2 which is the final approach fix for the approach then in use at the destination airport. The advantage of the RNAV function at this phase of flight is that the pilot is given continuous and accurate position information of his aircraft relative to the next fix over which he expects to pass during his approach procedures. Thus, there are now two modes of monitoring the progress and position of the flight. One is the ground controller and the other is the pilot in the aircraft.

In a similar manner, the pilot can program a waypoint defining the airport or touch down zone of the active runway as waypoint number 3. Under one set of circumstances, waypoint 3 would be selected after the aircraft has passed waypoint 2. If RNAV 24 is used in conjunction with a Range Monitor configuration, it continues to provide bearing and range information relative to a waypoint when the pilot has selected localizer signals for steering and glide slope information.

Again, the availability in RNAV 24 of four numbered "hard" way points for the purposes stated permits a high proceduralized method of operation to be used in the cockpit. Thus, waypoint number 1 is always the initial arrival fix or altitude crossing restriction. Waypoint 2 is always the final approach fix and waypoint 3 is always the runway or airport address. In a similar manner, waypoint 4 can be used as the missed approach holding fix.

In the meantime the fifth waypoint is available. The fifth waypoint can be programmed for an alternate airport. This could be programmed as a waypoint off of the final approach VORTAC station. In the event that the pilot elects to proceed to his destination, this feature gives him immediate navigation to this new fix. This is particularly helpful under the circumstances because the reason the pilot elected to proceed to an alternate was that he does not have sufficient fuel to remain in the original destination area for any extended additional time.

As an alternative to the embodiment previously described, the automatic cardinal waypoint arrangement could be implemented as a 0°/180° and 90°/270° configuration. In such an alternative embodiment, only two cardinal radial choices would be available to the pilot, i.e., 0°/180° and 90°/270°. If the aircraft is flying North or South, the pilot would select 90°/270°. The automatic waypoint arrangement would automatically chose either the 90° or 270° radial for interception with the chosen course line, dependency on which side of the course line the VORTAC station was on. Similarly, if the aircraft is flying East-West, the pilot would select the 0°/180° radial. The automatic waypoint arrangement would automatically choose either the 0°/180° radial. The automatic waypoint arrangement would automatically choose either the 0° or 180° radial for interception with the chosen course line, depending on which side of the course line the VORTAC station was on.

The automatic cardinal waypoint arrangement is not limited to navigation from only VORTAC radio station signals. By appropriate substitution of a navigation receiver and the addition of any required interface circuitry, the automatic cardinal waypoint arrangement could also be used with LORAN and other types of radio defined navigational radio fixes.

Obviously, other embodiments and modifications of the present invention will be apparent to those of ordinary skill in the art having the benefit of the teachings presented in the foregoing description, drawings and program listing. It is therefore to be understood that such other embodiments and modifications are intended to be within the scope of the appended claims.

RNAV 612 MATH ROUTINES...... PAGE 0001

APPENDIX TO U.S. Application of
George B. Foster
Paul D. Gibbs
Michael A. Smyser entitled AUTOMATIC WAYPOINT AREA
NAVIGATION SYSTEM
filed concurrently herewith 19 JUNE 80   © 1980 Foster Airdata Systems, Inc.

```
LINE # LOC     CODE      LINE 0002  0000              ;
0003  0000              ;      19 JUNE 80
0004  0000
0005  0000              ; ***** RAM REGISTER ASSIGNMENTS *****
0006  0000              ;
0007  0000                      *=$0000
0008  0000              ;
0009  0000              IND0    *=*+2
0010  0002              IND2    *=*+2
0011  0004              IND4    *=*+2
0012  0006              NBYT    *=*+1
0013  0007              NSHFT   *=*+1
0014  0008              IREG    *=*+1
0015  0009              JREG    *=*+1
0016  000A              TEMP1   *=*+1
0017  000B              TEMP2   *=*+1
0018  000C              TEMP3   *=*+1
0019  000D              QR      *=*+1
0020  000E              FNC     *=*+2
0021  0010                      *=*-1
0022  000F              K       *=*+2
0023  0011              TWOK    *=*+2
0024  0013              MD      *=*+6
0025  0019                      *=*+1
0026  001A              TIME    *=*+1
0027  001B              SWTIME  *=*+1
0028  001C              DMEDIA  *=*+1
0029  001D                      *=*+2
0030  001F              DSPTIM  *=*+1
0031  0020                      *=*-1
0032  001F              XR      *=*+4
0033  0023              YR      *=*+4
0034  0027              XT      *=*+4
0035  002B              YT      *=*+4
0036  002F              AR      *=*+4
0037  0033              CR      *=*+4
0038  0037              X1      *=*+4
0039  003B              Y1      *=*+4
0040  003F              X4      *=*+4
0041  0043              Y4      *=*+4
0042  0047                      *=$001F
0043  001F              NEWNO   *=*+2
0044  0021              IMED    *=*+3
0045  0024              OUTPUT  *=*+3
0046  0027              CORR    *=*+3
0047  002A                      *=*+1
0048  002B              HIT     *=*+1
0049  002C                      *=*-1
0050  002B              AT      *=*+2
0051  002D              TAT     *=*+2
0052  002F              I1      *=*+3
0053  0032                      *=*+1
0054  0033              SIND    *=*+2
0055  0035              SFLGS   *=*+1
0056  0036                      *=$0047
0057  0047              NAV1    *=*+2
0058  0049              DME     *=*+2
0059  004B              NAV2    *=*+2
0060  004D              ACALT   *=*+2
0061  004F              SMOVOR  *=*+4
0062  0053              SMODME  *=*+4
```

```
0063  0057            OBS     *=*+2
0064  0059            XTK     *=*+2
0065  005B            WPRAD   *=*+2
0066  005D            WPDIST  *=*+2
0067  005F            BTW     *=*+2
0068  0061            DTW     *=*+2
0069  0063            GSP     *=*+2
0070  0065            TTG     *=*+2
0071  0067                    *=*+1
0072  0068            FLAGS   *=*+1
0073  0069            LR      *=*+1
0074  006A            CVSGNS  *=*+1
0075  006B            CVSIN   *=*+1
0076  006C            CVCOS   *=*+1
0077  006D            DATALO  *=*+1
0078  006E            DATAHI  *=*+1
0079  006F            DATA    *=*+1
0080  0070            MODE    *=*+1
0081  0071            FUNCTN  *=*+1
0082  0072            ROUFLG  *=*+1
0083  0073            DIAG    *=*+1
0084  0074            ACTWP   *=*+1
0085  0075            PROGWP  *=*+1
0086  0076                    *=$0079
0087  0079            SITEMP  *=*+1
0088  007A            PSHBUT  *=*+1
0089  007B                    *=$007F
0090  007F            DMES    *=*+12
0091  008B            NV1S    *=*+12
0092  0097            NV2S    *=*+12
0093  00A3            GSTIM   *=*+12
0094  00AF                    *=$00AF
0095  00AF            WPRAD1  *=*+4
0096  00B3            WPFRQ1  *=*+4
0097  00B7                    *=$00CF
0098  00CF            AWPRHD  *=*+2
0099  00D1            AWPDST  *=*+2
0100  00D3            .FILE BMATH
0102  00D3            ;               8 AUG 79
0103  00D3            ;
0104  00D3            ; ***** BASIC MATH ROUTINES *****
0105  00D3            ;
0106  00D3                    *=$5000
0107  5000            ;
0108  5000                            ; ***** ADDITION SUBROUTINE *****
0109  5000                            ;
0110  5000                            ;   ENTER WITH ACC.=OPERAND
0111  5000                            ;   AND  XREG=OPERATOR+NBYT
0112  5000                            ;
0113  5000  85 00     ADDA    STA IND0
0114  5002  A4 06     ADD     LDY NBYT
0115  5004  18                CLC
0116  5005  B1 00     AD1     LDA (IND0),Y
0117  5007  75 00             ADC 00,X
0118  5009  95 00             STA 00,X
0119  500B  CA                DEX
0120  500C  88                DEY
0121  500D  D0 F6             BNE AD1
0122  500F  60                RTS
0123  5010                            ;
0124  5010                            ; ***** SUBTRACTION SUBROUTINE *****
0125  5010                            ;
0126  5010                            ;   ENTER WITH ACC.=OPERATOR
0127  5010                            ;   AND  XREG=OPERAND+NBYT
0128  5010                            ;
0129  5010  85 02     SUBTA   STA IND2
0130  5012  A4 06     SUBT    LDY NBYT
0131  5014  38                SEC
```

```
0132  5015  B5 00       SUB1    LDA 00,X
0133  5017  F1 02               SBC (IND2),Y
0134  5019  95 00               STA 00,X
0135  501B  CA                  DEX
0136  501C  88                  DEY
0137  501D  D0 F6               BNE SUB1
0138  501F  60                  RTS
0139  5020
0140  5020                              ; ***** COMPLIMENT SUBROUTINE *****
0141  5020                              ;
0142  5020                              ;   ENTER WITH XREG=ADDRESS+NBYT
0143  5020                              ;
0144  5020  A4 06       COMP    LDY NBYT
0145  5022  38          NCOMP   SEC
0146  5023  A9 00       COMP1   LDA #0
0147  5025  F5 00               SBC 00,X
0148  5027  95 00               STA 00,X
0149  5029  CA                  DEX
0150  502A  88                  DEY
0151  502B  D0 F6               BNE COMP1
0152  502D  60                  RTS
0153  502E
0154  502E                              ; ***** DIGIT SHIFT SUBROUTINE *****
0155  502E                              ;
0156  502E                              ;   ENTER WITH ACC.=ADDRESS
0157  502E                              ;
0158  502E  85 04       RSHIFT  STA IND4
0159  5030  A6 07       NRSHFT  LDX NSHFT
0160  5032  A4 06       RSRPT   LDY NBYT
0161  5034  B1 04       LODR    LDA (IND4),Y
0162  5036  20 77 50            JSR RSHFT
0163  5039  85 0A               STA TEMP1
0164  503B  88                  DEY
0165  503C  F0 0D               BEQ ROUT
0166  503E  B1 04               LDA (IND4),Y
0167  5040  20 7C 50            JSR LSHFT
0168  5043  C8                  INY
0169  5044  05 0A               ORA TEMP1
0170  5046  91 04               STA (IND4),Y
0171  5048  88                  DEY
0172  5049  D0 E9               BNE LODR
0173  504B  C8          ROUT    INY
0174  504C  91 04               STA (IND4),Y
0175  504E  CA                  DEX
0176  504F  D0 E1               BNE RSRPT
0177  5051  60                  RTS
0178  5052
0179  5052  85 04       LSHIFT  STA IND4
0180  5054  A6 07       NLSHFT  LDX NSHFT
0181  5056  A0 01       LSRPT   LDY #01
0182  5058  B1 04       LODL    LDA (IND4),Y
0183  505A  20 7C 50            JSR LSHFT
0184  505D  85 0A               STA TEMP1
0185  505F  C4 06               CPY NBYT
0186  5061  F0 0E               BEQ LOUT
0187  5063  C8                  INY
0188  5064  B1 04               LDA (IND4),Y
0189  5066  20 77 50            JSR RSHFT
0190  5069  88                  DEY
0191  506A  05 0A               ORA TEMP1
0192  506C  91 04               STA (IND4),Y
0193  506E  C8                  INY
0194  506F  D0 E7               BNE LODL
0195  5071  91 04       LOUT    STA (IND4),Y
0196  5073  CA                  DEX
0197  5074  D0 E0               BNE LSRPT
0198  5076  60                  RTS
0199  5077
```

```
0200  5077  4A              RSHFT   LSR A
0201  5078  4A                      LSR A
0202  5079  4A                      LSR A
0203  507A  4A                      LSR A
0204  507B  60                      RTS
0205  507C                                                  ;
0206  507C  0A              LSHFT   ASL A
0207  507D  0A                      ASL A
0208  507E  0A                      ASL A
0209  507F  0A                      ASL A
0210  5080  60                      RTS
0211  5081                          .FILE MLTDIV
0213  5081                  ;
0214  5081                  ; ***** MULTIPLY & DIVIDE ROUTINES *****
0215  5081                  ;              17 AUG 1979
0216  5081                  ;
0217  5081                          *=$5088
0218  5088                  ;
0219  5088                  ; ***** MULTIPLY ROUTINE *****
0220  5088                                                  ;
0221  5088                                                  ;   ENTER WITH; MPLR ADDRESS IN X REG
0222  5088                                                  ;   AND   MPLC ADDRESS IN ACCUM.
0223  5088                                                  ;
0224  5088  85 00           MLTPLY  STA IND0
0225  508A  B5 01                   LDA 1,X     ;MOVE MPLR TO MD REG'S.
0226  508C  85 17                   STA MD+4
0227  508E  B5 02                   LDA 2,X
0228  5090  85 18                   STA MD+5
0229  5092  A9 00           NMLTPY  LDA #0      CLEAR PROD. & EXT. REG'S
0230  5094  85 14                   STA MD+1
0231  5096  85 15                   STA MD+2
0232  5098  85 16                   STA MD+3
0233  509A  A9 01           PMLTPY  LDA #1
0234  509C  85 07                   STA NSHFT
0235  509E  A9 04                   LDA #4      ;LOAD DIGIT COUNTER
0236  50A0  85 0C                   STA TEMP3
0237  50A2  A9 13                   LDA #MD
0238  50A4  85 04                   STA IND4
0239  50A6  A9 0F           MP1     LDA #$0F    ;MOVE LSD OF MPLR TO TEMP2
0240  50A8  25 18                   AND MD+5
0241  50AA  F0 15                   BEQ MP3
0242  50AC  85 0B                   STA TEMP2
0243  50AE  A9 02                   LDA #2      ;ADD MPLC TO PROD.
0244  50B0  85 06                   STA NBYT
0245  50B2  A2 16           MP2     LDX #MD+3
0246  50B4  20 02 50                JSR ADD
0247  50B7  A9 00                   LDA #0
0248  50B9  65 14                   ADC MD+1
0249  50BB  85 14                   STA MD+1
0250  50BD  C6 0B                   DEC TEMP2
0251  50BF  D0 F1                   BNE MP2
0252  50C1  A9 05           MP3     LDA #5      ;SHIFT MD REG'S.
0253  50C3  85 06                   STA NBYT    ;ONE DIGIT RIGHT.
0254  50C5  20 30 50                JSR NRSHFT
0255  50C8  C6 0C                   DEC TEMP3
0256  50CA  D0 DA                   BNE MP1
0257  50CC  60                      RTS
0259  50CD                                                  ; ***** DIVIDE ROUTINE *****
0260  50CD                                                  ;
0261  50CD                                                  ;   ENTER WITH; DVDN ADDRESS IN X REG
0262  50CD                                                  ;   AND   DVSR ADDRESS IN ACCUM.
0263  50CD                                                  ;
0264  50CD
0265  50CD                          *=$50CD
0266  50CD                  ;
0267  50CD  85 02           DIVIDE  STA IND2
0268  50CF  A0 04                   LDY #4      ;MOVE DVDN TO MD REG'S.
0269  50D1  B5 04           DV1     LDA 4,X
```

```
0270  50D3  99 13 00            STA MD,Y
0271  50D6  CA                  DEX
0272  50D7  88                  DEY
0273  50D8  D0 F7               BNE DV1
0274  50DA  84 18               STY MD+5         CLEAR MD REGISTERS
0275  50DC  84 19               STY MD+6
0276  50DE  A9 05      DIVIDA   LDA #$05
0277  50E0  85 0B               STA TEMP2
0278  50E2  A0 01      DIVIDB   LDY #01          ;TEST DVSR FOR ZERO
0279  50E4  B1 02               LDA (IND2),Y
0280  50E6  D0 07               BNE DV2
0281  50E8  C8                  INY
0282  50E9  B1 02               LDA (IND2),Y
0283  50EB  C9 02               CMP #2
0284  50ED  90 47               BCC DV10
0285  50EF  A9 01      DV2      LDA #1
0286  50F1  85 07               STA NSHFT
0287  50F3  A9 13               LDA #MD
0288  50F5  85 04               STA IND4
0289  50F7  A9 06               LDA #06
0290  50F9  85 06               STA NBYT
0291  50FB  A5 14      DV3      LDA MD+1         TEST FOR RMDR < DVSR
0292  50FD  D0 10               BNE DV5
0293  50FF  A0 01               LDY #01
0294  5101  B9 14 00   DV4      LDA MD+1,Y
0295  5104  D1 02               CMP (IND2),Y
0296  5106  90 27               BCC DV9
0297  5108  D0 05               BNE DV5
0298  510A  C8                  INY
0299  510B  C0 03               CPY #03
0300  510D  D0 F2               BNE DV4
0301  510F  38         DV5      SEC              SUBTRACT DVSR FROM RMDR
0302  5110  A0 02               LDY #02
0303  5112  B9 14 00   DV6      LDA MD+1,Y
0304  5115  F1 02               SBC (IND2),Y
0305  5117  99 14 00            STA MD+1,Y
0306  511A  88                  DEY
0307  511B  D0 F5               BNE DV6
0308  511D  B0 02               BCS DV7
0309  511F  C6 14               DEC MD+1
0310  5121  38         DV7      SEC              ADD ONE TO QUOTIENT
0311  5122  A2 03               LDX #03
0312  5124  A9 00               LDA #0
0313  5126  75 16      DV8      ADC MD+3,X
0314  5128  95 16               STA MD+3,X
0315  512A  90 CF               BCC DV3
0316  512C  CA                  DEX
0317  512D  D0 F7               BNE DV8
0318  512F  20 54 50   DV9      JSR NLSHFT       SHIFT MD REG'S 1 DIGIT LEFT
0319  5132  C6 0B               DEC TEMP2
0320  5134  D0 C5               BNE DV3
0321  5136  60         DV10     RTS
0322  5137                      .FILE UTLTS
0324  5137               ;              17 AUG 1979
0325  5137               ;
0326  5137               ; ***** UTILITIES ROUTINES *****
0327  5137               ;
0328  5137                      *=$5150
0329  5150
0330  5150               ; ***** CLEAR CORDIC REGISTERS ROUTINE *****
0331  5150               ;
0332  5150  A2 18       CLRREG  LDX #$18
0333  5152  A9 00               LDA #0
0334  5154  95 1F       CR1     STA XR,X
0335  5156  CA                  DEX
0336  5157  D0 FB               BNE CR1
0337  5159  60                  RTS
```

```
0338  515A
0339  515A              ;
0340  515A              ;         ***** BCD TO BINARY CONVERSION *****
0341  515A              ;
0342  515A              ;           CONVERTS NUMBER IN MD+5 & LSD
0343  515A              ;           OF MD+4 TO BINARY.
0344  515A              ;           EXIT WITH BINARY BYTE IN ACC.
0345  515A              ;
0346  515A              *=$5160
0347  5160              ;
0348  5160 A5 17    BCDBIN LDA MD+4    TEST FOR RESULT>99
0349  5162 F0 04           BEQ BB     IF IT IS, SET RESULT=99
0350  5164 A9 99           LDA #$99
0351  5166 85 18           STA MD+5
0352  5168 A5 18    BB     LDA MD+5
0353  516A 20 77 50        JSR RSHFT
0354  516D D0 03           BNE BB1
0355  516F A5 18           LDA MD+5   RETURN IF MSD=0
0356  5171 60              RTS
0357  5172 D8       BB1    CLD
0358  5173 18              CLC
0359  5174 AA              TAX
0360  5175 A9 00           LDA #0
0361  5177 69 0A    BB2    ADC #$0A   CONVERT MSD
0362  5179 CA              DEX
0363  517A D0 FB           BNE BB2
0364  517C 85 0A           STA TEMP1
0365  517E A5 18           LDA MD+5
0366  5180 29 0F           AND #$0F
0367  5182 65 0A           ADC TEMP1  ADD LSD
0368  5184 F8              SED
0369  5185 60              RTS
0370  5186              ;
0371  5186              ;         ***** ROUND-OFF & MOVE ROUTINE *****
0372  5186              ;
0373  5186              ; ROUNDS OFF MD+4,5,&6 AND MOVES
0374  5186              ; MD+4 & MD+5 TO DESTINATION ADDRESS.
0375  5186              ;
0376  5186              ; ENTER WITH DESTINATION ADDRESS +2
0377  5186              ; IN X REGISTER.
0378  5186              ;
0379  5186 18       RNDOFF CLC
0380  5187 A5 19           LDA MD+6
0381  5189 69 50           ADC #$50
0382  518B A5 18           LDA MD+5
0383  518D 69 00           ADC #0
0384  518F 95 00           STA 0,X
0385  5191 CA              DEX
0386  5192 A5 17           LDA MD+4
0387  5194 69 00           ADC #0
0388  5196 95 00           STA 0,X
0389  5198 60              RTS
0390  5199              .FILE CORDIC
0392  5199              ;        8 AUG 79
0393  5199              ;
0394  5199              ; ***** CORDIC ROUTINE *****
0395  5199              ;
0396  5199              *=$5200
0397  5200              ;
0398  5200 A9 00    CORDIC LDA #0    ; SET I=0
0399  5202 85 08           STA IREG
0400  5204 A9 01           LDA #01
0401  5206 85 07           STA NSHFT
0402  5208 A9 04           LDA #04
0403  520A 85 06           STA NBYT
0404  520C A5 0E    LP4    LDA FNC
0405  520E CD AD 52        CMP SLC
0406  5211 F0 21           BEQ LP5
```

```
0407  5213  A5 08              LDA IREG    *ADJUST VALUE OF CR
0408  5215  D0 04              BNE TI1     *ACCORDING TO VALUE
0409  5217  A9 45              LDA #$45    *OF I.
0410  5219  85 35              STA CR+2
0411  521B  C9 01      TI1     CMP #1
0412  521D  D0 08              BNE TI2
0413  521F  A9 05              LDA #05
0414  5221  85 35              STA CR+2
0415  5223  A9 71              LDA #$71
0416  5225  85 36              STA CR+3
0417  5227  C9 02      TI2     CMP #2
0418  5229  D0 04              BNE TI3
0419  522B  A9 30              LDA #$30
0420  522D  85 37              STA CR+4
0421  522F  A9 33      TI3     LDA #CR     * SHIFT CR RIGHT
0422  5231  20 2E 50           JSR RSHIFT  * ONE DIGIT.
0423  5234  A9 09      LP5     LDA #09     ;SET J=9
0424  5236  85 09              STA JREG
0425  5238  A9 27      LP6     LDA #XT     ; MOVE & SHIFT XR TO XT
0426  523A  A2 1F              LDX #XR
0427  523C  20 C7 52           JSR MVSHFT
0428  523F  24 20              BIT XR+1          AND
0429  5241  10 03              BPL LP7
0430  5243  20 E9 52           JSR CMPADJ
0431  5246  A9 2B      LP7     LDA #YT     ;     YR TO YT
0432  5248  A2 23              LDX #YR
0433  524A  20 C7 52           JSR MVSHFT
0434  524D  24 24              BIT YR+1
0435  524F  10 03              BPL JFNC
0436  5251  20 E9 52           JSR CMPADJ
0437  5254  6C 0E 00   JFNC    JMP (FNC)
0438  5257  A9 33      CMP1    LDA #CR     * AR=AR-CR
0439  5259  A2 33              LDX #AR+4
0440  525B  20 10 50           JSR SUBTA
0441  525E  A2 2F      CMP2    LDX #YT+4   *YT=-YT
0442  5260  20 20 50           JSR COMP
0443  5263  4C 72 52           JMP SUM
0444  5266  A9 33      CMP3    LDA #CR     * AR=AR+CR
0445  5268  A2 33              LDX #AR+4
0446  526A  20 00 50           JSR ADDA
0447  526D  A2 2B      CMP4    LDX #XT+4   * XT=-XT
0448  526F  20 20 50           JSR COMP
0449  5272  A9 2B      SUM     LDA #YT     * XR=XR+YT
0450  5274  A2 23              LDX #XR+4
0451  5276  20 00 50           JSR ADDA
0452  5279  A9 27              LDA #XT     * YR=YR+XT
0453  527B  A2 27              LDX #YR+4
0454  527D  20 00 50           JSR ADDA
0455  5280  A5 08              LDA IREG
0456  5282  F0 04              BEQ LP8
0457  5284  C6 09              DEC JREG
0458  5286  D0 B0              BNE LP6
0459  5288  E6 08      LP8     INC IREG
0460  528A  A9 04              LDA #4
0461  528C  C5 08              CMP IREG
0462  528E  D0 01              BNE JLP4
0463  5290  60                 RTS
0464  5291  4C 0C 52   JLP4    JMP LP4
0465  5294                                 ;
0466  5294                                 ; ***** SLC COMPARE ROUTINE *****
0467  5294                                 ;
0468  5294  A2 00      SRCR    LDX #0
0469  5296  A5 24              LDA YR+1
0470  5298  30 10              BMI SRCR3
0471  529A  E8         SRCR1   INX
0472  529B  E0 05              CPX #5
0473  529D  F0 08              BEQ SRCR2
0474  529F  B5 23              LDA YR,X
```

```
0475  52A1  D5 33              CMP CR,X
0476  52A3  F0 F5              BEQ SRCR1
0477  52A5  90 03              BCC SRCR3
0478  52A7  4C 6D 52    SRCR2  JMP CMP4    IF YR>=CR
0479  52AA  4C 5E 52    SRCR3  JMP CMP2    IF YR< CR
0480  52AD  94 52       SRC    .WORD SRCR
0481  52AF                                 ;
0482  52AF                                 ; ***** RESOLVER COMPARE ROUTINE *****
0483  52AF                                 ;
0484  52AF  24 30       RESR   BIT AR+1
0485  52B1  30 03              BMI RESR1
0486  52B3  4C 57 52           JMP CMP1    IF AR>=0
0487  52B6  4C 66 52    RESR1  JMP CMP3    IF AR< 0
0488  52B9  AF 52       RES    .WORD RESR
0489  52BB                                 ;
0490  52BB                                 ; ***** VECTOR COMPARE ROUTINE *****
0491  52BB                                 ;
0492  52BB  24 24       VECR   BIT YR+1
0493  52BD  30 03              BMI VECR1
0494  52BF  4C 66 52           JMP CMP3    IF YR>=0
0495  52C2  4C 57 52    VECR1  JMP CMP1    IF YR< 0
0496  52C5  BB 52       VEC    .WORD VECR
0497  52C7                                 ;
0498  52C7                                 ; ***** MOVE & SHIFT ROUTINE *****
0499  52C7                                 ;
0500  52C7  85 04       MVSHFT STA IND4
0501  52C9  86 02              STX IND2
0502  52CB  A0 00              LDY #0
0503  52CD  A5 08              LDA IREG
0504  52CF  4A                 LSR A
0505  52D0  08                 PHP
0506  52D1  F0 06              BEQ MV1 ; BRANCH IF I=0 OR 1
0507  52D3  98                 TYA
0508  52D4  C8                 INY
0509  52D5  91 04              STA (IND4),Y
0510  52D7  C6 02              DEC IND2
0511  52D9  C8          MV1    INY         ;      MOVE OR TO OT
0512  52DA  B1 02              LDA (IND2),Y
0513  52DC  91 04              STA (IND4),Y
0514  52DE  C0 04              CPY #4
0515  52E0  D0 F7              BNE MV1
0516  52E2  28                 PLP
0517  52E3  90 03              BCC MV2 ; BRANCH IF I=0 OR 2
0518  52E5  20 30 50           JSR NRSHFT
0519  52E8  60          MV2    RTS
0520  52E9                                 ;
0521  52E9                                 ; ***** COMPLIMENT ADJUST ROUTINE *****
0522  52E9                                 ;
0523  52E9  A4 08       CMPADJ LDY IREG
0524  52EB  88                 DEY
0525  52EC  D0 01              BNE CM1 ; BRANCH IF I>1
0526  52EE  C8                 INY
0527  52EF  A9 99       CM1    LDA #$99
0528  52F1  91 04              STA (IND4),Y
0529  52F3  88                 DEY
0530  52F4  F0 02              BEQ CM2 ; BRANCH IF I=1 OR 2
0531  52F6  91 04              STA (IND4),Y
0532  52F8  60          CM2    RTS
0533  52F9                     .FILE RESLVR
0534  52F9                     19 JUNE 80
0535  52F9                                 ;
0536  52F9                                 ;
0537  52F9              ; ***** RESOLVER ROUTINE *****
0538  52F9                     ;
0539  52F9                                 ; ENTER WITH XR=DISTANCE, YR=0, AND AR=ANGLE
0540  52F9                                 ;   AR MUST BE <360.0'.
0541  52F9                     ;
0542  52F9                     *=$5300
0543  5300
```

```
0544  5300  A9 03        RESLVR LDA #3
0545  5302  85 06               STA NBYT
0546  5304  A9 AF               LDA #$AF
0547  5306  85 0E               STA FNC
0548  5308  A9 FF               LDA #$FF
0549  530A  85 0D               STA QR
0550  530C  38                  SEC         SUCCESSIVELY SUBTRACT
0551  530D  A5 31               LDA AR+2    90' FROM AR UNTIL AR<0
0552  530F  E6 0D        RS1    INC QR
0553  5311  E9 09               SBC #$09
0554  5313  10 FA               BPL RS1
0555  5315  85 31               STA AR+2
0556  5317  A5 0D               LDA QR      TEST QR=1 OR 3
0557  5319  4A                  LSR A
0558  531A  B0 0A               BCS RS2
0559  531C  18                  CLC         ADD 90' TO AR IF
0560  531D  A9 09               LDA #$09    QR=0 OR 2.
0561  531F  65 31               ADC AR+2
0562  5321  85 31               STA AR+2
0563  5323  4C 2B 53            JMP JPCORD
0564  5326  A2 33        RS2    LDX #AR+4
0565  5328  20 20 50            JSR COMP
0566  532B  20 00 52     JPCORD JSR CORDIC
0567  532E  A5 0D               LDA QR
0568  5330  F0 14               BEQ RSOUT
0569  5332  C9 03               CMP #3
0570  5334  F0 0B               BEQ RS3
0571  5336  A2 23               LDX #XR+4
0572  5338  20 20 50            JSR COMP
0573  533B  A5 0D               LDA QR
0574  533D  C9 01               CMP #1
0575  533F  F0 05               BEQ RSOUT
0576  5341  A2 27        RS3    LDX #YR+4
0577  5343  20 20 50            JSR COMP
0578  5346  60           RSOUT  RTS
0579  5347                      .FILE DMESLC
0581  5347               ;         19 JUNE 80
0582  5347               ;
0583  5347               ; ***** DME SLANT RANGE CORRECT ROUTINE *****
0584  5347               ;
0585  5347                      *=$534C
0586  534C                                  ;
0587  534C  A9 94        DMESLC LDA #$94    SET FUNCTION=SLC
0588  534E  85 0E               STA FNC
0589  5350  20 50 51            JSR CLRREG
0590  5353  A9 66               LDA #$66    CORRECT ALT TO NM.
0591  5355  85 18               STA MD+5
0592  5357  A9 24               LDA #$24
0593  5359  85 17               STA MD+4
0594  535B  A9 4D               LDA #ACALT
0595  535D  85 00               STA IND0
0596  535F  20 92 50            JSR NMLTPY
0597  5362  A2 03               LDX #03     MOVE RESULT TO CR
0598  5364  B5 14        SLC1   LDA MD+1,X
0599  5366  95 34               STA CR+1,X
0600  5368  CA                  DEX
0601  5369  D0 F9               BNE SLC1
0602  536B  A2 04               LDX #$04    MOVE SMODME TO XR
0603  536D  B5 53        SLC2   LDA SMODME,X
0604  536F  95 1F               STA XR,X
0605  5371  CA                  DEX
0606  5372  D0 F9               BNE SLC2
0607  5374  20 00 52            JSR CORDIC
0608  5377  A2 1F               LDX #XR     DIVIDE XR BY K
0609  5379  A9 0F               LDA #K
0610  537B  20 CD 50            JSR DIVIDE
0611  537E  20 50 51            JSR CLRREG
0612  5381  A2 03               LDX #$03    MOVE RESULT OF DIVIDE TO XR
```

```
0613  5383  B5 16        SLC3   LDA MD+3,X
0614  5385  95 20               STA XR+1,X
0615  5387  CA                  DEX
0616  5388  D0 F9               BNE SLC3
0617  538A  4C 9C 53            JMP AV1A        JUMP TO A-VECT ROUTINE
0618  538D                .FILE ABVECT
0620  538D               ;               8 AUG 79
0621  538D               ;
0622  538D               ; ***** A & B VECTOR ROUTINES *****
0623  538D               ;
0624  538D                      *=$5390
0625  5390               ;
0626  5390                                      ; **** A-VECTOR ROUTINE ****
0627  5390                                      ;
0628  5390  20 50 51     AVECT  JSR CLRREG
0629  5393  A2 04               LDX #04         MOVE SMODME TO XR
0630  5395  B5 53        AV1    LDA SMODME,X
0631  5397  95 1F               STA XR,X
0632  5399  CA                  DEX
0633  539A  D0 F9               BNE AV1
0634  539C  A2 04        AV1A   LDX #$04        MOVE SMOVOR TO AR
0635  539E  B5 4F        AV2    LDA SMOVOR,X
0636  53A0  95 2F               STA AR,X
0637  53A2  CA                  DEX
0638  53A3  D0 F9               BNE AV2
0639  53A5  20 00 53            JSR RESLVR
0640  53A8  A2 08               LDX #$08        MOVE XR TO X1 AND
0641  53AA  B5 1F        AV3    LDA XR,X           YR TO Y1
0642  53AC  95 37               STA X1,X
0643  53AE  CA                  DEX
0644  53AF  D0 F9               BNE AV3
0645  53B1  60                  RTS
0646  53B2                                      ; **** B-VECTOR ROUTINE ****
0647  53B2                                      ;
0648  53B2               ;
0649  53B2                      *=$53C0
0650  53C0                                      ;
0651  53C0  20 50 51     BVECT  JSR CLRREG
0652  53C3  A5 5F               LDA WPDIST+2    MOVE WPDIST TO XR
0653  53C5  85 22               STA XR+3
0654  53C7  A5 5E               LDA WPDIST+1
0655  53C9  85 21               STA XR+2
0656  53CB  A5 5D               LDA WPRAD+2     MOVE WPRAD TO AR
0657  53CD  85 32               STA AR+3
0658  53CF  A5 5C               LDA WPRAD+1
0659  53D1  85 31               STA AR+2
0660  53D3  20 00 53            JSR RESLVR
0661  53D6  A2 08               LDX #$08        MOVE XR TO X4
0662  53D8  B5 1F        BV1    LDA XR,X        AND YR TO Y4
0663  53DA  95 3F               STA X4,X
0664  53DC  CA                  DEX
0665  53DD  D0 F9               BNE BV1
0666  53DF  60                  RTS
0667  53E0                      .FILE XTVECT
0669  53E0               ;               8 AUG 79
0670  53E0               ; ***** XTK VECTOR ROUTINE *****
0671  53E0               ;
0672  53E0                      *=$5400
0673  5400               ;
0674  5400  20 50 51     XVECT  JSR CLRREG
0675  5403  A5 5B               LDA XTK+2       MOVE XTK TO XR
0676  5405  85 22               STA XR+3
0677  5407  A5 5A               LDA XTK+1
0678  5409  85 21               STA XR+2
0679  540B  A5 58               LDA OBS+1       ADJUST & MOVE OBS TO AR
0680  540D  24 5A               BIT XTK+1          TEST XTK +OR-
0681  540F  30 0C               BMI XV1
0682  5411  18                  CLC             RIGHT XTK
```

```
0683  5412  69 09           ADC #$09        ADD 90.0'
0684  5414  C9 36           CMP #$36
0685  5416  90 15           BCC XV3         BRANCH IF ACC<360
0686  5418  E9 36           SBC #$36
0687  541A  4C 2D 54        JMP XV3
0688  541D  38       XV1    SEC             LEFT XTK
0689  541E  E9 09           SBC #$09          SUBTRACT 90.0'
0690  5420  B0 02           BCS XV2         BRANCH IF ACC>=0
0691  5422  69 36           ADC #$36
0692  5424  48       XV2    PHA
0693  5425  A0 02           LDY #$02        COMP. XTK
0694  5427  A2 22           LDX #XR+3
0695  5429  20 22 50        JSR NCOMP
0696  542C  68              PLA
0697  542D  85 31    XV3    STA AR+2
0698  542F  A5 59           LDA OBS+2
0699  5431  85 32           STA AR+3
0700  5433  20 00 53        JSR RESLVR
0701  5436  A9 04           LDA #$04        ADD XR TO X4 AND
0702  5438  85 06           STA NBYT         YR TO Y4.
0703  543A  A9 1F           LDA #XR
0704  543C  A2 43           LDX #X4+4
0705  543E  20 00 50        JSR ADDA
0706  5441  A9 23           LDA #YR
0707  5443  A2 47           LDX #Y4+4
0708  5445  20 00 50        JSR ADDA
0709  5448  60              RTS
0710  5449                  .FILE CVECT
0711  5449
0712  5449              ;   28 MAY 80
0713  5449              ;
0714  5449              ; ***** C-VECTOR ROUTINE *****
0715  5449              ;
0716  5449              ADDA   =$5000
0717  5449              COMP   =$5020
0718  5449              DIVIDE =$50CD
0719  5449              CLRREG =$5150
0720  5449              RNDOFF =$5186
0721  5449              CORDIC =$5200
0722  5449
0723  5449                     *=$5450
0724  5450                                  ;
0725  5450  A9 04    CVECT   LDA #$04
0726  5452  85 06            STA NBYT
0727  5454  A2 43            LDX #X4+4       COMP. X4 & Y4
0728  5456  20 20 50         JSR COMP
0729  5459  A2 47            LDX #Y4+4
0730  545B  20 20 50         JSR COMP
0731  545E  A9 37            LDA #X1         ADD X1 TO X4
0732  5460  A2 43            LDX #X4+4
0733  5462  20 00 50         JSR ADDA
0734  5465  A9 3B            LDA #Y1         ADD Y1 TO Y4
0735  5467  A2 47            LDX #Y4+4
0736  5469  20 00 50         JSR ADDA
0737  546C  A2 43            LDX #X4+4       COMP. X4 & Y4
0738  546E  20 20 50         JSR COMP
0739  5471  A2 47            LDX #Y4+4
0740  5473  20 20 50         JSR COMP
0741  5476  20 50 51         JSR CLRREG
0742  5479  A5 44            LDA Y4+1        ADJUST X4 AND Y4
0743  547B  0A               ASL A           SIGNS AND STORE
0744  547C  A9 00            LDA #0          IN TEMP3 & CVSGNS.
0745  547E  2A               ROL A
0746  547F  85 0C            STA TEMP3
0747  5481  A5 40            LDA X4+1
0748  5483  0A               ASL A
0749  5484  26 0C            ROL TEMP3
0750  5486  A5 0C            LDA TEMP3
0751  5488  85 6A            STA CVSGNS
```

```
0752  548A  4A             LSR A
0753  548B  45 0C          EOR TEMP3
0754  548D  85 0C          STA TEMP3
0755  548F  24 40          BIT X4+1       COMP. X4 IF NEG.
0756  5491  10 05          BPL CV2
0757  5493  A2 43          LDX #X4+4
0758  5495  20 20 50       JSR COMP
0759  5498  24 44    CV2   BIT Y4+1       COMP. Y4 IF NEG.
0760  549A  10 05          BPL CV3
0761  549C  A2 47          LDX #Y4+4
0762  549E  20 20 50       JSR COMP
0763  54A1  A2 08    CV3   LDX #$08       MOVE X4 AND Y4
0764  54A3  B5 3F    CV4   LDA X4,X       TO   XR AND YR
0765  54A5  95 1F          STA XR,X
0766  54A7  CA             DEX
0767  54A8  D0 F9          BNE CV4
0768  54AA  A9 BB          LDA #$BB       SET FUNCTION=VECTOR
0769  54AC  85 0E          STA FNC
0770  54AE  20 00 52       JSR CORDIC
0771  54B1  24 30          BIT AR+1       IF AR IS NEG, COMPLIMENT.
0772  54B3  10 05          BPL CV4A
0773  54B5  A2 33          LDX #AR+4
0774  54B7  20 20 50       JSR COMP
0775  54BA  46 0C    CV4A  LSR TEMP3      IF X4 AND Y4 SIGNS
0776  54BC  90 0C          BCC CV6        ARE NOT =, COMP. AR
0777  54BE  A2 33          LDX #AR+4      AND ADD 180'.
0778  54C0  20 20 50       JSR COMP
0779  54C3  A9 18    CV5   LDA #$18
0780  54C5  18             CLC
0781  54C6  65 31          ADC AR+2
0782  54C8  85 31          STA AR+2
0783  54CA  46 0C    CV6   LSR TEMP3      ADD 180' AGAIN IF
0784  54CC  B0 F5          BCS CV5        X4 IS+ AND Y4 IS-.
0785  54CE
0786  54CE  A5 32          LDA AR+3       MOVE AR TO BTW
0787  54D0  85 61          STA BTW+2
0788  54D2  A5 31          LDA AR+2
0789  54D4  85 60          STA BTW+1
0790  54D6  A9 11          LDA #TWOK      DIVIDE XR BY 2K (2.19)
0791  54D8  A2 1F          LDX #XR
0792  54DA  20 CD 50       JSR DIVIDE
0793  54DD  A2 63          LDX #DTW+2     ROUND-OFF & MOVE TO DTW
0794  54DF  20 86 51       JSR RNDOFF
0795  54E2  60             RTS
0796  54E3                 .FILE LRSTR
0798  54E3              ;    19 JUNE 80
0799  54E3              ;
0800  54E3              ; ***** LEFT / RIGHT STEERING ROUTINE *****
0801  54E3              ;
0802  54E3                 COMP   =$5020
0803  54E3                 DIVIDE =$50CD
0804  54E3                 CLRREG =$5150
0805  54E3                 BCDBIN =$5160
0806  54E3                 RESLVR =$5300
0807  54E3
0808  54E3                 NBYT   =$0006
0809  54E3                 K      =$000F
0810  54E3                 XR     =$001F
0811  54E3                 YR     =$0023
0812  54E3                 AR     =$002F
0813  54E3                 SMOVOR =$004F
0814  54E3                 OBS    =$0057
0815  54E3                 WPRAD  =$005B
0816  54E3                 BTW    =$005F
0817  54E3                 DTW    =$0061
0818  54E3                 FLAGS  =$0068
0819  54E3                 LR     =$0069
0820  54E3                 MODES  =$0070
```

```
0821  54E3                    PSHBUT =$007A
0822  54E3                    NV1S   =$0086
0823  54E3
0824  54E3                           *=$5530
0825  5530              ;
0826  5530                                        ; **** FLAG TEST ROUTINES ****
0827  5530                                        ;
0828  5530  20 50 51   LRSTR  JSR CLRREG
0829  5533  A9 FC             LDA #$FC            RESET T/F FLAGS
0830  5535  25 68             AND FLAGS
0831  5537  AA                TAX
0832  5538  29 10             AND #$10            TEST FOR LOC. FLAG
0833  553A  F0 03             BEQ STR1
0834  553C  86 68             STX FLAGS           RETURN IF LOC.
0835  553E  60                RTS
0836  553F  8A         STR1   TXA
0837  5540  48                PHA
0838  5541  29 C0             AND #$C0            TEST FOR VOR OR R/M
0839  5543  F0 1C             BEQ STR3            BRANCH TO RNAV PRESTEER
0840  5545                                        ;
0841  5545                                        ; **** VOR PRESTEERING ROUTINE ****
0842  5545                                        ;
0843  5545  A9 84      STR2   LDA #$84            SET XR TO 28.4 NM.
0844  5547  85 22             STA XR+3
0845  5549  A9 02             LDA #$02
0846  554B  85 21             STA XR+2
0847  554D  A5 92             LDA NV1S+7          SET AR=RECIP. OF NV1S,OUTPUT-10
0848  554F  85 32             STA AR+3
0849  5551  A5 91             LDA NV1S+6
0850  5553  18                CLC                 OBTAIN RECIP. OF NV1S
0851  5554  69 17             ADC #$17
0852  5556  C9 36             CMP #$36
0853  5558  90 02             BCC STR2A
0854  555A  E9 36             SBC #$36
0855  555C  85 31      STR2A  STA AR+2
0856  555E  4C 93 55          JMP STEER
0857  5561                                        ;
0858  5561                                        ; **** RNAV PRESTEERING ROUTINE ****
0859  5561                                        ;
0860  5561  A0 01      STR3   LDY #$01
0861  5563  A5 70             LDA MODES           TEST FOR APPROACH
0862  5565  29 10             AND #$10
0863  5567  F0 02             BEQ STR4
0864  5569  A0 04             LDY #$04
0865  556B  A2 5F      STR4   LDX #BTW            TEST FOR "TEST"
0866  556D  A5 7A             LDA PSHBUT
0867  556F  29 04             AND #$04
0868  5571  F0 02             BEQ STR4A
0869  5573  A2 5B             LDX #WPRAD
0870  5575  18         STR4A  CLC                 MOVE BTW OR WPOST TO XR.
0871  5576  B5 04             LDA $04,X           MULTIPLY BY 4 IF APPROACH
0872  5578  65 22             ADC XR+3
0873  557A  85 22             STA XR+3
0874  557C  B5 03             LDA $03,X
0875  557E  65 21             ADC XR+2
0876  5580  85 21             STA XR+2
0877  5582  A9 00             LDA #0
0878  5584  65 20             ADC XR+1
0879  5586  85 20             STA XR+1
0880  5588  88                DEY
0881  5589  D0 EA             BNE STR4A
0882  558B  B5 02             LDA $02,X           MOVE BTW OR WPRAD TO AR
0883  558D  85 32             STA AR+3
0884  558F  B5 01             LDA $01,X
0885  5591  85 31             STA AR+2
0886  5593                                        ;
0887  5593                                        ; **** STEERING ROUTINE ****
0888  5593                                        ;
```

```
0889  5593  A5 31       STEER   LDA AR+2      IF AR >= 360, SUBTRACT 360 FROM AR
0890  5595  C9 36               CMP #$36
0891  5597  90 05               BCC STR5A     BRANCH IF AR < 360
0892  5599  38                  SEC
0893  559A  E9 36               SBC #$36
0894  559C  85 31               STA AR+2
0895  559E  38          STR5A   SEC           SUBTRACT OBS FROM AR
0896  559F  A5 32               LDA AR+3
0897  55A1  E5 59               SBC OBS+2
0898  55A3  85 32               STA AR+3
0899  55A5  A5 31               LDA AR+2
0900  55A7  E5 58               SBC OBS+1
0901  55A9  B0 02               BCS STR5      BRANCH IF>0.
0902  55AB  69 36               ADC #$36
0903  55AD  85 31       STR5    STA AR+2
0904  55AF  20 00 53            JSR RESLVR
0905  55B2  68                  PLA
0906  55B3  AA                  TAX           ADJUST T/F FLAGS
0907  55B4  E8                  INX           SET T/F=TO
0908  55B5  24 20               BIT XR+1      TEST FOR XR NEG.
0909  55B7  10 01               BPL STR6
0910  55B9  E8                  INX           SET T/F=FROM
0911  55BA  86 68       STR6    STX FLAGS
0912  55BC  24 24               BIT YR+1      TEST FOR YR NEG.
0913  55BE  08                  PHP           SAVE SIGN FOR L/R
0914  55BF  10 09               BPL STR7
0915  55C1  A9 04               LDA #04
0916  55C3  85 06               STA NBYT
0917  55C5  A2 27               LDX #YR+4     COMP. YR
0918  55C7  20 20 50            JSR COMP
0919  55CA  A9 0F       STR7    LDA #K        DIVIDE YR BY K (1.48)
0920  55CC  A2 23               LDX #YR
0921  55CE  20 CD 50            JSR DIVIDE
0922  55D1  20 60 51            JSR BCDBIN    CONVERT BCD TO BINARY
0923  55D4  D8                  CLD
0924  55D5  69 80               ADC #$80      ADD 128 TO L/R
0925  55D7  28                  PLP           TEST FOR L OR R.
0926  55D8  30 02               BMI STR8
0927  55DA  49 FF               EOR #$FF      COMP. IF RIGHT.
0928  55DC  85 69       STR8    STA LR
0929  55DE  F8                  SED
0930  55DF  60                  RTS
0931  55E0                      .FILE AUTOWP
0933  55E0
0934  55E0              ;       10 AUG 80
0935  55E0
0936  55E0              ; ***** AUTO-WAYPOINT ROUTINE *****
0937  55E0              ;
0938  55E0              ADDA    =$5000
0939  55E0              COMP    =$5020
0940  55E0              RSHIFT  =$502E
0941  55E0              MLTPLY  =$5088
0942  55E0              DIVIDB  =$50E2
0943  55E0              CLRREG  =$5150
0944  55E0              RNDOFF  =$5186
0945  55E0              RESLVR  =$5300
0946  55E0
0947  55E0                      *=$5600
0948  5600              ;
0949  5600  A9 08       AUTOWP  LDA #$08      TEST FOR OBS DIAG
0950  5602  25 73               AND DIAG
0951  5604  D0 04               BNE AWP       BRANCH IF OBS DIAG
0952  5606  24 68               BIT FLAGS     TEST FOR R/M
0953  5608  50 03               BVC AWP0      BRANCH IF NO R/M
0954  560A  4C B3 56    AWP     JMP AWP11B
0955  560D  20 50 51    AWP0    JSR CLRREG    RESOLVE OBS VECTOR
0956  5610  A9 0A               LDA #10
0957  5612  85 21               STA XR+2      SET XR=1
```

```
0958  5614  A5 58              LDA OBS+1      MOVE OBS TO AR
0959  5616  85 31              STA AR+2
0960  5618  A5 59              LDA OBS+2
0961  561A  85 32              STA AR+3
0962  561C  20 00 53           JSR RESLVR
0963  561F  A2 08              LDX #$08       MOVE XR & YR TO XT & YT
0964  5621  B5 1F       AWP1   LDA XR,X
0965  5623  95 27              STA XT,X
0966  5625  CA                 DEX
0967  5626  D0 F9              BNE AWP1
0968  5628  A2 08              LDX #$08       MOVE X1 & Y1 TO AR & CR
0969  562A  B5 37       AWP2   LDA X1,X
0970  562C  95 2F              STA AR,X
0971  562E  CA                 DEX
0972  562F  D0 F9              BNE AWP2
0973  5631  A9 04              LDA #04
0974  5633  85 06              STA NBYT
0975  5635  24 28              BIT XT+1       TEST XT & COMP IF NEG
0976  5637  10 05              BPL AWP3
0977  5639  A2 2B              LDX #XT+4
0978  563B  20 20 50           JSR COMP
0979  563E  24 2C       AWP3   BIT YT+1       TEST YT & COMP IF NEG
0980  5640  10 05              BPL AWP4
0981  5642  A2 2F              LDX #YT+4
0982  5644  20 20 50           JSR COMP
0983  5647  24 30       AWP4   BIT AR+1       TEST AR & COMP IF NEG
0984  5649  10 05              BPL AWP5
0985  564B  A2 33              LDX #AR+4
0986  564D  20 20 50           JSR COMP
0987  5650  24 34       AWP5   BIT CR+1       TEST CR & COMP IF NEG
0988  5652  10 05              BPL AWP6
0989  5654  A2 37              LDX #CR+4
0990  5656  20 20 50           JSR COMP
0991  5659  A9 30       AWP6   LDA #AR+1      MULTIPLY X1 BY YR
0992  565B  A2 2C              LDX #YT+1        (AR * YT)
0993  565D  20 88 50           JSR MLTPLY
0994  5660  A2 04              LDX #04        STORE RESULT AT AR
0995  5662  B5 14       AWP7   LDA MD+1,X
0996  5664  95 2F              STA AR,X
0997  5666  CA                 DEX
0998  5667  D0 F9              BNE AWP7
0999  5669  A9 34              LDA #CR+1      MULTIPLY Y1 BY XR
1000  566B  A2 28              LDX #XT+1        (CR * XT)
1001  566D  20 88 50           JSR MLTPLY
1002  5670  A9 04              LDA #04
1003  5672  85 06              STA NBYT
1004  5674  A2 00              LDX #0         ADJUST SIGNS OF X1*YR
1005  5676  A9 08              LDA #08
1006  5678  25 D0              AND AWPRAD+1   TEST AUTO=WP RADIAL
1007  567A  F0 02              BEQ AWP8
1008  567C  A2 80              LDX #$80
1009  567E  86 0A       AWP8   STX TEMP1
1010  5680  A5 38              LDA X1+1
1011  5682  45 24              EOR YR+1
1012  5684  45 0A              EOR TEMP1
1013  5686  10 05              BPL AWP9
1014  5688  A2 33              LDX #AR+4      COMP AR IF NEC.
1015  568A  20 20 50           JSR COMP
1016  568D  A5 3C       AWP9   LDA Y1+1       ADJUST SIGNS OF Y1*XR
1017  568F  45 20              EOR XR+1
1018  5691  45 0A              EOR TEMP1
1019  5693  30 05              BMI AWP10
1020  5695  A2 18              LDX #MD+5      COMP MD IF NEC.
1021  5697  20 20 50           JSR COMP
1022  569A  A9 2F       AWP10  LDA #AR        ADD X1*YR TO Y1*XR
1023  569C  A2 18              LDX #MD+5         RESULT IN MD
1024  569E  20 00 50           JSR ADDA
1025  56A1  A2 1F              LDX #XR        IF AWPRAD=90 OR 270
```

```
1026  56A3  A9 01                LDA #01         THEN XREG=XR
1027  56A5  25 D0                AND AWPRAD+1
1028  56A7  08                   PHP
1029  56A8  D0 02                BNE AWP11
1030  56AA  A2 23                LDX #YR         IF AWPRAD=0 OR 180
1031  56AC  A5 15        AWP11   LDA MD+2        THEN XREG=YR
1032  56AE  55 01                EOR 1,X
1033  56B0  10 08                BPL AWP12
1034  56B2  28           AWP11A  PLP
1035  56B3  A9 02        AWP11B  LDA #$02        IF RESULT OF DIVIDE WILL
1036  56B5  05 73                ORA DIAG        BE NEG, SET AUTOWP FLAG
1037  56B7  85 73                STA DIAG
1038  56B9  60                   RTS
1039  56BA  A5 15        AWP12   LDA MD+2        TEST RESULT OF ADD &
1040  56BC  10 05                BPL AWP13         COMP IF NEG.
1041  56BE  A2 18                LDX #MD+5
1042  56C0  20 20 50             JSR COMP
1043  56C3  A9 28        AWP13   LDA #XT+1       IF AWPRAD=90 OR 270
1044  56C5  28                   PLP             DIVIDE BY XT.
1045  56C6  D0 02                BNE AWP14
1046  56C8  A9 2C                LDA #YT+1       IF AWPRAD=0 RO 180
1047  56CA  85 02        AWP14   STA IND2        DIVIDE BY YT.
1048  56CC  A9 01                LDA #01
1049  56CE  85 07                STA NSHFT
1050  56D0  A9 05                LDA #05
1051  56D2  85 06                STA NBYT
1052  56D4  A9 14                LDA #MD+1
1053  56D6  20 2E 50             JSR RSHIFT      SHIFT RESULT IN MD 1 DIGIT RIGHT.
1054  56D9  A9 06                LDA #06
1055  56DB  85 0B                STA TEMP2
1056  56DD  20 E2 50             JSR DIVIDB
1057  56E0  08                   PHP
1058  56E1  A5 17                LDA MD+4        TEST FOR OVERRANGE
1059  56E3  C9 04                CMP #$04
1060  56E5  90 08                BCC AWP14A      IF OVER RANGE, SET AUTOWP FLAG
1061  56E7  D0 C9                BNE AWP11A
1062  56E9  A5 18                LDA MD+5          AND RETURN.
1063  56EB  C9 44                CMP #$44
1064  56ED  B0 C3                BCS AWP11A
1065  56EF  28           AWP14A  PLP
1066  56F0  A0 03                LDY #03
1067  56F2  A2 02                LDX #02
1068  56F4  B5 15        AWP15   LDA MD+2,X
1069  56F6  95 13                STA MD,X
1070  56F8  E8                   INX
1071  56F9  88                   DEY
1072  56FA  D0 F8                BNE AWP15
1073  56FC  84 14                STY MD+1
1074  56FE  84 18                STY MD+5
1075  5700  84 19                STY MD+6
1076  5702  A9 0F                LDA #K
1077  5704  85 02                STA IND2
1078  5706  A9 06                LDA #06
1079  5708  85 0B                STA TEMP2
1080  570A  20 E2 50             JSR DIVIDB      DIVIDE RESULT BY 1.48
1081  570D  A2 D3                LDX #AWPDST+2
1082  570F  20 86 51             JSR RNDOFF
1083  5712  A9 FD                LDA #$FD        RESET AUTOWP FLAG
1084  5714  25 73                AND DIAG
1085  5716  85 73                STA DIAG
1086  5718  60                   RTS
1087  5719               .FILE GSPTTG
1089  5719
1090  5719               ;       15 JULY 80
1091  5719
1092  5719               IND0    =$0000
1093  5719               IND2    =$0002
```

```
1094  5719                NBYT    =$0006
1095  5719                TEMP2   =$000B
1096  5719                MD      =$0013
1097  5719                NEWNO   =$001F
1098  5719                IMED    =$0021
1099  5719                OUTPUT  =$0024
1100  5719                CORR    =$0027
1101  5719                AT      =$002B
1102  5719                HIT     =$002B
1103  5719                TAT     =$002D
1104  5719                I1      =$002F
1105  5719                SIND    =$0033
1106  5719                SFLGS   =$0035
1107  5719                SMODME  =$0053
1108  5719                DTW     =$0061
1109  5719                GSP     =$0063
1110  5719                TTG     =$0065
1111  5719                FLAGS   =$0068
1112  5719                DIAG    =$0073
1113  5719                ACTWP   =$0074
1114  5719                GSTIM   =$00A3
1115  5719                GSDTG   =$00AB
1116  5719                DIRCNT  =$00AE
1117  5719                CLICKS  =$00AF
1118  5719
1119  5719                LSHIFT  =$5052
1120  5719                MLTPLY  =$5088
1121  5719                DIVIDE  =$50CD
1122  5719                DIVIDB  =$50E2
1123  5719                CLRREG  =$5150
1124  5719                RNDOFF  =$5186
1125  5719                SMOOG   =$5D1A
1126  5719
1127  5719                        *=$5800
1128  5800
1129  5800  20 50 51  GSPTTG JSR CLRREG
1130  5803  24 68             BIT FLAGS       TEST MODE
1131  5805  10 10             BPL GS1         BRANCH IF MODE=RNAV
1132  5807  A9 54             LDA #SMODME+1   SET UP FOR DME GS
1133  5809  85 33             STA SIND
1134  580B  A9 03             LDA #$03        DME CLICK MAX
1135  580D  85 35             STA SFLGS
1136  580F  A9 20             LDA #$20        TEST FOR DME DIAG
1137  5811  25 73             AND DIAG
1138  5813  F0 2B             BEQ GS3         BRANCH IF NO DIAG
1139  5815  D0 1A             BNE GS2         UNCOND BRANCH
1140  5817  A9 61      GS1    LDA #DTW        SET UP FOR RNAV GS
1141  5819  85 33             STA SIND
1142  581B  A9 09             LDA #$09        RNAV CLICK MAX
1143  581D  85 35             STA SFLGS
1144  581F  A9 08             LDA #$08        TEST FOR RNAV DIAG
1145  5821  25 68             AND FLAGS
1146  5823  D0 0C             BNE GS2         BRANCH IF DIAG
1147  5825  A9 10             LDA #$10        TEST FOR ACTWP=AUTOWP
1148  5827  25 74             AND ACTWP
1149  5829  F0 15             BEQ GS3         BRANCH IF NOT AUTOWP
1150  582B  A9 02             LDA #$02        TEST FOR AUTOWP DIAG
1151  582D  25 73             AND DIAG
1152  582F  F0 0F             BEQ GS3         BRANCH IF NO DIAG
1153  5831  A9 04      GS2    LDA #$04        SET GS DIAG FLAG
1154  5833  05 73             ORA DIAG
1155  5835  85 73             STA DIAG
1156  5837  A9 80             LDA #$80        SET GS SKIP FLAG
1157  5839  05 AE             ORA DIRCNT
1158  583B  85 AE             STA DIRCNT
1159  583D  4C 95 58          JMP GS10
1160  5840
1161  5840  A9 04      GS3    LDA #$04        TEST GS DIAG FLAG SET
```

```
1162  5842  25 73                    AND DIAG
1163  5844  D0 14                    BNE GS5         BRANCH IF GS DIAG FLAG SET
1164  5846  A5 A4                    LDA GSTIM+1     TEST GSTIM > 100 SEC
1165  5848  C9 20                    CMP #$20
1166  584A  B0 06                    BCS GS4         BRANCH IF GSTIM > 100 SEC
1167  584C  A5 A6                    LDA GSTIM+3     TEST GSIMED < 60 KTS
1168  584E  C9 12                    CMP #$12
1169  5850  90 08                    BCC GS5         BRANCH IF GSIMED > 60 KTS
1170  5852  A9 04          GS4       LDA #$04        SET GS DIAG FLAG
1171  5854  05 73                    ORA DIAG
1172  5856  85 73                    STA DIAG
1173  5858  D0 3B                    BNE GS10        UNCOND BRANCH
1174  585A
1175  585A  38             GS5       SEC             SUBTRACT DME OR DTW FROM GSDTG
1176  585B  A0 02                    LDY #$02
1177  585D  B9 AB 00       GS6       LDA GSDTG,Y
1178  5860  F1 33                    SBC (SIND),Y    RESULT TO I1
1179  5862  99 30 00                 STA I1+1,Y
1180  5865  88                       DEY
1181  5866  D0 F5                    BNE GS6
1182  5868  B0 0D                    BCS GS8         BRANCH IF RESULT POSITIVE
1183  586A  38                       SEC             COMPLIMENT IF RESULT NEG
1184  586B  A2 02                    LDX #$02
1185  586D  A9 00          GS7       LDA #0
1186  586F  F5 30                    SBC I1+1,X
1187  5871  95 30                    STA I1+1,X
1188  5873  CA                       DEX
1189  5874  D0 F7                    BNE GS7
1190  5876  18                       CLC
1191  5877
1192  5877  A5 31          GS8       LDA I1+2
1193  5879  D0 0F                    BNE MOVDTG      BRANCH IF MSB<>0.
1194  587B  6A                       ROR A           SAVE CARRY IN I1+1 (BIT 6)
1195  587C  6A                       ROR A
1196  587D  85 30                    STA I1+1        1=POS.(DEC):0=NEG.(INC)
1197  587F  A5 32                    LDA I1+3
1198  5881  D0 03                    BNE GS9         BRANCH IF LSB<>0
1199  5883  4C 8F 59                 JMP TTGP
1200  5886
1201  5886  C9 15          GS9       CMP #$15        TEST LSB >= 1.5 NM.
1202  5888  90 16                    BCC CMPSGN      BRANCH IF LSB < 1.5 NM.
1203  588A
1204  588A  A0 02          MOVDTG    LDY #$02        MOVE DME OR DTW TO GSDTG
1205  588C  B1 33                    LDA (SIND),Y
1206  588E  85 AD                    STA GSDTG+2
1207  5890  88                       DEY
1208  5891  B1 33                    LDA (SIND),Y
1209  5893  85 AC                    STA GSDTG+1
1210  5895  A9 00          GS10      LDA #0          INITIALIZE GSTIM & CLICKS
1211  5897  85 A4                    STA GSTIM+1
1212  5899  85 A5                    STA GSTIM+2
1213  589B  85 AF                    STA CLICKS
1214  589D  4C 8F 59                 JMP TTGP
1215  58A0
1216  58A0
1217  58A0  A5 30          CMPSGN    LDA I1+1        COMPARE SIGNS
1218  58A2  45 AE                    EOR DIRCNT
1219  58A4  29 40                    AND #$40
1220  58A6  F0 12                    BEQ ADJDTG      BRANCH IF SIGNS ARE =.
1221  58A8  06 AE                    ASL DIRCNT      SAVE SKIP FLAG
1222  58AA  C6 AE                    DEC DIRCNT
1223  58AC  24 AE                    BIT DIRCNT      TEST FOR NEG
1224  58AE  50 07                    BVC GS11        BRANCH IF DIRCNT > 0
1225  58B0  A5 AE                    LDA DIRCNT      CLEAR DIRCNT
1226  58B2  29 80                    AND #$80
1227  58B4  85 AE                    STA DIRCNT
1228  58B6  38                       SEC             SET SKIP FLAG
1229  58B7  66 AE          GS11      ROR DIRCNT      RECOVER SKIP FLAG
```

```
1230  58B9  60            RTS
1231  58BA
1232  58BA  18       ADJDTG CLC           ADD OR SUBTRACT ONE TO/FR GSDTG
1233  58BB  A2 99         LDX ##99
1234  58BD  24 AE         BIT DIRCNT      ACCORDING TO SIGN IN DIRCNT
1235  58BF  70 03         BVS GS12        BRANCH IF SIGN NEG
1236  58C1  38            SEC
1237  58C2  A2 00         LDX #0
1238  58C4
1239  58C4  8A       GS12 TXA
1240  58C5  65 AD         ADC GSDTG+2
1241  58C7  85 AD         STA GSDTG+2
1242  58C9  8A            TXA
1243  58CA  65 AC         ADC GSDTG+1
1244  58CC  85 AC         STA GSDTG+1
1245  58CE
1246  58CE  A9 3F         LDA ##3F        INCREMENT DIRCNT IF NOT ALREADY MAX
1247  58D0  25 AE         AND DIRCNT
1248  58D2  C9 14         CMP ##14
1249  58D4  B0 04         BCS GS13        BRANCH IF COUNTER = > 20
1250  58D6  E6 AE         INC DIRCNT
1251  58D8  E6 AE         INC DIRCNT
1252  58DA
1253  58DA  38       GS13 SEC             INCREMENT CLICKS
1254  58DB  A5 AF         LDA CLICKS
1255  58DD  69 00         ADC #0
1256  58DF  85 AF         STA CLICKS
1257  58E1
1258  58E1  A5 A6         LDA GSTIM+3     TEST GS IMED > 60 KTS
1259  58E3  C9 12         CMP ##12
1260  58E5  B0 06         BCS GS13A       BRANCH IF GS IMED < 60 KTS
1261  58E7  A9 FB         LDA ##FB        RESET GS DIAG FLAG
1262  58E9  25 73         AND DIAG
1263  58EB  85 73         STA DIAG
1264  58ED
1265  58ED  24 AE    GS13A BIT DIRCNT     TEST FOR GS SKIP FLAG
1266  58EF  10 0D         BPL GSSMO       BRANCH IF NO SKIP FLAG
1267  58F1  A9 05         LDA ##05        TEST FOR GS TIMER >= 30 SEC
1268  58F3  C5 A4         CMP GSTIM+1
1269  58F5  B0 04         BCS GS13B       BRANCH IF GSTIM < 30 SEC
1270  58F7  06 AE         ASL DIRCNT      RESET SKIP FLAG
1271  58F9  46 AE         LSR DIRCNT
1272  58FB  4C 8F 59 GS13B JMP TTGP
1273  58FE
1274  58FE  A5 A4    GSSMO LDA GSTIM+1    DIVIDE GS TIME BY CLICK MAX
1275  5900  85 22         STA NEWNO+3     (NORMALIZE GSTIM)
1276  5902  A5 A5         LDA GSTIM+2
1277  5904  85 23         STA NEWNO+4
1278  5906  A2 1F         LDX #NEWNO
1279  5908  A9 33         LDA #SFLGS-2
1280  590A  20 CD 50      JSR DIVIDE
1281  590D
1282  590D  A5 AF         LDA CLICKS
1283  590F  85 37         STA SFLGS+2
1284  5911  C5 35         CMP SFLGS       TEST CLICKS = MAX
1285  5913  B0 09         BCS GS16        BRANCH IF CLICKS >= MAX
1286  5915  A5 17         LDA MD+4        TEST NGSTIM = MAX
1287  5917  C9 06         CMP ##06
1288  5919  B0 03         BCS GS16        BRANCH IF NGSTIM = MAX
1289  591B  4C 8F 59      JMP TTGP
1290  591E
1291  591E  A2 1F    GS16 LDX #NEWNO      DO GSTIM/CLICKS
1292  5920  A9 35         LDA #SFLGS
1293  5922  20 CD 50      JSR DIVIDE
1294  5925  A2 21         LDX #NEWNO+2
1295  5927  20 86 51      JSR RNDOFF
1296  592A
1297  592A  A2 06         LDX ##06        MOVE GS INFO TO WORKING REGISTERS
```

```
1298  592C  B5 A5      GS17   LDA GSTIM+2,X
1299  592E  95 21             STA IMED,X
1300  5930  CA                DEX
1301  5931  D0 F9             BNE GS17
1302  5933  A9 14             LDA #$14       SET VALUE OF "AT"=.1417
1303  5935  85 2C             STA AT+1
1304  5937  A9 17             LDA #$17
1305  5939  85 2D             STA AT+2
1306  593B  20 1A 5D          JSR SMOOG
1307  593E
1308  593E  A9 00      TIMGS  LDA #0         COMPUTE GS & MOVE TO GSP REG
1309  5940  A2 06             LDX #$06
1310  5942  95 13      GSC    STA MD,X
1311  5944  CA                DEX
1312  5945  D0 FB             BNE GSC
1313  5947  A9 72             LDA #$72
1314  5949  85 16             STA MD+3
1315  594B  A9 00             LDA #$00
1316  594D  85 17             STA MD+4
1317  594F  A9 06             LDA #$06
1318  5951  85 0B             STA TEMP2
1319  5953  A9 03             LDA #$03
1320  5955  85 06             STA NBYT
1321  5957  A2 03             LDX #$03       MOVE OUTPUT TO I1
1322  5959  B5 24      GSC1   LDA OUTPUT,X
1323  595B  95 2F             STA I1,X
1324  595D  CA                DEX
1325  595E  D0 F9             BNE GSC1
1326  5960  A0 04             LDY #$04       SHIFT LEFT UNTIL MSD IN I1+1
1327  5962  A9 F0      GSC2   LDA #$F0
1328  5964  25 30             AND I1+1
1329  5966  D0 0A             BNE GSC3       BRANCH IF MSD<>0
1330  5968  A9 2F             LDA #I1
1331  596A  20 52 50          JSR LSHIFT
1332  596D  E6 0B             INC TEMP2
1333  596F  88                DEY
1334  5970  D0 F0             BNE GSC2
1335  5972  A9 2F      GSC3   LDA #I1
1336  5974  85 02             STA IND2
1337  5976  20 E2 50          JSR DIVIDB
1338  5979  A2 65      MVGSP  LDX #GSP+2     ROUND-OFF RESULT & MOVE TO GSP REG
1339  597B  20 86 51          JSR RNDOFF
1340  597E
1341  597E  A9 00             LDA #0         CLEAR CLICKS & GSTIM
1342  5980  85 AF             STA CLICKS
1343  5982  85 A4             STA GSTIM+1
1344  5984  85 A5             STA GSTIM+2
1345  5986  A2 06             LDX #$06       MOVE IMED & OUTPUT TO
1346  5988  B5 21      GSC4   LDA IMED,X     STORAGE REGISTERS
1347  598A  95 A5             STA GSTIM+2,X
1348  598C  CA                DEX
1349  598D  D0 F9             BNE GSC4
1350  598F
1351  598F  A9 00      TTGP   LDA #0         TIME TO GO ROUTINE
1352  5991  85 2E             STA TAT+1
1353  5993  A9 60             LDA #$60
1354  5995  85 2F             STA TAT+2      (DME OR DTW)* 60 / GSP
1355  5997  A2 2D             LDX #TAT
1356  5999  A5 33             LDA SIND
1357  599B  20 88 50          JSR MLTPLY
1358  599E  A9 63             LDA #GSP
1359  59A0  85 02             STA IND2
1360  59A2  A9 07             LDA #$07
1361  59A4  85 0B             STA TEMP2
1362  59A6  20 E2 50          JSR DIVIDB
1363  59A9  A2 67             LDX #TTG+2     ROUND-OFF RESULT & MOVE TO TTG
```

```
1364  59AB  20 86 51            JSR RNDOFF
1365  59AE  60                  RTS
1366  59AF                  .FILE RMISC
1367  59AF
1368  59AF
1369  59AF              ;         18 JUNE 80
1370  59AF
1371  59AF              IND0   =$0000
1372  59AF              NBYT   =$0006
1373  59AF              TEMP1  =$000A
1374  59AF              TEMP2  =$000B
1375  59AF              XR     =$001F
1376  59AF              XT     =$0027
1377  59AF              AR     =$002F
1378  59AF              SMOVOR =$004F
1379  59AF              BTW    =$005F
1380  59AF              RMISIN =$006B
1381  59AF              RMICOS =$006C
1382  59AF              PSHBUT =$007A
1383  59AF
1384  59AF              COMP   =$5020
1385  59AF              CLRREG =$5150
1386  59AF              RESLVR =$5300
1387  59AF
1388  59AF                      *=$5A00
1389  5A00
1390  5A00  20 50 51    RMISC   JSR CLRREG
1391  5A03  A9 83               LDA #$83         SET XR=00 00 85 83
1392  5A05  85 23               STA XR+4
1393  5A07  A9 85               LDA #$85
1394  5A09  85 22               STA XR+3
1395  5A0B  A9 01               LDA #$01         TEST FOR PRES. POS.
1396  5A0D  25 7A               AND PSHBUT
1397  5A0F  F0 0F               BEQ RMI1         BRANCH IF NOT PRES. POS.
1398  5A11  A5 53               LDA SMOVOR+4     MOVE RECIPRICAL OF SMOVOR
1399  5A13  85 33               STA AR+4             TO AR.
1400  5A15  A5 52               LDA SMOVOR+3
1401  5A17  85 32               STA AR+3
1402  5A19  18                  CLC              OBTAIN RECIP. OF SMOVOR
1403  5A1A  A9 18               LDA #$18
1404  5A1C  65 51               ADC SMOVOR+2
1405  5A1E  D0 06               BNE RMI2         UNCOND. BRANCH
1406  5A20  A5 61       RMI1    LDA BTW+2        MOVE BTW TO AR
1407  5A22  85 32               STA AR+3
1408  5A24  A5 60               LDA BTW+1
1409  5A26  C9 36       RMI2    CMP #$36         TEST MSB >= 360'
1410  5A28  90 03               BCC RMI3         BRANCH IF < 360'
1411  5A2A  38                  SEC              SUBTRACT 360'
1412  5A2B  E9 36               SBC #$36
1413  5A2D  85 31       RMI3    STA AR+2
1414  5A2F  20 00 53            JSR RESLVR
1415  5A32  A9 04               LDA #$04
1416  5A34  85 06               STA NBYT
1417  5A36  A9 1F               LDA #XR          PROCESS COSINE
1418  5A38  20 45 5A            JSR RMISUB
1419  5A3B  85 6C               STA RMICOS
1420  5A3D  A9 23               LDA #XR+4        PROCESS SINE
1421  5A3F  20 45 5A            JSR RMISUB
1422  5A42  85 6B               STA RMISIN
1423  5A44  60                  RTS
1424  5A45
1425  5A45
1426  5A45  85 00       RMISUB  STA IND0         MOVE DATA TO XT
1427  5A47  A0 04               LDY #$04
1428  5A49  B1 00       RMIS1   LDA (IND0),Y
1429  5A4B  99 27 00            STA XT,Y
1430  5A4E  88                  DEY
1431  5A4F  D0 F8               BNE RMIS1
1432  5A51  24 28               BIT XT+1         TEST FOR NEG
```

```
1433   5A53   08                   PHP                SAVE STATUS
1434   5A54   10 05                BPL RMIS2          BRANCH IF POS
1435   5A56   A2 2B                LDX #XT+4          COMP IF NEG
1436   5A58   20 20 50             JSR COMP
1437   5A5B   18          RMIS2    CLC                ROUND-OFF
1438   5A5C   A9 50                LDA #$50
1439   5A5E   65 2B                ADC XT+4
1440   5A60   A9 00                LDA #0
1441   5A62   65 2A                ADC XT+3
1442   5A64   85 0A                STA TEMP1          SAVE LSBYT
1443   5A66   A9 00                LDA #0             DO BCD TO BINARY CONVERSION
1444   5A68   65 29                ADC XT+2
1445   5A6A   F0 02                BEQ RMIS3          BRANCH IF MSBYT=0
1446   5A6C   A9 64                LDA #$64           SET BINBYT=100 IF MSBYT=1
1447   5A6E   85 0B       RMIS3    STA TEMP2          SAVE BINBYT
1448   5A70   78                   SEI
1449   5A71   D8                   CLD
1450   5A72   A5 0A                LDA TEMP1          CONVERT MSBIT OF LSBYT
1451   5A74   4A                   LSR A
1452   5A75   4A                   LSR A
1453   5A76   4A                   LSR A
1454   5A77   4A                   LSR A
1455   5A78   F0 0B                BEQ RMIS5          BRANCH IF DIGIT=0
1456   5A7A   AA                   TAX
1457   5A7B   A5 0B                LDA TEMP2
1458   5A7D   18                   CLC
1459   5A7E   69 0A       RMIS4    ADC #$0A           CONVERT DIGIT TO BIN
1460   5A80   CA                   DEX
1461   5A81   D0 FB                BNE RMIS4          BRANCH IF X<>0
1462   5A83   85 0B                STA TEMP2          SAVE BINBYT
1463   5A85   A9 0F       RMIS5    LDA #$0F           ADD LSDIGIT
1464   5A87   25 0A                AND TEMP1
1465   5A89   18                   CLC
1466   5A8A   65 0B                ADC TEMP2
1467   5A8C   28                   PLP                RECOVER SIGN
1468   5A8D   10 02                BPL RMIS6          BRANCH IF SIGN IS POS
1469   5A8F   09 80                ORA #$80           SET NEG SIGN
1470   5A91   F8          RMIS6    SED
1471   5A92   58                   CLI
1472   5A93   60                   RTS
1473   5A94               .FILE NV1SMO
1475   5A94
1476   5A94               ;        20 JUNE 80
1477   5A94               CLRREG =$5150
1478   5A94
1479   5A94                        *=$5B00
1480   5B00
1481   5B00               ; ************************************
1482   5B00               ; * NAV SMOOOTHING ROUTINES
1483   5B00               ; ************************************
1484   5B00
1485   5B00   A5 48       NV1SMO   LDA NAV1+1         MOVE NAV1 TO NV1S (TEMP)
1486   5B02   85 8C                STA NV1S+1
1487   5B04   A5 49                LDA NAV1+2
1488   5B06   85 8D                STA NV1S+2
1489   5B08   20 50 51             JSR CLRREG
1490   5B0B   A9 8B                LDA #NV1S
1491   5B0D   85 33                STA SIND
1492   5B0F   20 A0 5C             JSR SMOMOV
1493   5B12   20 56 5B             JSR INCOR          DO INPUT (NEWNO) CORRECTION
1494   5B15   20 D3 5C             JSR SMOSUB
1495   5B18   24 35                BIT SFLGS          TEST FOR OUT-OF-RANGE
1496   5B1A   50 10                BVC NS2            BRANCH IF NOT OUT-OF-RANGE
1497   5B1C   20 5A 5C    NS1      JSR MISS           DO MISS IF OUT-OF-RANGE
1498   5B1F   24 35                BIT SFLGS          TEST FOR DIAG CONDITION
1499   5B21   10 2F                BPL NS5            BRANCH IF NO ACTION ON DIAG
1500   5B23   A9 80                LDA #$80           SET NAV1 DIAG FLAG
```

```
1501  5B25  05 73              ORA DIAG
1502  5B27  85 73              STA DIAG
1503  5B29  4C 52 5B           JMP NS5
1504  5B2C  A9 C0       NS2    LDA #$C0        TEST FOR VOR OR R/M FLAGS
1505  5B2E  25 68              AND FLAGS
1506  5B30  F0 0A              BEQ NS3         BRANCH IF NO VOR OR R/M
1507  5B32  A9 17              LDA #$17        SET "AT" FOR 2.5 SEC.
1508  5B34  85 2C              STA AT+1
1509  5B36  A9 04              LDA #$04        SET "TAT" FOR AT/4
1510  5B38  85 2E              STA TAT+1
1511  5B3A  D0 03              BNE NS4         UNCOND. BRANCH
1512  5B3C  20 99 5B    NS3    JSR COMPAT      IF RNAV, DO COMPUTE "AT"
1513  5B3F  20 FF 5C    NS4    JSR SMOOTH
1514  5B42  20 75 5B           JSR OUTCOR      DO OUTPUT NUMBER CORRECT
1515  5B45  20 83 5C           JSR HITS
1516  5B48  24 35              BIT SFLGS       TEST FOR DIAG CONDITION
1517  5B4A  10 06              BPL NS5         BRANCH IF NO ACTION
1518  5B4C  A9 7F              LDA #$7F        RESET NAV1 DIAG FLAG
1519  5B4E  25 73              AND DIAG
1520  5B50  85 73              STA DIAG
1521  5B52  20 AB 5C    NS5    JSR MOVSMO
1522  5B55  60                 RTS
1523  5B56
1524  5B56              ; ******************************
1525  5B56              ; * INPUT CORRECTION ROUTINE
1526  5B56              ; ******************************
1527  5B56
1528  5B56  A5 20       INCOR  LDA NEWNO+1
1529  5B58  A6 25              LDX OUTPUT+1
1530  5B5A  E0 36              CPX #$36
1531  5B5C  B0 0A              BCS IC1         BRANCH IF OUTPUT > 360
1532  5B5E  C9 35              CMP #$35
1533  5B60  90 0D              BCC IC2         BRANCH IF NEWNO < 350
1534  5B62  38                 SEC
1535  5B63  E9 36              SBC #$36        SUBTRACT 360 FROM NEWNO
1536  5B65  4C 6F 5B           JMP IC2
1537  5B68  C9 10       IC1    CMP #$10
1538  5B6A  B0 03              BCS IC2         BRANCH IF NEWNO >= 10
1539  5B6C  18                 CLC
1540  5B6D  69 36              ADC #$36        ADD 360 TO NEWNO
1541  5B6F  18          IC2    CLC
1542  5B70  69 01              ADC #$01        ADD 10 TO NEWNO
1543  5B72  85 20              STA NEWNO+1
1544  5B74  60                 RTS
1545  5B75
1546  5B75              ; ******************************
1547  5B75              ; * OUTPUT CORRECTION ROUTINE
1548  5B75              ; ******************************
1549  5B75
1550  5B75  A5 25       OUTCOR LDA OUTPUT+1
1551  5B77  C9 37              CMP #$37
1552  5B79  90 0D              BCC OC1         BRANCH IF OUTPUT < 370
1553  5B7B  38                 SEC
1554  5B7C  E9 36              SBC #$36        SUBTRACT 360 FROM OUTPUT & IMED
1555  5B7E  85 25              STA OUTPUT+1
1556  5B80  38                 SEC
1557  5B81  A5 22              LDA IMED+1
1558  5B83  E9 36              SBC #$36
1559  5B85  85 22              STA IMED+1
1560  5B87  60                 RTS
1561  5B88  C9 01       OC1    CMP #$01
1562  5B8A  B0 0C              BCS OC2         BRANCH IF OUTPUT >= 10
1563  5B8C  18                 CLC
1564  5B8D  69 36              ADC #$36        ADD 360 TO OUTPUT & IMED
1565  5B8F  85 25              STA OUTPUT+1
1566  5B91  18                 CLC
1567  5B92  A5 22              LDA IMED+1
```

```
1568  5B94  69 36              ADC #$36
1569  5B96  85 22              STA IMED+1
1570  5B98  60         OC2     RTS
1571  5B99
1572  5B99                     ; **********************************
1573  5B99                     ; * COMPUTE "AT" ROUTINE
1574  5B99                     ; **********************************
1575  5B99
1576  5B99  A9 02      COMPAT  LDA #$02
1577  5B9B  85 2C              STA AT+1
1578  5B9D  A9 50              LDA #$50
1579  5B9F  85 2F              STA TAT+2       SET AT FOR 20 SEC.
1580  5BA1  60                 RTS
1581  5BA2              .FILE NV2SMO
1582  5BA2
1583  5BA2
1584  5BA2                     ;       19 JUNE 80
1585  5BA2
1586  5BA2              CLRREG =$5150
1587  5BA2
1588  5BA2                     *=$5BB0
1589  5BB0
1590  5BB0  A9 3F      NV2SMO  LDA #$3F        NAV2 SMOOTHING
1591  5BB2  25 4C              AND NAV2+1      MOVE NAV2 TO NV2S
1592  5BB4  85 98              STA NV2S+1
1593  5BB6  A5 4D              LDA NAV2+2
1594  5BB8  85 99              STA NV2S+2
1595  5BBA  20 50 51           JSR CLRREG
1596  5BBD  A9 97              LDA #NV2S       SET IND. REG. = NV2S
1597  5BBF  85 33              STA SIND
1598  5BC1  20 A0 5C           JSR SMOMOV
1599  5BC4  20 56 5B           JSR INCOR       DO INPUT CORRECT
1600  5BC7  20 D3 5C           JSR SMOSUB
1601  5BCA  24 35              BIT SFLGS       TEST FOR OUT-OF-RANGE
1602  5BCC  50 10              BVC N2S2        BRANCH IF NOT OUT-OF-RANGE
1603  5BCE  20 5A 5C           JSR MISS
1604  5BD1  24 35              BIT SFLGS       TEST FOR DIAG ACTION
1605  5BD3  10 1F              BPL N2S5        BRANCH IF NO DIAG ACTION
1606  5BD5  A9 40              LDA #$40        SET NAV2 DIAG FLAG
1607  5BD7  05 73              ORA DIAG
1608  5BD9  85 73              STA DIAG
1609  5BDB  4C F4 5B           JMP N2S5
1610  5BDE  20 99 5B   N2S2    JSR COMPAT      COMPUTE "AT"
1611  5BE1  20 FF 5C           JSR SMOOTH
1612  5BE4  20 75 5B           JSR OUTCOR      DO OUTPUT CORRECT
1613  5BE7  20 83 5C           JSR HITS
1614  5BEA  24 35              BIT SFLGS       TEST FOR DIAG ACTION
1615  5BEC  10 06              BPL N2S5        BRANCH IF NO DIAG ACTION
1616  5BEE  A9 BF              LDA #$BF        RESET NAV2 DIAG FLAG
1617  5BF0  25 73              AND DIAG
1618  5BF2  85 73              STA DIAG
1619  5BF4  20 AB 5C   N2S5    JSR MOVSMO
1620  5BF7  60                 RTS
1621  5BF8              .FILE DMESMO
1622  5BF8
1623  5BF8
1624  5BF8                     ;       15 JULY 80
1625  5BF8
1626  5BF8              CLRREG =$5150
1627  5BF8
1628  5BF8                     *=$5C00
1629  5C00
1630  5C00                     ; **********************************
1631  5C00                     ; * DME SMOOTHING
1632  5C00                     ; **********************************
1633  5C00
1634  5C00  A5 4A      DMESMO  LDA DME+1       MOVE DME TO DMES
1635  5C02  85 80              STA DMES+1
1636  5C04  A5 4B              LDA DME+2
```

```
1637  5C06  85 81              STA DMES+2
1638  5C08  20 50 51           JSR CLRREG
1639  5C0B  A9 7F              LDA #DMES
1640  5C0D  85 33              STA SIND        SET SMOOTHER INDIRECT REG=DME.
1641  5C0F  20 A0 5C           JSR SMOMOV
1642  5C12  A5 73              LDA DIAG        TEST FOR DME DIAG FLAG
1643  5C14  29 01              AND #$01
1644  5C16  D0 0D              BNE DS1         BRANCH IF FLAG SET
1645  5C18  20 D3 5C           JSR SMOSUB
1646  5C1B  A5 30              LDA I1+1        TEST FOR OUT-OF-RANGE
1647  5C1D  D0 06              BNE DS1         BRANCH IF MSB OF RESULT <> 0
1648  5C1F  A5 31              LDA I1+2        TEST LSB < 1.5 NM.
1649  5C21  C9 15              CMP #$15
1650  5C23  90 10              BCC DS2         BRANCH IF LSB < 1.5 NM.
1651  5C25  20 5A 5C    DS1    JSR MISS
1652  5C28  24 35              BIT SFLGS       TEST FOR DIAG CONDITION
1653  5C2A  10 21              BPL DS3         BRANCH IF NO ACTION ON DIAG
1654  5C2C  A9 20              LDA #$20        SET DIAG FLAG
1655  5C2E  05 73              ORA DIAG
1656  5C30  85 73              STA DIAG
1657  5C32  4C 4D 5C           JMP DS3
1658  5C35  A9 08       DS2    LDA #$08        SET AT FOR 5 SEC. TIME CONSTANT
1659  5C37  85 2C              STA AT+1
1660  5C39  A9 02              LDA #$02        SET TAT=AT/4
1661  5C3B  85 2E              STA TAT+1
1662  5C3D  20 FF 5C           JSR SMOOTH
1663  5C40  20 83 5C           JSR HITS
1664  5C43  24 35              BIT SFLGS       TEST FOR DIAG CONDITION
1665  5C45  10 06              BPL DS3         BRANCH IF NO ACTION
1666  5C47  A9 DF              LDA #$DF        RESET DIAG FLAG
1667  5C49  25 73              AND DIAG
1668  5C4B  85 73              STA DIAG
1669  5C4D  20 AB 5C    DS3    JSR MOVSMO
1670  5C50  A2 03              LDX #$03        MOVE RESULT TO SMODME
1671  5C52  B5 24       DS4    LDA OUTPUT,X
1672  5C54  95 54              STA SMODME+1,X
1673  5C56  CA                 DEX
1674  5C57  D0 F9              BNE DS4
1675  5C59  60                 RTS
1676  5C5A
1677  5C5A                     ; ******************************************
1678  5C5A                     ; * SMOOTHER MISS SUBROUTINE
1679  5C5A                     ; ******************************************
1680  5C5A
1681  5C5A  A9 00       MISS   LDA #0
1682  5C5C  A6 2B              LDX HIT         TEST HIT REG
1683  5C5E  D0 17              BNE MS1         BRANCH IF HIT<>0
1684  5C60                     ;               INITIALIZE REGISTERS
1685  5C60  85 24              STA IMED+3
1686  5C62  85 27              STA OUTPUT+3
1687  5C64  85 2A              STA CORR+3
1688  5C66  85 29              STA CORR+2
1689  5C68  85 28              STA CORR+1
1690  5C6A  A5 21              LDA NEWNO+2
1691  5C6C  85 23              STA IMED+2
1692  5C6E  85 26              STA OUTPUT+2
1693  5C70  A5 20              LDA NEWNO+1
1694  5C72  85 22              STA IMED+1
1695  5C74  85 25              STA OUTPUT+1
1696  5C76  60                 RTS
1697  5C77  E0 04       MS1    CPX #$04        TEST HIT NUMBER
1698  5C79  B0 02              BCS MS2         BRANCH IF >= 4
1699  5C7B  A9 C0              LDA #$C0        SET DIAG CONDITION
1700  5C7D  85 35       MS2    STA SFLGS
1701  5C7F  CA                 DEX             DECREMENT HIT
1702  5C80  86 2B              STX HIT
1703  5C82  60                 RTS
1704  5C83
```

```
1705  5C83                  ;**************************
1706  5C83                  ;* SMOOTHER HIT SUBROUTINE
1707  5C83                  ;**************************
1708  5C83
1709  5C83  A9 00    HITS   LDA #0
1710  5C85  A6 2B           LDX HIT         INCREMENT HIT
1711  5C87  E8              INX
1712  5C88  E0 06           CPX #$06        TEST HIT
1713  5C8A  90 02           BCC HT1         BRANCH IF HIT < 6
1714  5C8C  A9 C0           LDA #$C0
1715  5C8E  85 35    HT1    STA SFLGS
1716  5C90  E0 09           CPX #$09        TEST HIT=MAX
1717  5C92  F0 02           BEQ HT2         IF HIT=MAX, BRANCH TO END
1718  5C94  86 2B           STX HIT
1719  5C96  60       HT2    RTS
1720  5C97                  .FILE SMOOTH
1722  5C97
1723  5C97                  ;       20 JUNE 80
1724  5C97
1725  5C97                  ADDA   =$5000
1726  5C97                  SUBTA  =$5010
1727  5C97                  COMP   =$5020
1728  5C97                  NRSHFT =$5030
1729  5C97                  MLTPLY =$5088
1730  5C97                  NMLTPY =$5092
1731  5C97                  PMLTPY =$509A
1732  5C97
1733  5C97                         *=$5CA0
1734  5CA0
1735  5CA0                  ;*****************************************
1736  5CA0                  ;* MOVE DATA TO SMOOTHER REGISTERS *
1737  5CA0                  ;*****************************************
1738  5CA0                  ;
1739  5CA0  A0 0C    SMOMOV LDY #$0C
1740  5CA2  B1 33    SM1    LDA (SIND),Y
1741  5CA4  99 1F 00         STA NEWNO,Y
1742  5CA7  88              DEY
1743  5CA8  D0 F8           BNE SM1
1744  5CAA  60              RTS
1745  5CAB
1746  5CAB                  ;*************************************************
1747  5CAB                  ;* MOVE SMOOTHER RESULTS TO STORAGE REG'S *
1748  5CAB                  ;*************************************************
1749  5CAB
1750  5CAB  A0 0C    MOVSMO LDY #$0C
1751  5CAD  B9 1F 00  MVS1   LDA NEWNO,Y
1752  5CB0  91 33           STA (SIND),Y
1753  5CB2  88              DEY
1754  5CB3  D0 F8           BNE MVS1
1755  5CB5  60              RTS
1756  5CB6
1757  5CB6                  ;*********************************************************
1758  5CB6                  ;*  SMOOTHER 3 BYTE MULTIPLY ROUTINE              *
1759  5CB6                  ;*********************************************************
1760  5CB6
1761  5CB6                  ;ENTER WITH MPLC ADDRESS IN ACC
1762  5CB6                  ; & MPLR ADDRESS IN X REG
1763  5CB6
1764  5CB6  85 00    SMLTPY STA IND0
1765  5CB8  8A              TXA
1766  5CB9  48              PHA
1767  5CBA  B5 03           LDA 3,X         MULTIPLY LSB OF MPLR
1768  5CBC  85 17           STA MD+4
1769  5CBE  A9 00           LDA #0
1770  5CC0  85 18           STA MD+5
1771  5CC2  20 92 50        JSR NMLTPY
1772  5CC5  68              PLA
```

```
1773  5CC6  AA              TAX
1774  5CC7  B5 02           LDA 2,X      MULTIPLY TWO MSB'S OF MPLR
1775  5CC9  85 18           STA MD+5
1776  5CCB  B5 01           LDA 1,X
1777  5CCD  85 17           STA MD+4
1778  5CCF  20 9A 50        JSR PMLTPY
1779  5CD2  60              RTS
1780  5CD3
1781  5CD3           ; ****************************************
1782  5CD3           ; * SUBTRACT SMOOTHED NUMBER FROM NEW NUMBER    *
1783  5CD3           ; *  TEST FOR RESULT >= 10
1784  5CD3           ; ****************************************
1785  5CD3
1786  5CD3  38       SMOSUB SEC          SUBTRACT OUTPUT FROM NEWNO
1787  5CD4  A9 00           LDA #0       RESULT TO I1 REG
1788  5CD6  E5 27           SBC OUTPUT+3
1789  5CD8  85 32           STA I1+3
1790  5CDA  A5 21           LDA NEWNO+2
1791  5CDC  E5 26           SBC OUTPUT+2
1792  5CDE  85 31           STA I1+2
1793  5CE0  A5 20           LDA NEWNO+1
1794  5CE2  E5 25           SBC OUTPUT+1
1795  5CE4  85 30           STA I1+1
1796  5CE6  10 0C           BPL SS2      BRANCH IF RESULT IS POSITIVE
1797  5CE8  38              SEC          SET NEG FLAG & COMPLIMENT I1
1798  5CE9  66 35           ROR SFLGS
1799  5CEB  A9 03           LDA #$03
1800  5CED  85 06           STA NBYT
1801  5CEF  A2 32           LDX #I1+3
1802  5CF1  20 20 50        JSR COMP
1803  5CF4  A5 30   SS2     LDA I1+1     TEST FOR DIFF >= 10
1804  5CF6  F0 06           BEQ SS3      & BRANCH IF IT IS NOT
1805  5CF8  A9 40           LDA #$40     SET OVERRANGE FLAG IF DIFF >= 10
1806  5CFA  05 35           ORA SFLGS
1807  5CFC  85 35           STA SFLGS
1808  5CFE  60      SS3     RTS
1809  5CFF
1810  5CFF           ; ****************************************
1811  5CFF           ; * SMOOTHER ROUTINE
1812  5CFF           ; ****************************************
1813  5CFF
1814  5CFF  A2 2D    SMOOTH LDX #TAT     DO I1*TAT=MD
1815  5D01  A9 30           LDA #I1+1
1816  5D03  20 88 50        JSR MLTPLY
1817  5D06  A9 03           LDA #$03
1818  5D08  85 06           STA NBYT
1819  5D0A  24 35           BIT SFLGS    COMPLIMENT MD IF NEG FLAG IS SET
1820  5D0C  10 05           BPL S1
1821  5D0E  A2 16           LDX #MD+3
1822  5D10  20 20 50        JSR COMP
1823  5D13  A2 2A    S1     LDX #CORR+3  DO CORR+MD=CORR
1824  5D15  A9 13           LDA #MD
1825  5D17  20 00 50        JSR ADDA
1826  5D1A  38       SMOOG  SEC          DO 1-AT=TAT
1827  5D1B  A9 00           LDA #0
1828  5D1D  E5 2D           SBC AT+2
1829  5D1F  85 2F           STA TAT+2
1830  5D21  A9 00           LDA #0
1831  5D23  E5 2C           SBC AT+1
1832  5D25  85 2E           STA TAT+1
1833  5D27  A2 2B           LDX #AT      DO NEWNO*AT=MD
1834  5D29  A9 1F           LDA #NEWNO
1835  5D2B  20 88 50        JSR MLTPLY
1836  5D2E  A2 03           LDX #$03     MOVE MD TO I1
1837  5D30  B5 14    S2     LDA MD+1,X
1838  5D32  95 2F           STA I1,X
1839  5D34  CA              DEX
```

```
1840  5D35  D0 F9              BNE S2
1841  5D37  A9 2D              LDA #TRT      DO IMED*TRT=MD (3 BYTE)
1842  5D39  A2 21              LDX #IMED
1843  5D3B  20 B6 5C           JSR SMLTPY
1844  5D3E  A9 03              LDA #$03      DO I1+MD=I1
1845  5D40  85 06              STA NBYT
1846  5D42  A9 14              LDA #MD+1
1847  5D44  A2 32              LDX #I1+3
1848  5D46  20 00 50           JSR ADDA
1849  5D49  A2 03              LDX #$03      DO MOVE I1 TO IMED
1850  5D4B  B5 2F        S3    LDA I1,X
1851  5D4D  95 21              STA IMED,X
1852  5D4F  CA                 DEX
1853  5D50  D0 F9              BNE S3
1854  5D52  A9 27              LDA #CORR     DO I1+CORR=I1
1855  5D54  A2 32              LDX #I1+3
1856  5D56  20 00 50           JSR ADDA
1857  5D59  A9 2B              LDA #AT       DO I1*AT=MD (3 BYTE)
1858  5D5B  A2 2F              LDX #I1
1859  5D5D  20 B6 5C           JSR SMLTPY
1860  5D60  A2 03              LDX #$03      MOVE MD TO I1
1861  5D62  B5 14        S4    LDA MD+1,X
1862  5D64  95 2F              STA I1,X
1863  5D66  CA                 DEX
1864  5D67  D0 F9              BNE S4
1865  5D69  A9 2D              LDA #TRT      DO OUTPUT*TRT=MD (3 BYTE)
1866  5D6B  A2 24              LDX #OUTPUT
1867  5D6D  20 B6 5C           JSR SMLTPY
1868  5D70  A2 03              LDX #$03      DO I1+MD=OUTPUT
1869  5D72  18                 CLC
1870  5D73  B5 2F        S5    LDA I1,X
1871  5D75  75 14              ADC MD+1,X
1872  5D77  95 24              STA OUTPUT,X
1873  5D79  CA                 DEX
1874  5D7A  D0 F7              BNE S5
1875  5D7C  60                 RTS
1876  5D7D                     .END RAMREG

ERRORS = 0000 <0000>
END OF ASSEMBLY
0002  0000          ;
0003  0000          ;           19 JUNE 80
0004  0000
0005  0000          ; ***** RAM REGISTER ASSIGNMENTS *****
0006  0000          ;
0007  0000                    *=$0000
0008  0000          ;
0009  0000          IND0      *=*+2
0010  0002          IND2      *=*+2
0011  0004          IND4      *=*+2
0012  0006          NBYT      *=*+1
0013  0007          NSHFT     *=*+1
0014  0008          IREG      *=*+1
0015  0009          JREG      *=*+1
0016  000A          TEMP1     *=*+1
0017  000B          TEMP2     *=*+1
0018  000C          TEMP3     *=*+1
0019  000D          QR        *=*+1
0020  000E          FNC       *=*+2
0021  0010                    *=*-1
0022  000F          K         *=*+2
0023  0011          TWOK      *=*+2
0024  0013          MD        *=*+6
0025  0019                    *=*+1
0026  001A          TIME      *=*+1
0027  001B          SWTIME    *=*+1
```

```
0028  001C        DMEDIA  *=*+1
0029  001D                *=*+2
0030  001F        DSPTIM  *=*+1
0031  0020                *=*-1
0032  001F        XR      *=*+4
0033  0023        YR      *=*+4
0034  0027        XT      *=*+4
0035  002B        YT      *=*+4
0036  002F        AR      *=*+4
0037  0033        CR      *=*+4
0038  0037        X1      *=*+4
0039  003B        Y1      *=*+4
0040  003F        X4      *=*+4
0041  0043        Y4      *=*+4
0042  0047                *=$001F
0043  001F        NEWNO   *=*+2
0044  0021        IMED    *=*+3
0045  0024        OUTPUT  *=*+3
0046  0027        CORR    *=*+3
0047  002A                *=*+1
0048  002B        HIT     *=*+1
0049  002C                *=*-1
0050  002B        AT      *=*+2
0051  002D        TAT     *=*+2
0052  002F        I1      *=*+3
0053  0032                *=*+1
0054  0033        SIND    *=*+2
0055  0035        SFLGS   *=*+1
0056  0036                *=$0047
0057  0047        NAV1    *=*+2
0058  0049        DME     *=*+2
0059  004B        NAV2    *=*+2
0060  004D        ACALT   *=*+2
0061  004F        SMOVOR  *=*+4
0062  0053        SMODME  *=*+4
0063  0057        OBS     *=*+2
0064  0059        XTK     *=*+2
0065  005B        WPRAD   *=*+2
0066  005D        WPDIST  *=*+2
0067  005F        BTW     *=*+2
0068  0061        DTW     *=*+2
0069  0063        GSP     *=*+2
0070  0065        TTG     *=*+2
0071  0067                *=*+1
0072  0068        FLAGS   *=*+1
0073  0069        LR      *=*+1
0074  006A        CVSGNS  *=*+1
0075  006B        CVSIN   *=*+1
0076  006C        CVCOS   *=*+1
0077  006D        DATALO  *=*+1
0078  006E        DATAHI  *=*+1
0079  006F        DATA    *=*+1
0080  0070        MODE    *=*+1
0081  0071        FUNCTN  *=*+1
0082  0072        ROUFLG  *=*+1
0083  0073        DIAG    *=*+1
0084  0074        ACTWP   *=*+1
0085  0075        PROGWP  *=*+1
0086  0076                *=$0079
0087  0079        SITEMP  *=*+1
0088  007A        PSHBUT  *=*+1
0089  007B        RMIANG  *=*+2
0090  007D                *=$007F
0091  007F        DMES    *=*+12
0092  008B        NV1S    *=*+12
0093  0097        NV2S    *=*+12
0094  00A3        GSTIM   *=*+12
0095  00AF                *=$00AF
```

```
0096  00AF              WPRAD1 *=*+4
0097  00B3              WPFRQ1 *=*+4
0098  00B7                     *=$00CF
0099  00CF              AWPRAD *=*+2
0100  00D1              AWPDST *=*+2
0101  00D3              .FILE MAINPG
0103  00D3              ;
0104  00D3              ;        15 JULY 80
0105  00D3              ;
0106  00D3              IND0    =$0000
0107  00D3              TEMP1   =$000A
0108  00D3              FNC     =$000E
0109  00D3              K       =$000F
0110  00D3              TWOK    =$0011
0111  00D3              TIME    =$001A
0112  00D3              DMEDIA  =$001C
0113  00D3              DSPTIM  =$001F
0114  00D3              X1      =$0037
0115  00D3              X4      =$003F
0116  00D3              NAV2    =$004B
0117  00D3              ACALT   =$004D
0118  00D3              SMOVOR  =$004F
0119  00D3              SMODME  =$0053
0120  00D3              WPRAD   =$005B
0121  00D3              BTW     =$005F
0122  00D3              GSP     =$0063
0123  00D3              FLAGS   =$0068
0124  00D3              DATA    =$006F
0125  00D3              MODE    =$0070
0126  00D3              FUNCTN  =$0071
0127  00D3              DIAG    =$0073
0128  00D3              ACTWP   =$0074
0129  00D3              PROGWP  =$0075
0130  00D3              PSHBUT  =$007A
0131  00D3              NV1S    =$008B
0132  00D3              NV2S    =$0097
0133  00D3              AWPRAD  =$00CF
0134  00D3              AWPDST  =$00D1
0135  00D3              VORCTN  =$2800
0136  00D3              DMECTN  =$3000
0137  00D3              VIA     =$3800
0138  00D3              DMESLC  =$534C
0139  00D3              AVECT   =$5390
0140  00D3              BVECT   =$53C0
0141  00D3              XVECT   =$5400
0142  00D3              CVECT   =$5450
0143  00D3              GSPTTG  =$5800
0144  00D3              RMISC   =$5A00
0145  00D3              DISPLY  =$6200
0146  00D3              FLGROU  =$6A00
0147  00D3              RIURD   =$6C00
0148  00D3              KCROUT  =$6CA0
0149  00D3              INFOUT  =$6D00
0150  00D3              SRIN    =$6F00
0151  00D3              COMPWP  =$6F80
0152  00D3              ;
0153  00D3                      *=$6000
0154  6000              ;
0155  6000              ; *** INITIALIZE 6502 & 6522 ***
0156  6000              ;
0157  6000  A2 FF           LDX #$FF        INITIALIZE STACK
0158  6002  9A              TXS
0159  6003  8E 00 38        STX VIA         INITIALIZE PA & PB PORTS
0160  6006  8E 01 38        STX VIA+1
0161  6009  8E 02 38        STX VIA+2
0162  600C  8E 03 38        STX VIA+3
0163  600F  A9 58           LDA #$58        INITIALIZE T1L-L
```

```
0164  6011  8D 06 38              STA VIA+6
0165  6014  A9 40                 LDA #$40      INITIALIZE ACR
0166  6016  8D 0B 38              STA VIA+11
0167  6019  A9 03                 LDA #$03      INITIALIZE PCR
0168  601B  8D 0C 38              STA VIA+12
0169  601E  A9 C3                 LDA #$C3      INITIALIZE IER
0170  6020  8D 0E 38              STA VIA+14
0171  6023  A9 EC                 LDA #$EC      START T1 BY WRITING TO T1C-H
0172  6025  8D 05 38              STA VIA+5
0173  6028                    ;
0174  6028                    ; *** CLEAR & INITIALIZE UNSAVED RAM ***
0175  6028                    ;
0176  6028  A5 65                 LDA GSP+2     SAVE GSP INFO
0177  602A  48                    PHA
0178  602B  A4 64                 LDY GSP+1
0179  602D  A2 A3                 LDX #$A3      CLEAR RAM
0180  602F  A9 00                 LDA #0
0181  6031  95 00         CLRRAM  STA 0,X
0182  6033  CA                    DEX
0183  6034  D0 FB                 BNE CLRRAM
0184  6036  84 64                 STY GSP+1     RECOVER GSP INFO
0185  6038  68                    PLA
0186  6039  85 65                 STA GSP+2
0187  603B  A9 52                 LDA #$52      INITIALIZE FNC
0188  603D  85 0F                 STA FNC+1
0189  603F  A9 14                 LDA #$14      INITIALIZE K
0190  6041  85 10                 STA K+1
0191  6043  A9 80                 LDA #$80
0192  6045  85 11                 STA K+2
0193  6047  A9 21                 LDA #$21      INITIALIZE TWOK
0194  6049  85 12                 STA TWOK+1
0195  604B  A9 89                 LDA #$89
0196  604D  85 13                 STA TWOK+2
0197  604F  A9 01                 LDA #$01
0198  6051  85 74                 STA ACTWP     INITIALIZE ACTIVE WP REG
0199  6053  85 1F                 STA DSPTIM    INITIALIZE DISPLAY TIMER
0200  6055  85 1C                 STA DMEDIA    INITIALIZE DME DIAG TIMER
0201  6057  A9 EE                 LDA #$EE
0202  6059  85 73                 STA DIAG      INITIALIZE DIAGNOSTIC REG
0203  605B  A9 88                 LDA #$88      INITIALIZE FLAGS V/R TO VOR
0204  605D  85 68                 STA FLAGS
0205  605F  A9 E0                 LDA #$E0      RESET VOR & DME COUNTERS
0206  6061  8D 01 38              STA VIA+1     AND SET-UP FOR VOR
0207  6064                    ;                 MEASUREMENT.
0208  6064
0209  6064  A9 7F                 LDA #$7F      INITIALIZE "DATA" REG
0210  6066  8D 00 38              STA VIA       TURN ON SWITCH SHIFT REG'S
0211  6069  20 00 6F              JSR SRIN      READ WP'S
0212  606C  20 00 6F              JSR SRIN      READ FUNCTION
0213  606F  20 00 6F              JSR SRIN      READ DATA SWITHES
0214  6072  49 FF                 EOR #$FF
0215  6074  85 6F                 STA DATA
0216  6076  A9 FF                 LDA #$FF      TURN OFF REG'S
0217  6078  8D 00 38              STA VIA
0218  607B  F8                    SED
0219  607C                    ;
0220  607C                    ; *** MAIN PROGRAM ***
0221  607C                    ;
0222  607C  78            START   SEI
0223  607D  A9 F9                 LDA #$F9      TURN MODE REG ON & STEER STROBE OFF
0224  607F  2D 00 38              AND VIA
0225  6082  8D 00 38              STA VIA
0226  6085  20 00 6F              JSR SRIN      READ MODE REGISTER
0227  6088  49 FF                 EOR #$FF      COMPLIMENT MODE REG.
0228  608A  85 70                 STA MODE
0229  608C  A9 02                 LDA #$02      TURN MODE REG OFF.
0230  608E  0D 00 38              ORA VIA
```

```
0231  6091  8D 00 38           STA VIA
0232  6094  A9 7F              LDA #$7F        TURN FUNCTION & WP REG ON.
0233  6096  2D 00 38           AND VIA
0234  6099  8D 00 38           STA VIA
0235  609C  20 00 6F           JSR SRIN        READ WP REG
0236  609F  49 FF              EOR #$FF        SAVE WP REG IN PUSH BUTTON REG
0237  60A1  85 7A              STA PSHBUT
0238  60A3  20 00 6F           JSR SRIN        READ FUNCTION REG
0239  60A6  A9 80              LDA #$80        TURN FUNCTION REG OFF.
0240  60A8  0D 00 38           ORA VIA
0241  60AB  8D 00 38           STA VIA
0242  60AE  AD 0A 38           LDA VIA+10      TEST FOR CHANGE IN FUNCTION SWITCH
0243  60B1  58                 CLI
0244  60B2  05 71              ORA FUNCTN
0245  60B4  49 FF              EOR #$FF
0246  60B6  F0 1A              BEQ MN0         BRANCH IF NO CHANGE
0247  60B8  85 71              STA FUNCTN
0248  60BA  29 30              AND #$30        RESET FLASHER BITS & PROGWP
0249  60BC  D0 06              BNE MN3         IF FUNCTN=RAD/DST OR FRQ/ELV
0250  60BE  A9 00              LDA #0
0251  60C0  85 75              STA PROGWP
0252  60C2  F0 0E              BEQ MN0         UNCOND. BRANCH
0253  60C4  A9 C0       MN3    LDA #$C0        IF EITHER FLASHER BIT IS SET,
0254  60C6  25 75              AND PROGWP       SET LEFT FLASHER BIT.
0255  60C8  F0 08              BEQ MN0
0256  60CA  A9 3F              LDA #$3F
0257  60CC  25 75              AND PROGWP
0258  60CE  09 80              ORA #$80
0259  60D0  85 75              STA PROGWP
0260  60D2  A5 74       MN0    LDA ACTWP       MOVE ACTWP INFO TO WPRAD/DST REG'S
0261  60D4  20 80 6F           JSR COMPWP
0262  60D7  A0 04              LDY #$04
0263  60D9  B1 00       MN0A   LDA (IND0),Y
0264  60DB  99 5B 00           STA WPRAD,Y
0265  60DE  88                 DEY
0266  60DF  D0 F8              BNE MN0A
0267  60E1  A5 71              LDA FUNCTN
0268  60E3  4A                 LSR A           TEST FOR FUNCTION=VOR
0269  60E4  4A                 LSR A
0270  60E5  90 06              BCC MN1         BRANCH IF NOT=VOR
0271  60E7  A9 80              LDA #$80        SET VOR FLAG IN FLAGS REG.
0272  60E9  05 68              ORA FLAGS
0273  60EB  D0 35              BNE MN2         UNCONDITIONAL BRANCH
0274  60ED  4A          MN1    LSR A           TEST FOR FUNCTION=RNAV
0275  60EE  D0 02              BNE MN6         BRANCH IF =RNAV
0276  60F0  B0 32              BCS MN5         BRANCH IF =CRS/XTK
0277  60F2  C9 02       MN6    CMP #$02        IS FUNCTION=RAD/DST ?
0278  60F4  D0 28              BNE MN6A
0279  60F6  A9 01              LDA #$01        IS PRESENT POSITION BUTTON DEPRESSED?
0280  60F8  25 7A              AND PSHBUT
0281  60FA  F0 22              BEQ MN6A
0282  60FC  A5 75              LDA PROGWP
0283  60FE  AA                 TAX
0284  60FF  29 C0              AND #$C0        IS EITHER FLASHER BIT SET?
0285  6101  F0 1B              BEQ MN6A
0286  6103  8A                 TXA
0287  6104  29 10              AND #$10        IS PROGWP=AUTOWP?
0288  6106  F0 16              BEQ MN6A
0289  6108  A5 56              LDA SMODME+3    MOVE PRES. POS. TO AUTOWP
0290  610A  85 D3              STA AWPRAD+4
0291  610C  A5 55              LDA SMODME+2
0292  610E  85 D2              STA AWPRAD+3
0293  6110  A5 52              LDA SMOVOR+3
0294  6112  85 D1              STA AWPRAD+2
0295  6114  A5 51              LDA SMOVOR+2
0296  6116  85 D0              STA AWPRAD+1
0297  6118  A9 FD              LDA #$FD        RESET AUTOWP DIAG FLAG
```

```
0298  611A  25 73              AND DIAG
0299  611C  85 73              STA DIAG
0300  611E  A9 7F       MN6A   LDA #$7F      SET RNAV FLAG IN FLAGS REG.
0301  6120  25 68              AND FLAGS
0302  6122  85 68       MN2    STA FLAGS
0303  6124  20 00 6C    MN5    JSR RIURD     READ RIU
0304  6127  20 00 6A           JSR FLGROU
0305  612A  A9 DF              LDA #$DF      TURN ON DISPLAY KEEP ALIVE
0306  612C  2D 00 38           AND VIA
0307  612F  8D 00 38           STA VIA
0308  6132  20 00 62           JSR DISPLY    DO DISPLAY UPDATE
0309  6135  A9 20              LDA #$20      TURN OFF DISPLAY KEEP ALIVE
0310  6137  0D 00 38           ORA VIA
0311  613A  8D 00 38           STA VIA
0312  613D  20 00 6A           JSR FLGROU
0313  6140  A2 8B              LDX #NV1S     LOAD SMOVOR WITH NAV1 OR NAV2
0314  6142  24 68              BIT FLAGS     TEST FOR VOR OR R/M
0315  6144  30 04              BMI MN7       BRANCH IF VOR/LOC
0316  6146  50 02              BVC MN7       BRANCH IF NOT R/M
0317  6148  A2 97              LDX #NV2S
0318  614A  B5 08       MN7    LDA 8,X       MOVE NAV TO SMOVOR
0319  614C  85 53              STA SMOVOR+4
0320  614E  B5 07              LDA 7,X
0321  6150  85 52              STA SMOVOR+3
0322  6152  B5 06              LDA 6,X
0323  6154  38                 SEC           SUBTRACT 10 FROM NAV
0324  6155  E9 01              SBC #$01
0325  6157  85 51              STA SMOVOR+2
0326  6159  A5 4E              LDA ACALT+1   TEST ALTITUDE=0
0327  615B  D0 04              BNE MN7A      BRANCH IF MSB<>0
0328  615D  A5 4F              LDA ACALT+2
0329  615F  F0 09              BEQ MN7B      BRANCH IF LSB=0
0330  6161  20 4C 53    MN7A   JSR DMESLC
0331  6164  20 00 6A           JSR FLGROU
0332  6167  4C 70 61           JMP MN8
0333  616A  20 90 53    MN7B   JSR AVECT
0334  616D  20 00 6A           JSR FLGROU
0335  6170  20 C0 53    MN8    JSR BVECT
0336  6173  20 00 6A           JSR FLGROU
0337  6176  A9 40              LDA #$40      TEST MODE AND
0338  6178  25 70              AND MODE      BRANCH IF NOT=XTK
0339  617A  F0 0C              BEQ MN9
0340  617C  A9 08              LDA #$08
0341  617E  25 73              AND DIAG      TEST FOR OBS DIAG
0342  6180  D0 06              BNE MN9       BRANCH IF OBS DIAG
0343  6182  20 00 54           JSR XVECT
0344  6185  20 00 6A           JSR FLGROU
0345  6188  20 50 54    MN9    JSR CVECT
0346  618B  20 00 6A           JSR FLGROU
0347  618E  20 00 58           JSR GSPTTG
0348  6191  20 00 6A           JSR FLGROU
0349  6194  24 68              BIT FLAGS     TEST FOR VOR
0350  6196  10 1C              BPL MN9B      BRANCH IF RNAV
0351  6198  A5 51              LDA SMOVOR+2  TAKE RECIPRICAL OF SMOVOR
0352  619A  18                 CLC
0353  619B  69 18              ADC #$18
0354  619D  C9 36              CMP #$36
0355  619F  90 02              BCC MN9A
0356  61A1  E9 36              SBC #$36
0357  61A3  85 60       MN9A   STA BTW+1     AND MOVE SMOVOR/DME TO BTW,DTW
0358  61A5  A5 52              LDA SMOVOR+3
0359  61A7  85 61              STA BTW+2
0360  61A9  A5 55              LDA SMODME+2
0361  61AB  85 62              STA BTW+3
0362  61AD  A5 56              LDA SMODME+3
0363  61AF  85 63              STA BTW+4
0364  61B1  4C C9 61           JMP MN11
0365  61B4  A9 08       MN9B   LDA #$08      TEST FUNCTION=RNAV
```

```
0366  61B6  25 71              AND FUNCTN
0367  61B8  F0 0F              BEQ MN11        BRANCH IF NOT RNAV
0368  61BA  A9 04              LDA #$04        TEST FOR "TEST"
0369  61BC  25 7A              AND PSHBUT
0370  61BE  F0 09              BEQ MN11
0371  61C0  A2 04              LDX #$04        MOVE WPDATA TO BTW,DTW
0372  61C2  B5 5B       MN10   LDA WPRAD,X
0373  61C4  95 5F              STA BTW,X
0374  61C6  CA                 DEX
0375  61C7  D0 F9              BNE MN10
0376  61C9  20 00 5A    MN11   JSR RMISC
0377  61CC  20 00 6A           JSR FLGROU
0378  61CF  A5 1A       MN11A  LDA TIME        DELAY UNTIL 400 MSEC
0379  61D1  29 07              AND #$07
0380  61D3  C9 05              CMP #$05
0381  61D5  D0 F8              BNE MN11A
0382  61D7  24 4C              BIT NAV2+1      TEST RIU INSTALLED
0383  61D9  10 0C              BPL MN12        BRANCH IF RIU INSTALLED
0384  61DB  A9 08              LDA #$08        TEST FOR KCA
0385  61DD  25 70              AND MODE
0386  61DF  F0 06              BEQ MN12        BRANCH IF NO KCA
0387  61E1  20 A0 6C           JSR KCAOUT
0388  61E4  4C EA 61           JMP MN13
0389  61E7  20 00 6D    MN12   JSR INFOUT
0390  61EA  20 00 6A    MN13   JSR FLGROU
0391  61ED  4C 7C 60           JMP START
0392  61F0
0393  61F0               .FILE GENINT
0103  00D3
0104  00D3              ; ***** RNAV 612 DISPLAY PROGRAM *****
0105  00D3              ;           21 JUNE 80
0106  00D3              ;              PDG
0107  00D3              ;
0108  00D3              VIA    =$3800
0109  00D3              CLRREG =$5150
0110  00D3              SRIN   =$6F00
0111  00D3              SROUT  =$6F30
0112  00D3              ZBLANK =$6FA0
0113  00D3
0114  00D3                     *=$6200
0115  6200              ;
0116  6200  20 50 51    DISPLY JSR CLRREG
0117  6203  C6 1F              DEC DSPTIM      DECREMENT DISPLAY TIMER
0118  6205  A9 10              LDA #$10        ADD "1" TO TEST TIMER
0119  6207  18                 CLC
0120  6208  D8                 CLD
0121  6209  65 1F              ADC DSPTIM
0122  620B  85 1F              STA DSPTIM
0123  620D  F8                 SED
0124  620E  78                 SEI
0125  620F  A9 7F              LDA #$7F        TURN-ON WP REGISTERS
0126  6211  2D 00 38           AND VIA
0127  6214  8D 00 38           STA VIA
0128  6217  20 00 6F           JSR SRIN        READ WP REGISTERS
0129  621A  49 FF              EOR #$FF          COMPLIMENT
0130  621C  A8                 TAY
0131  621D  A9 80              LDA #$80        TURN-OFF WP REGISTERS
0132  621F  0D 00 38           ORA VIA
0133  6222  8D 00 38           STA VIA
0134  6225  58                 CLI
0135  6226  A9 70              LDA #$70        TEST FOR RAD/DST,FRQ/ELV, OR AWP
0136  6228  25 71              AND FUNCTN
0137  622A  D0 08              BNE DSP1
0138  622C  98                 TYA
0139  622D  29 F8              AND #$F8
0140  622F  F0 03              BEQ DSP1        BRANCH IF NO WP'S ARE DEPRESSED
0141  6231  4C C7 62           JMP DSPWP
```

```
0142  6234  98              DSP1    TYA
0143  6235  C9 04                   CMP #$04
0144  6237  D0 09                   BNE DSP2        BRANCH IF NOT "TEST"
0145  6239  A5 71                   LDA FUNCTN
0146  623B  29 0A                   AND #$0A
0147  623D  F0 03                   BEQ DSP2        BRANCH IF FUNC. NOT RNAV OR VOR
0148  623F  4C 03 63                JMP DSPTST
0149  6242  98              DSP2    TYA
0150  6243  4A                      LSR A
0151  6244  90 03                   BCC DSP4        BRANCH IF NOT "VOR/DME"
0152  6246  4C 67 63                JMP DSPVD
0153  6249  4A              DSP4    LSR A
0154  624A  90 03                   BCC DSP5        BRANCH IF NOT "KTS/MIN"
0155  624C  4C B8 63                JMP DSPKM
0156  624F  A5 71           DSP5    LDA FUNCTN
0157  6251  C9 02                   CMP #$02
0158  6253  D0 0C                   BNE DSP6        BRANCH IF FUNC. NOT VOR/LOC
0159  6255  A9 10                   LDA #$10        TEST FOR LOC
0160  6257  25 68                   AND FLAGS
0161  6259  F0 03                   BEQ DSP5A       BRANCH IF NO LOC
0162  625B  4C 32 63                JMP DSPLOC
0163  625E  4C F7 63        DSP5A   JMP DSPVOR
0164  6261  C9 08           DSP6    CMP #$08
0165  6263  D0 03                   BNE DSP7        BRANCH IF FUNC. NOT RNAV
0166  6265  4C C3 64                JMP DSPRNV
0167  6268  C9 04           DSP7    CMP #$04
0168  626A  D0 03                   BNE DSP8        BRANCH IF FUNC. NOT CRS/XTK
0169  626C  4C 3C 64                JMP DSPCX
0170  626F  C9 10           DSP8    CMP #$10
0171  6271  D0 03                   BNE DSP9        BRANCH IF FUNC. NOT RAD/DST
0172  6273  4C 55 65                JMP DSPRD
0173  6276  C9 20           DSP9    CMP #$20
0174  6278  D0 03                   BNE DSP10       BRANCH IF FUNC. NOT FRQ/ELV
0175  627A  4C A9 65                JMP DSPFE
0176  627D  4C 21 66        DSP10   JMP DSPAWP
0177  6280                  ;
0178  6280                  ; *** DISPLAY RETURN ROUTINE ***
0179  6280                  ;
0180  6280  A5 68           DSPRTN  LDA FLAGS       ; TEST FOR R/M & RNAV
0181  6282  29 C0                   AND #$C0
0182  6284  C9 40                   CMP #$40
0183  6286  D0 06                   BNE DSPR1       BRANCH IF NOT R/M
0184  6288  A9 01                   LDA #$01        TURN-ON R/M ANNUN.
0185  628A  05 2E                   ORA XT+7
0186  628C  85 2E                   STA XT+7
0187  628E  78              DSPR1   SEI             SHIFT DISPLAY INFO. OUT
0188  628F  A2 00                   LDX #0
0189  6291  A9 FE                   LDA #$FE        TURN ON DISPLAY REGISTERS
0190  6293  2D 00 38                AND VIA
0191  6296  8D 00 38                STA VIA
0192  6299  B5 27           DSPR2   LDA XT,X
0193  629B  20 30 6F                JSR SROUT
0194  629E  E0 05                   CPX #$05
0195  62A0  D0 0A                   BNE DSPR3       BRANCH IF XREG NOT = 5.
0196  62A2  AD 00 38                LDA VIA         TURN-OFF DISPLAY REGISTERS
0197  62A5  09 01                   ORA #$01        AND TURN-ON ANNUN. REG.
0198  62A7  29 BF                   AND #$BF
0199  62A9  8D 00 38                STA VIA
0200  62AC  E8              DSPR3   INX
0201  62AD  E0 09                   CPX #$09
0202  62AF  D0 E8                   BNE DSPR2       BRANCH IF NOT DONE
0203  62B1  A9 40                   LDA #$40
0204  62B3  0D 00 38                ORA VIA         TURN-OFF ANNUN. REG.
0205  62B6  8D 00 38                STA VIA
0206  62B9  58                      CLI
0207  62BA  A9 0F                   LDA #$0F        TEST DISP. TIMER =0 ?
0208  62BC  25 1F                   AND DSPTIM
0209  62BE  D0 06                   BNE DSPR4       BRANCH IF DISP. TIMER NOT =0.
```

```
0210  62C0  A9 03              LDA #$03
0211  62C2  05 1F              ORA DSPTIM    SET DISP. TIMER = 3.
0212  62C4  85 1F              STA DSPTIM
0213  62C6  60         DSPR4   RTS
0214  62C7
0215  62C7                     .FILE DSPWP
0217  62C7
0218  62C7                     ;    21 JUNE 80
0219  62C7
0220  62C7                     ; ****  WP DISPLAY ROUTINE *****
0221  62C7
0222  62C7                     COMPWP =$6F80
0223  62C7
0224  62C7  4A         DSPWP   LSR A         COMPUTE WP ADDRESS
0225  62C8  4A                 LSR A
0226  62C9  4A                 LSR A
0227  62CA  48                 PHA
0228  62CB  20 80 6F            JSR COMPWP    COMPUTE WP ADDRESS
0229  62CE  A0 04              LDY #$04      MOVE DEPRESSED WP INFO
0230  62D0  B1 00      DWP3    LDA (IND0),Y  TO DISPLAY REGISTERS.
0231  62D2  AA                 TAX
0232  62D3  96 28              STX XT+1,Y
0233  62D5  88                 DEY
0234  62D6  D0 F8              BNE DWP3
0235  62D8  A9 22              LDA #$22      TURN ON DECIMALS
0236  62DA  85 28              STA XT+1
0237  62DC  A9 08              LDA #$08      TURN ON RAD/DST ANNUN.
0238  62DE  85 2F              STA XT+8
0239  62E0  85 2E              STA XT+7
0240  62E2  68                 PLA           TURN ON WP ANNUN.
0241  62E3  85 2D              STA XT+6
0242  62E5  C9 10      DAWP    CMP #$10      TEST FOR AUTOWP
0243  62E7  D0 12              BNE DWP4      BRANCH IF NOT AUTOWP
0244  62E9  A9 02              LDA #$02      TEST FOR AWP DIAG
0245  62EB  25 73              AND DIAG
0246  62ED  F0 0C              BEQ DWP4      BRANCH IF NO AWP DIAG
0247  62EF  A9 0D              LDA #$0D      TURN ON DASHES
0248  62F1  05 28              ORA XT+1
0249  62F3  85 28              STA XT+1
0250  62F5  A9 DD              LDA #$DD      BLANK DIST
0251  62F7  85 2B              STA XT+4
0252  62F9  85 2C              STA XT+5
0253  62FB  A2 2B      DWP4    LDX #XT+4     ZBLANK DISTANCE
0254  62FD  20 A0 6F            JSR ZBLANK
0255  6300  4C 80 62           JMP DSPRTN
0256  6303
0257  6303                     .FILE DSPTST
0259  6303
0260  6303                     ; ***** "TEST" & "LOC" DISPLAY ROUTINES *****
0261  6303
0262  6303                     ;    9 AUG 80
0263  6303
0264  6303                     ; *** "TEST" DISPLAY ROUTINE ***
0265  6303
0266  6303  24 68      DSPTST  BIT FLAGS     TEST FOR VOR OR RNAV
0267  6305  30 1A              BMI DSPT4     BRANCH IF VOR
0268  6307  A2 04              LDX #$04      MOVE ACTIVE WP INFO
0269  6309  B5 5B      DSPT1   LDA WPRAD,X   TO DISPLAY REGISTERS.
0270  630B  95 28              STA XT+1,X
0271  630D  CA                 DEX
0272  630E  D0 F9              BNE DSPT1
0273  6310  A9 40              LDA #$40      SET ANNUN. TO BRG/RNG
0274  6312  85 2E              STA XT+7
0275  6314  85 2F              STA XT+8
0276  6316  A9 22              LDA #$22      TURN ON DECIMALS
0277  6318  85 28              STA XT+1
0278  631A  A5 74              LDA ACTWP     SET WP REG TO ACTIVE WP
0279  631C  85 2D              STA XT+6
```

```
0280  631E  4C E5 62             JMP DAWP
0281  6321  A9 22      DSPT4  LDA #$22      TURN ON DECIMALS
0282  6323  85 28             STA XT+1
0283  6325  A2 88             LDX #$88      TURN ON DISPLAY SEGMENTS
0284  6327  86 2C      DSPT4A STX XT+5
0285  6329  86 2B             STX XT+4
0286  632B  86 2A             STX XT+3
0287  632D  86 29             STX XT+2
0288  632F  4C 80 62   DSPT5  JMP DSPRTN
0289  6332
0290  6332                    ; *** "LOC" DISPLAY ROUTINE ****
0291  6332
0292  6332  A9 20      DSPLOC LDA #$20      TEST FOR DME DIAGNOSTIC
0293  6334  25 73             AND DIAG
0294  6336  D0 18             BNE DLOC1     BRANCH IF DME=DIAG
0295  6338  A5 56             LDA SMODME+3  MOVE SMODME TO DISP REG.
0296  633A  85 2C             STA XT+5
0297  633C  A5 55             LDA SMODME+2
0298  633E  85 2B             STA XT+4
0299  6340  A9 20             LDA #$20      TURN ON DME ANNUN.
0300  6342  85 2F             STA XT+8
0301  6344  A9 02             LDA #$02      TURN ON DIST DECIMAL
0302  6346  85 28             STA XT+1
0303  6348  A2 2B             LDX #XT+4     ZBLANK DISTANCE
0304  634A  20 A0 6F          JSR ZBLANK
0305  634D  4C 58 63          JMP DLOC2
0306  6350  A9 DD      DLOC1  LDA #$DD      TURN ON RIGHT DASHES
0307  6352  85 2C             STA XT+5
0308  6354  85 2B             STA XT+4
0309  6356  85 28             STA XT+1
0310  6358  A9 DD      DLOC2  LDA #$DD      TURN ON LEFT DASHES
0311  635A  85 2A             STA XT+3
0312  635C  85 29             STA XT+2
0313  635E  A9 D0             LDA #$D0
0314  6360  05 28             ORA XT+1
0315  6362  85 28             STA XT+1
0316  6364  4C 80 62          JMP DSPRTN
0317  6367
0318  6367             .FILE DSPVD
0319  6367
0320  6367
0321  6367                    ; ***** VOR/DME & KTS/MIN DISPLAY ROUTINE *****
0322  6367
0323  6367                    ;     21 JUNE 80
0324  6367
0325  6367                    ; *** PRESENT POSITION DISPLAY ROUTINE *****
0326  6367
0327  6367  4A         DSPVD  LSR A         TEST FOR KTS/MIN ALSO PRESSED
0328  6368  90 25             BCC DVD2      BRANCH IF NO KTS/MIN
0329  636A  A5 4B             LDA DME+2     MOVE RAW DME TO DSP REG
0330  636C  85 2C             STA XT+5
0331  636E  A5 4A             LDA DME+1
0332  6370  85 2B             STA XT+4
0333  6372  A2 47             LDX #NAV1
0334  6374  A9 C0             LDA #$C0      TEST FOR RNAV-R/M
0335  6376  25 68             AND FLAGS
0336  6378  C9 40             CMP #$40
0337  637A  D0 02             BNE DVD1      BRANCH IF NOT R/M
0338  637C  A2 4B             LDX #NAV2
0339  637E  A9 3F      DVD1   LDA #$3F      MOVE RAW NAV (NAV1 OR NAV2)
0340  6380  35 01             AND 1,X        TO DSP REG
0341  6382  85 29             STA XT+2
0342  6384  B5 02             LDA 2,X
0343  6386  85 2A             STA XT+3
0344  6388  A9 22             LDA #$22      TURN ON BOTH DECIMALS
0345  638A  85 28             STA XT+1
0346  638C  4C 2C 64          JMP DVOR3
0347  638F  A5 56      DVD2   LDA SMODME+3  MOVE SMOVOR & SMODME TO
0348  6391  85 2C             STA XT+5       DISPLAY REGISTERS
```

```
0349  6393  A5 55            LDA SMODME+2
0350  6395  85 2B            STA XT+4
0351  6397  A5 52            LDA SMOVOR+3
0352  6399  85 2A            STA XT+3
0353  639B  A5 51            LDA SMOVOR+2
0354  639D  85 29            STA XT+2
0355  639F  A9 0F            LDA #$0F
0356  63A1  05 2A            ORA XT+3          BLANK LSD OF VOR
0357  63A3  85 2A            STA XT+3
0358  63A5  A9 02            LDA #$02          TURN ON DME DECIMAL
0359  63A7  85 28            STA XT+1
0360  63A9  24 68       DVD3 BIT FLAGS         TEST FOR VOR
0361  63AB  30 04            BMI DVD4          BRANCH IF VOR
0362  63AD  A5 74            LDA ACTWP         SET WP REG TO ACTWP
0363  63AF  85 2D            STA XT+6
0364  63B1  A9 08       DVD4 LDA #$08          TURN ON RAD ANNUN.
0365  63B3  85 2E            STA XT+7
0366  63B5  4C 0A 64         JMP VORD
0367  63B8
0368  63B8                   ; *** GROUNDSPEED &TTD DISPLAY ROUTINE ***
0369  63B8
0370  63B8  A5 73       DSPKM LDA DIAG         TEST GSP DIAG FLAG & SET DISP=DASHES
0371  63BA  29 04            AND #$04           IF FLAG=1
0372  63BC  F0 0B            BEQ DKM2
0373  63BE  A9 DD            LDA #$DD          LOAD DASHES
0374  63C0  A2 05            LDX #$05
0375  63C2  95 27       DKM1 STA XT,X
0376  63C4  CA               DEX
0377  63C5  D0 FB            BNE DKM1
0378  63C7  F0 18            BEQ DKM5
0379  63C9  A2 04       DKM2 LDX #$04          MOVE GSP & TTD TO DISP REG
0380  63CB  B5 63       DKM3 LDA GSP,X
0381  63CD  95 28            STA XT+1,X
0382  63CF  CA               DEX
0383  63D0  D0 F9            BNE DKM3
0384  63D2  A9 02            LDA #$02          TURN ON TTD DECIMAL
0385  63D4  85 28            STA XT+1
0386  63D6  A2 29            LDX #XT+2         ZBLANK GSP
0387  63D8  20 A0 6F         JSR ZBLANK
0388  63DB  A9 0F            LDA #$0F          BLANK LSD OF GSP
0389  63DD  05 2A            ORA XT+3
0390  63DF  85 2A            STA XT+3
0391  63E1  A9 80       DKM5 LDA #$80          SET ANNUN TO KTS-MIN
0392  63E3  85 2F            STA XT+8
0393  63E5  85 2E            STA XT+7
0394  63E7  24 68            BIT FLAGS         TEST FOR VOR
0395  63E9  30 04            BMI DKM6          BRANCH IF VOR
0396  63EB  A5 74            LDA ACTWP         SET WP REG=ACTWP
0397  63ED  85 2D            STA XT+6
0398  63EF  A2 2B       DKM6 LDX #XT+4         ZBLANK TTD
0399  63F1  20 A0 6F         JSR ZBLANK
0400  63F4  4C 80 62         JMP DSPRTN
0401  63F7
0402  63F7                   .FILE DSPVOR
0404  63F7
0405  63F7                   ;    21 JUNE 80
0406  63F7
0407  63F7                   ; ***** VOR & CRS/XTK DISPLAY ROUTINES *****
0408  63F7
0409  63F7                   NCOMP =$5022
0410  63F7
0411  63F7
0412  63F7                   ; *** VOR DISPLAY ROUTINE ***
0413  63F7
0414  63F7  A2 04       DSPVOR LDX #$04        MOVE BTW & DTW TO DISPLAY REG'S
0415  63F9  B5 5F       DVOR1  LDA BTW,X
0416  63FB  95 28              STA XT+1,X
```

```
0417  63FD  CA                   DEX
0418  63FE  D0 F9                BNE  DVOR1
0419  6400  A9 02                LDA  #$02        TURN ON DIST DECIMAL
0420  6402  85 28                STA  XT+1
0421  6404  A9 0F                LDA  #$0F        BLANK BRG LSD
0422  6406  05 2A                ORA  XT+3
0423  6408  85 2A                STA  XT+3
0424  640A  A9 20      VORD      LDA  #$20        TEST FOR DME DIAG
0425  640C  25 73                AND  DIAG
0426  640E  F0 0C                BEQ  DVOR2       BRANCH IF NO DIAG
0427  6410  A9 0D                LDA  #$0D        TURN ON DIST DASHES
0428  6412  05 28                ORA  XT+1
0429  6414  85 28                STA  XT+1
0430  6416  A9 DD                LDA  #$DD
0431  6418  85 2B                STA  XT+4
0432  641A  85 2C                STA  XT+5
0433  641C  24 73      DVOR2     BIT  DIAG
0434  641E  10 0C                BPL  DVOR3       BRANCH IF NO VOR DIAG
0435  6420  A9 D0                LDA  #$D0
0436  6422  05 28                ORA  XT+1
0437  6424  85 28                STA  XT+1
0438  6426  A9 DD                LDA  #$DD
0439  6428  85 2A                STA  XT+3
0440  642A  85 29                STA  XT+2
0441  642C  A9 20      DVOR3     LDA  #$20        SET ANNUN TO VOR-DME
0442  642E  85 2F                STA  XT+8
0443  6430  05 2E                ORA  XT+7
0444  6432  85 2E                STA  XT+7
0445  6434  A2 2B                LDX  #XT+4       ZBLANK DIST
0446  6436  20 A0 6F             JSR  ZBLANK
0447  6439  4C 80 62             JMP  DSPRTN
0448  643C
0450  643C
0451  643C                       ; ***** CRS/XTK DISPLAY ROUTINE *****
0452  643C
0453  643C  A9 08      DSPCX     LDA  #$08        TEST FOR OBS DIAG
0454  643E  25 73                AND  DIAG
0455  6440  D0 06                BNE  DCX0        BRANCH IF OBS DIAG
0456  6442  24 68                BIT  FLAGS       TEST FOR VOR & R/M
0457  6444  30 17                BMI  DCX         BRANCH IF VOR
0458  6446  50 15                BVC  DCX         BRANCH IF NO R/M
0459  6448  A9 D0      DCX0      LDA  #$D0        TURN ON CRS DASHES
0460  644A  85 28                STA  XT+1
0461  644C  A9 DD                LDA  #$DD        BLANK DISP
0462  644E  85 29                STA  XT+2
0463  6450  85 2A                STA  XT+3
0464  6452  85 2B                STA  XT+4
0465  6454  85 2C                STA  XT+5
0466  6456  A9 04                LDA  #$04        TURN ON CRS ANNUN
0467  6458  85 2E                STA  XT+7
0468  645A  4C 80 62             JMP  DSPRTN
0469  645D  A5 59      DCX       LDA  OBS+2       MOVE OBS TO DISP REG
0470  645F  85 2A                STA  XT+3
0471  6461  A5 58                LDA  OBS+1
0472  6463  85 29                STA  XT+2
0473  6465  A2 20                LDX  #$20        TURN ON CRS DECIMAL
0474  6467  A9 04                LDA  #$04        TEST FOR "TEST"
0475  6469  C5 7A                CMP  PSHBUT
0476  646B  F0 08                BEQ  DCXA        BRANCH IF "TEST"
0477  646D  A9 0F                LDA  #$0F        BLANK LSD
0478  646F  05 2A                ORA  XT+3
0479  6471  85 2A                STA  XT+3
0480  6473  A2 00                LDX  #$00        TURN OFF CRS DECIMAL
0481  6475  86 28      DCXA      STX  XT+1
0482  6477  A9 04                LDA  #$04        TURN ON CRS ANNUN
0483  6479  85 2E                STA  XT+7
0484  647B  A9 BB                LDA  #$BB        BLANK XTK
0485  647D  85 2B                STA  XT+4
```

```
0486  647F  85 2C              STA XT+5
0487  6481  24 68              BIT FLAGS      TEST FOR VOR
0488  6483  10 03              BPL DCX1       BRANCH IF RNAV
0489  6485  4C 80 62           JMP DSPRTN
0490  6488  A5 5B         DCX1 LDA XTK+2      MOVE XTK TO DISP REG
0491  648A  85 2C              STA XT+5
0492  648C  A5 5A              LDA XTK+1
0493  648E  85 2B              STA XT+4
0494  6490  A9 02              LDA #$02       TURN ON XTK DECIMAL
0495  6492  05 2B              ORA XT+1
0496  6494  85 2B              STA XT+1
0497  6496  A9 06              LDA #$06       SET ANNUN TO R-XTK
0498  6498  85 2F              STA XT+8
0499  649A  24 2B              BIT XT+4       TEST XTK < 0.
0500  649C  10 09              BPL DCX2       BRANCH IF XTK >= 0.
0501  649E  A0 02              LDY #$02
0502  64A0  A2 2C              LDX #XT+5      COMP XTK
0503  64A2  20 22 50           JSR NCOMP
0504  64A5  C6 2F              DEC XT+8       CHANGE ANNUN TO L-XTK
0505  64A7  A9 C0         DCX2 LDA #$C0       TEST FLASHER BITS
0506  64A9  25 75              AND PROGWP
0507  64AB  F0 0A              BEQ DCX3       BRANCH IF NO FLASHER BITS
0508  64AD  A9 0F              LDA #$0F       TEST DISPLAY TIMER
0509  64AF  25 1F              AND DSPTIM
0510  64B1  D0 04              BNE DCX3       BRANCH IF DISP TIMER <> 0.
0511  64B3  A9 00              LDA #0         BLANK ANNUN.
0512  64B5  85 2F              STA XT+8
0513  64B7  A5 74         DCX3 LDA ACTWP      SET WP REG=ACTWP
0514  64B9  85 2D              STA XT+6
0515  64BB  A2 2B              LDX #XT+4      ZBLANK XTK
0516  64BD  20 A0 6F           JSR ZBLANK
0517  64C0  4C 80 62           JMP DSPRTN
0518  64C3
0519  64C3                    .FILE DSPRNV
0521  64C3
0522  64C3                    ;         25 JUNE 80
0523  64C3
0524  64C3                    ; ***** RNAV DISPLAY ROUTINE *****
0525  64C3
0526  64C3
0527  64C3  A2 A0         DSPRNV LDX #$A0     TEST FOR R/M AND DIAG'S.
0528  64C5  24 68              BIT FLAGS      TEST FOR R/M
0529  64C7  50 02              BVC DRNV1      BRANCH IF NO R/M
0530  64C9  A2 60              LDX #$60
0531  64CB  A5 74         DRNV1 LDA ACTWP     SET WP REG=ACTWP
0532  64CD  85 2D              STA XT+6
0533  64CF  8A                 TXA            TEST FOR DIAG'S.
0534  64D0  25 73              AND DIAG
0535  64D2  D0 18              BNE DRNV1A     BRANCH IF DIAG'S.
0536  64D4  A9 10              LDA #$10       TEST ACTWP=AUTOWP
0537  64D6  25 74              AND ACTWP
0538  64D8  F0 3F              BEQ DRNV5      BRANCH IF NO AUTOWP
0539  64DA  A9 02              LDA #$02       TEST FOR AUTOWP DIAG
0540  64DC  25 73              AND DIAG
0541  64DE  F0 39              BEQ DRNV5      BRANCH IF NO DIAG
0542  64E0  A9 0F              LDA #$0F       FLASH "DIST" DIAG
0543  64E2  25 1F              AND DSPTIM
0544  64E4  F0 27              BEQ DRNV3
0545  64E6  A9 08              LDA #$08
0546  64E8  85 2F              STA XT+8
0547  64EA  D0 21              BNE DRNV3      UNCOND. BRANCH
0548  64EC  A9 20         DRNV1A LDA #$20     TEST FOR DME DIAG
0549  64EE  25 73              AND DIAG
0550  64F0  F0 0A              BEQ DRNV2      BRANCH IF NO DME DIAG
0551  64F2  A9 0F              LDA #$0F       FLASH DME ANNUN
0552  64F4  25 1F              AND DSPTIM
0553  64F6  F0 04              BEQ DRNV2      BRANCH IF DISP TIMER=0
0554  64F8  A9 20              LDA #$20       TURN ON DME ANNUN
```

```
0555  64FA  85 2F              STA XT+8
0556  64FC  8A          DRNV2  TXA           TEST FOR VOR DIAG
0557  64FD  29 C0              AND #$C0
0558  64FF  25 73              AND DIAG
0559  6501  F0 0A              BEQ DRNV3     BRANCH IF NO VOR DIAG
0560  6503  A9 0F              LDA #$0F      FLASH VOR DIAG
0561  6505  25 1F              AND DSPTIM
0562  6507  F0 04              BEQ DRNV3     BRANCH IF DISP TIMER=0
0563  6509  A9 20              LDA #$20      TURN ON VOR ANNUN
0564  650B  85 2E              STA XT+7
0565  650D  A2 05       DRNV3  LDX #$05      LOAD DASHES
0566  650F  A9 DD              LDA #$DD
0567  6511  95 27       DRNV4  STA XT,X
0568  6513  CA                 DEX
0569  6514  D0 FB              BNE DRNV4
0570  6516  4C 80 62           JMP DSPRTN
0571  6519  A2 04       DRNV5  LDX #$04      MOVE BTW-DTW TO DISP REG
0572  651B  B5 5F       DRNV6  LDA BTW,X
0573  651D  95 28              STA XT+1,X
0574  651F  CA                 DEX
0575  6520  D0 F9              BNE DRNV6
0576  6522  A9 02              LDA #$02      TURN ON DIST DECIMAL
0577  6524  85 28              STA XT+1
0578  6526  A9 0F              LDA #$0F      BLANK BRG LSD
0579  6528  05 2A              ORA XT+3
0580  652A  85 2A              STA XT+3
0581  652C  A2 2B              LDX #XT+4     ZBLANK DIST
0582  652E  20 A0 6F           JSR ZBLANK
0583  6531  A9 40              LDA #$40      SET ANNUN=BRG-RNG
0584  6533  85 2E              STA XT+7
0585  6535  85 2F              STA XT+8
0586  6537  A5 70              LDA MODE      TEST FOR XTK
0587  6539  29 40              AND #$40
0588  653B  F0 15              BEQ DRNV9     BRANCH IF NO XTK
0589  653D  A2 04              LDX #$04
0590  653F  A5 5A              LDA XTK+1     TEST FOR XTK=0
0591  6541  D0 04              BNE DRNV7     BRANCH IF XTK<>0
0592  6543  A5 5B              LDA XTK+2
0593  6545  F0 06              BEQ DRNV8     BRANCH IF XTK=0
0594  6547  E8          DRNV7  INX           SET = L-XTK
0595  6548  24 5A              BIT XTK+1     TEST FOR XTK NEG
0596  654A  30 01              BMI DRNV8     BRANCH IF XTK NEG
0597  654C  E8                 INX           SET = R-XTK
0598  654D  8A          DRNV8  TXA
0599  654E  05 2F              ORA XT+8
0600  6550  85 2F              STA XT+8      ADD XTK INFO TO RT ANNUN
0601  6552  4C 80 62    DRNV9  JMP DSPRTN
0602  6555
0603  6555               .FILE DSPRD
0605  6555
0606  6555               ; ***** RAD/DST DISPLAY ROUTINE *****
0607  6555
0608  6555
0609  6555
0610  6555  A9 22       DSPRD  LDA #$22      TURN ON DECIMALS
0611  6557  85 28              STA XT+1
0612  6559  A9 08              LDA #$08      TURN ON RAD-DST ANNUN
0613  655B  85 2E              STA XT+7
0614  655D  85 2F              STA XT+8
0615  655F  A6 74              LDX ACTWP     SET WP REG=ACTWP
0616  6561  86 2D              STX XT+6
0617  6563  A9 C0              LDA #$C0      TEST FLASHER BITS
0618  6565  25 75              AND PROGWP
0619  6567  F0 16              BEQ DRD1      BRANCH IF FLASHER BITS=0
0620  6569  A9 1F              LDA #$1F      CHANGE TO PROGWP
0621  656B  25 75              AND PROGWP
0622  656D  AA                 TAX
0623  656E  49 FF              EOR #$FF      BLANK ACTWP IF=PROGWP
```

```
0624  6570  25 2D              AND XT+6
0625  6572  85 2D              STA XT+6
0626  6574  A9 0F              LDA #$0F    TEST DISP TIMER=0
0627  6576  25 1F              AND DSPTIM
0628  6578  F0 05              BEQ DRD1    BRANCH IF DISP TIMER=0
0629  657A  8A                 TXA
0630  657B  05 2D              ORA XT+6    OR PROGWP INTO WP REG
0631  657D  85 2D              STA XT+6
0632  657F  8A           DRD1  TXA         COMPUTE WP ADDRESS
0633  6580  20 80 6F           JSR COMPWP
0634  6583  A0 04              LDY #$04    MOVE RAD-DST TO DISP REG
0635  6585  B1 00        DRD4  LDA (IND0),Y
0636  6587  AA                 TAX
0637  6588  96 28              STX XT+1,Y
0638  658A  88                 DEY
0639  658B  D0 F8              BNE DRD4
0640  658D  A9 0F              LDA #$0F
0641  658F  25 1F              AND DSPTIM
0642  6591  D0 0E              BNE DRD6    BRANCH IF DISPTIMER NOT=0.
0643  6593  A2 00              LDX #0      TEST FLASHER BITS
0644  6595  24 75              BIT PROGWP
0645  6597  70 06              BVS DRD5    BRANCH IF RIGHT BIT SET
0646  6599  10 06              BPL DRD6    BRANCH IF LEFT BIT NOT SET
0647  659B  86 2E              STX XT+7    BLANK RADIAL ANNUN.
0648  659D  30 02              BMI DRD6
0649  659F  86 2F        DRD5  STX XT+8    BLANK DISTANCE ANNUN.
0650  65A1  A2 2B        DRD6  LDX #XT+4   ZBLANK DIST
0651  65A3  20 A0 6F           JSR ZBLANK
0652  65A6  4C 80 62           JMP DSPRTN
0653  65A9
0654  65A9                     .FILE DSPFE
0656  65A9
0657  65A9                     ; ***** FRQ/ELV DISPLAY ROUTINE *****
0658  65A9
0659  65A9                     COMPWP =$6F80
0660  65A9                     LSHIFT =$5052
0661  65A9
0662  65A9
0663  65A9  A9 20        DSPFE LDA #$20    TURN ON FREQ DECIMAL
0664  65AB  85 28              STA XT+1
0665  65AD  A9 10              LDA #$10    TURN ON FRQ-ELV ANNUN
0666  65AF  85 2E              STA XT+7
0667  65B1  85 2F              STA XT+8
0668  65B3  A6 74              LDX ACTWP   SET WP REG=ACTWP
0669  65B5  86 2D              STX XT+6
0670  65B7  A9 C0              LDA #$C0    TEST FLASHER BITS
0671  65B9  25 75              AND PROGWP
0672  65BB  F0 16              BEQ DFE1    BRANCH IF BITS=0
0673  65BD  A9 1F              LDA #$1F    CHANGE TO PROGWP
0674  65BF  25 75              AND PROGWP
0675  65C1  AA                 TAX
0676  65C2  49 FF              EOR #$FF
0677  65C4  25 2D              AND XT+6
0678  65C6  85 2D              STA XT+6
0679  65C8  A9 0F              LDA #$0F    TEST DSPTIM=0
0680  65CA  25 1F              AND DSPTIM
0681  65CC  F0 05              BEQ DFE1
0682  65CE  8A                 TXA
0683  65CF  05 2D              ORA XT+6    OR PROGWP TO WP REG
0684  65D1  85 2D              STA XT+6
0685  65D3  86 0A        DFE1  STX TEMP1   COMPUTE WP ADDRESS
0686  65D5  A0 05              LDY #$05
0687  65D7  A9 B3              LDA #$B3
0688  65D9  20 86 6F           JSR COMPWP+6
0689  65DC  A0 03              LDY #$03    MOVE FRQ+ELV TO DISP REG
0690  65DE  B1 00        DFE4  LDA (IND0),Y
0691  65E0  AA                 TAX
0692  65E1  96 29              STX XT+2,Y
```

```
0693  65E3  88              DEY
0694  65E4  D0 F8           BNE DFE4
0695  65E6  A9 01           LDA #$01    SHIFT FRQ ONE DIGIT LEFT
0696  65E8  85 07           STA NSHFT
0697  65EA  A9 03           LDA #$03
0698  65EC  85 06           STA NBYT
0699  65EE  A9 28           LDA #XT+1
0700  65F0  20 52 50        JSR LSHIFT
0701  65F3  A9 10           LDA #$10    SET FRQ MSD=1.
0702  65F5  05 29           ORA XT+2
0703  65F7  85 29           STA XT+2
0704  65F9  A5 2B           LDA XT+4    BLANK FREQ LSD IF=0.
0705  65FB  D0 02           BNE DFE4A
0706  65FD  09 B0           ORA #$B0
0707  65FF  09 0B     DFE4A ORA #$0B
0708  6601  85 2B           STA XT+4
0709  6603  A9 B0           LDA #$B0
0710  6605  05 2C           ORA XT+5
0711  6607  85 2C           STA XT+5
0712  6609  A9 0F           LDA #$0F    TEST DISP TIMER
0713  660B  25 1F           AND DSPTIM
0714  660D  D0 0F           BNE DFE6
0715  660F  A2 00           LDX #0
0716  6611  24 75           BIT PROGWP  TEST FLASHER BITS
0717  6613  30 07           BMI DFE5    BRANCH IF LEFT BIT SET
0718  6615  50 07           BVC DFE6    BRANCH IF RT BIT NOT SET
0719  6617  86 2F           STX XT+8    BLANK ELV ANNUN
0720  6619  4C 80 62        JMP DSPRTN
0721  661C  86 2E     DFE5  STX XT+7    BLANK FRQ ANNUN
0722  661E  4C 80 62  DFE6  JMP DSPRTN
0723  6621
0724  6621                  .FILE DSPAWP
0726  6621
0727  6621                  ; ***** AUTOWP DISPLAY ROUTINE *****
0728  6621
0729  6621  A9 02     DSPAWP LDA #$02   TURN ON DME DECIMAL
0730  6623  85 28           STA XT+1
0731  6625  A9 08           LDA #$08    TURN ON RAD-DST ANNUN
0732  6627  85 2E           STA XT+7
0733  6629  85 2F           STA XT+8
0734  662B  A9 10           LDA #$10    SET WP REG=ACTWP & AWP
0735  662D  05 74           ORA ACTWP
0736  662F  85 2D           STA XT+6
0737  6631  A2 04           LDX #$04    MOVE AWPRAD & AWPDST TO
0738  6633  B5 CF     DAWP1 LDA AWPRAD,X   DISP REG
0739  6635  95 28           STA XT+1,X
0740  6637  CA              DEX
0741  6638  D0 F9           BNE DAWP1
0742  663A  A9 A2           LDA #$A2    TEST FOR DIST VALID
0743  663C  25 73           AND DIAG      & NAV1 OR DME DIAG
0744  663E  F0 0A           BEQ DAWP2
0745  6640  A9 DD           LDA #$DD    DASH DIST IF NOT VALID
0746  6642  85 2C           STA XT+5
0747  6644  85 2B           STA XT+4
0748  6646  A9 0D           LDA #$0D
0749  6648  85 28           STA XT+1
0750  664A  A9 0F     DAWP2 LDA #$0F    FLASH AWP BUTTON
0751  664C  25 1F           AND DSPTIM
0752  664E  D0 06           BNE DAWP3
0753  6650  A9 EF           LDA #$EF    TURN AWP LITE OFF
0754  6652  25 2D           AND XT+6
0755  6654  85 2D           STA XT+6
0756  6656  A2 2B     DAWP3 LDX #XT+4   ZBLANK DIST
0757  6658  20 A0 6F        JSR ZBLANK
0758  665B  A9 0F           LDA #$0F    BLANK LSD OF RADIAL
0759  665D  05 2A           ORA XT+3
0760  665F  85 2A           STA XT+3
```

```
0761  6661  4C 80 62          JMP DSPRTN
0762  6664
0763  6664                    .END RAMREG

ERRORS = 0000 <0000>
END OF ASSEMBLY
0395  61F0
0396  61F0              ;          20 JUNE 80
0397  61F0
0398  61F0              ; ***** GENERAL INTERRUPT ROUTINE *****
0399  61F0
0400  61F0                    VIA    =$3800
0401  61F0                    SWTINT =$67E0
0402  61F0                    PULSPA =$6F60
0403  61F0
0404  61F0                    *=$6680
0405  6680
0406  6680  48          GENINT PHA         SAVE REGISTERS
0407  6681  8A                 TXA
0408  6682  48                 PHA
0409  6683  98                 TYA
0410  6684  48                 PHA
0411  6685  AD 0E 38    GINT   LDA VIA+14  READ IFR
0412  6688  2D 0D 38           AND VIA+13
0413  668B  4A                 LSR A       TEST FOR SWITCH INTERRUPT
0414  668C  90 06              BCC GI1
0415  668E  20 E0 67           JSR SWTINT  GO TO SWITCH INTERRUPT ROUTINE
0416  6691  4C 85 66           JMP GINT
0417  6694  4A          GI1    LSR A       TEST FOR DME INTERRUPT
0418  6695  90 03              BCC GI2
0419  6697  4C A7 66           JMP DMEINT  GO TO DME SERD ROUTINE
0420  669A  C9 30       GI2    CMP #$30    TEST FOR TIMER INTERRUPT
0421  669C  D0 03              BNE GI3
0422  669E  4C DE 66           JMP TIMINT
0423  66A1  68          GI3    PLA         RESTORE REGISTERS
0424  66A2  A8                 TAY
0425  66A3  68                 PLA
0426  66A4  AA                 TAX
0427  66A5  68                 PLA
0428  66A6  40                 RTI
0429  66A7
0430  66A7
0431  66A7              ; **** DME INTERRUPT ROUTINE ****
0432  66A7
0433  66A7                    DMEDIA =$001C
0434  66A7                    DME    =$0049
0435  66A7                    DMECTR =$3000
0436  66A7
0437  66A7  A9 08       DMEINT LDA #$08    RESET SCAN COUNTER (PA3)
0438  66A9  20 60 6F           JSR PULSPA
0439  66AC  A2 01              LDX #$01    READ COUNTER LOOP
0440  66AE  A9 10       DI1    LDA #$10    CLOCK SCAN COUNTER
0441  66B0  20 60 6F           JSR PULSPA
0442  66B3  AD 00 30           LDA DMECTR
0443  66B6  0A                 ASL A
0444  66B7  0A                 ASL A
0445  66B8  0A                 ASL A
0446  66B9  0A                 ASL A
0447  66BA  95 49              STA DME,X
0448  66BC  A9 10              LDA #$10    CLOCK SCAN COUNTER (PA4)
0449  66BE  20 60 6F           JSR PULSPA
0450  66C1  AD 00 30           LDA DMECTR
0451  66C4  29 0F              AND #$0F
0452  66C6  15 49              ORA DME,X
0453  66C8  95 49              STA DME,X
0454  66CA  E8                 INX
0455  66CB  E0 03              CPX #$03
```

```
0456  66CD  D0 DF              BNE DI1
0457  66CF  A9 02              LDA #$02      CLEAR INTERRUPT FLAG
0458  66D1  8D 0D 38            STA VIA+13
0459  66D4  20 60 6F            JSR PULSPA    RESET DME COUNTER (PA1)
0460  66D7  A9 0C              LDA #$0C      RESET DME DIAG. COUNTER
0461  66D9  85 1C              STA DMEDIA
0462  66DB  4C 85 66            JMP GINT      RETURN TO GENERAL INTERRUPT
0463  66DE
0464  66DE              ; **** TIMER INTERRUPT ROUTINE
0465  66DE
0466  66DE         TIME    =$001A
0467  66DE         SWTIME  =$001B
0468  66DE         NAV1    =$0047
0469  66DE         NAV2    =$004B
0470  66DE         OBS     =$0057
0471  66DE         MODE    =$0070
0472  66DE         FUNCTN  =$0071
0473  66DE         ROUFLG  =$0072
0474  66DE         DIAG    =$0073
0475  66DE         GSTIM   =$00A3
0476  66DE         NAVCTR  =$2800
0477  66DE
0478  66DE  38     TIMINT  SEC
0479  66DF  A9 00          LDA #$0
0480  66E1  65 A5          ADC GSTIM+2
0481  66E3  85 A5          STA GSTIM+2
0482  66E5  A9 00          LDA #$0
0483  66E7  65 A4          ADC GSTIM+1
0484  66E9  85 A4          STA GSTIM+1
0485  66EB  E6 1A          INC TIME
0486  66ED  A5 1A          LDA TIME
0487  66EF  4A             LSR A
0488  66F0  B0 03          BCS TI
0489  66F2  4C BC 67        JMP TIMRTN
0490  66F5  24 4C    TI     BIT NAV2+1    TEST FOR RIU
0491  66F7  30 06          BMI TI1       BRANCH IF RIU NOT INSTALLED
0492  66F9  A9 08          LDA #$08      TEST FOR DME HOLD
0493  66FB  25 70          AND MODE
0494  66FD  D0 06          BNE TI2       BRANCH IF DME IS IN HOLD
0495  66FF  C6 1C    TI1    DEC DMEDIA    DECREMENT DME DIAG COUNTER
0496  6701  D0 0A          BNE TI3       BRANCH IF <> 0
0497  6703  E6 1C          INC DMEDIA
0498  6705  A9 01    TI2    LDA #$01      SET DME DIAG FLAG
0499  6707  05 73          ORA DIAG
0500  6709  85 73          STA DIAG
0501  670B  D0 06          BNE TI3A      UNCOND. BRANCH
0502  670D  A9 FE    TI3    LDA #$FE      RESET DME DIAG FLAG
0503  670F  25 73          AND DIAG
0504  6711  85 73          STA DIAG
0505  6713  A9 02    TI3A   LDA #$02      TEST TIME FOR ODD OR EVEN
0506  6715  25 1A          AND TIME
0507  6717  D0 44          BNE ODD       BRANCH IF ODD
0508  6719  A9 08    EVEN   LDA #$08      READ & STORE NAV1
0509  671B  20 60 6F        JSR PULSPA    RESET SCAN COUNTER
0510  671E  A2 01          LDX #$01      READ COUNTER LOOP
0511  6720  A9 10    TI7    LDA #$10
0512  6722  20 60 6F        JSR PULSPA    CLOCK SCAN COUNTER
0513  6725  AD 00 28        LDA NAVCTR    READ COUNTER
0514  6728  0A             ASL A
0515  6729  0A             ASL A
0516  672A  0A             ASL A
0517  672B  0A             ASL A
0518  672C  95 47          STA NAV1,X
0519  672E  A9 10          LDA #$10
0520  6730  20 60 6F        JSR PULSPA    CLOCK SCAN COUNTER
0521  6733  AD 00 28        LDA NAVCTR
0522  6736  29 0F          AND #$0F
```

```
0523  6738  15 47              ORA NAV1,X
0524  673A  95 47              STA NAV1,X
0525  673C  E8                 INX
0526  673D  E0 03               CPX #$03
0527  673F  D0 DF               BNE TI7
0528  6741  A9 01               LDA #$01         SET VOR/OBS LINE TO OBS (PA0)=1
0529  6743  0D 0F 38            ORA VIA+15
0530  6746  8D 0F 38            STA VIA+15
0531  6749  A9 04               LDA #$04         RESET COUNTER MASTER RESET
0532  674B  20 60 6F            JSR PULSPA
0533  674E  A9 14               LDA #$14         SET VOR NAV1 SMOOTH FLAG
0534  6750  05 72               ORA ROUFLG          & DME SMOOTH FLAG IN ROUFLG
0535  6752  85 72               STA ROUFLG
0536  6754  A5 1B               LDA SWTIME       TEST & DECREMENT SWITCH TIMER
0537  6756  F0 02               BEQ TI8             IF NOT =0.
0538  6758  C6 1B               DEC SWTIME
0539  675A  4C BC 67    TI8     JMP TIMRTN
0540  675D
0541  675D  A9 08       ODO     LDA #$08         READ & STORE OBS
0542  675F  20 60 6F            JSR PULSPA       RESET SCAN COUNTER
0543  6762  A2 01               LDX #$01
0544  6764  A9 10       TI9     LDA #$10
0545  6766  20 60 6F            JSR PULSPA
0546  6769  AD 00 28            LDA NAVCTR
0547  676C  0A                  ASL A
0548  676D  0A                  ASL A
0549  676E  0A                  ASL A
0550  676F  0A                  ASL A
0551  6770  95 57               STA OBS,X
0552  6772  A9 10               LDA #$10
0553  6774  20 60 6F            JSR PULSPA
0554  6777  AD 00 28            LDA NAVCTR
0555  677A  29 0F               AND #$0F
0556  677C  15 57               ORA OBS,X
0557  677E  95 57               STA OBS,X
0558  6780  E8                  INX
0559  6781  E0 03               CPX #$03
0560  6783  D0 DF               BNE TI9
0561  6785  A9 08               LDA #$08         RESET SCAN COUNTER
0562  6787  20 60 6F            JSR PULSPA
0563  678A  AD 00 28            LDA NAVCTR       READ 5TH DIGIT
0564  678D  29 0F               AND #$0F
0565  678F  D0 06               BNE TI10         BRANCH IF DIGIT>0
0566  6791  A9 36               LDA #$36         TEST MSD OVERRANGE
0567  6793  C5 58               CMP OBS+1
0568  6795  B0 06               BCS TI11         BRANCH IF MSD <= 360
0569  6797  A9 08       TI10    LDA #$08         SET OBS DIAG FLAG
0570  6799  05 73               ORA DIAG
0571  679B  D0 04               BNE TI12         UNCOND BRANCH
0572  679D  A9 F7       TI11    LDA #$F7         RESET OBS DIAG FLAG
0573  679F  25 73               AND DIAG
0574  67A1  85 73       TI12    STA DIAG
0575  67A3  A9 FE               LDA #$FE         SET VOR/OBS TO VOR (PA0)=0
0576  67A5  2D 0F 38            AND VIA+15
0577  67A8  8D 0F 38            STA VIA+15
0578  67AB  A9 04               LDA #$04         RESET COUNTER MASTER RESET
0579  67AD  20 60 6F            JSR PULSPA
0580  67B0  A9 02               LDA #$02         SET STEERING FLAG IN ROUFLG
0581  67B2  24 71               BIT FUNCTN          & ALSO AUTOWP IF NEC.
0582  67B4  50 02               BVC TI13         BRANCH IF NO AUTOWP
0583  67B6  A9 03               LDA #$03
0584  67B8  05 72       TI13    ORA ROUFLG
0585  67BA  85 72               STA ROUFLG
0586  67BC  A9 40       TIMRTN  LDA #$40         RESET TIMER INTERRUPT FLAG
0587  67BE  8D 0D 38            STA VIA+13          IN INTERRUPT REG
0588  67C1  4C 85 66            JMP GINT
0589  67C4               .FILE SWTINT
```

```
0591  67C4
0592  67C4                    ;          10 AUG 80
0593  67C4
0594  67C4                    ; ***** MAIN SWITCH INTERRUPT ROUTINE *****
0595  67C4
0596  67C4            IND0   =$0000
0597  67C4            SWTIME =$001B
0598  67C4            XTK    =$0059
0599  67C4            WPRAD  =$005B
0600  67C4            FLAGS  =$0068
0601  67C4            DATALO =$006D
0602  67C4            DATAHI =$006E
0603  67C4            DATA   =$006F
0604  67C4            FUNCTN =$0071
0605  67C4            DIAG   =$0073
0606  67C4            ACTWP  =$0074
0607  67C4            PROGWP =$0075
0608  67C4            SITEMP =$0079
0609  67C4            AWPRAD =$00CF
0610  67C4            VIA    =$3800
0611  67C4            SRIN   =$6F00
0612  67C4            COMPWP =$6F80
0613  67C4
0614  67C4                    *=$67E0
0615  67E0
0616  67E0  A9 7F     SWTINT  LDA #$7F    TURN ON SWITCH REGISTERS
0617  67E2  2D 00 38          AND VIA
0618  67E5  8D 00 38          STA VIA
0619  67E8  20 00 6F          JSR SRIN    READ WP SWITCH REGISTER
0620  67EB  49 FF             EOR #$FF
0621  67ED  4A                LSR A
0622  67EE  4A                LSR A
0623  67EF  4A                LSR A
0624  67F0  F0 52             BEQ SIDATA  BRANCH IF NO WP'S DEPRESSED
0625  67F2  AA                TAX
0626  67F3  A5 71             LDA FUNCTN  GO TO END IF FUNCTN IS NOT
0627  67F5  29 38             AND #$38      RNAV, RAD/DST, OR FRQ/ELV.
0628  67F7  F0 19             BEQ SI4
0629  67F9  C9 08             CMP #$08    BRANCH TO "CHANGE ACTWP" IF
0630  67FB  F0 13             BEQ SI3     FUNCTN=RNAV
0631  67FD  A5 75             LDA PROGWP
0632  67FF  29 C0             AND #$C0    TEST FLASHER BITS
0633  6801  D0 02             BNE SI2
0634  6803  A9 40             LDA #$40    SET FLASHER=RIGHT SIDE
0635  6805  49 C0     SI2     EOR #$C0    TOGGLE FLASHER BITS
0636  6807  85 75             STA PROGWP
0637  6809  8A                TXA
0638  680A  05 75             ORA PROGWP  SET PROG WP
0639  680C  85 75             STA PROGWP
0640  680E  D0 02             BNE SI4     UNCOND BRANCH
0641  6810  86 74     SI3     STX ACTWP
0642  6812  4C 32 68  SI4     JMP SIEND
0643  6815
0644  6815
0645  6815            ; ***** SWITCH INTERRUPT SUBROUTINES *****
0646  6815
0647  6815  A9 00     SICOMP  LDA #0      COMPLIMENT DATA
0648  6817  F8                SED
0649  6818  E5 6D             SBC DATALO
0650  681A  85 6D             STA DATALO
0651  681C  A9 00             LDA #0
0652  681E  E5 6E             SBC DATAHI
0653  6820  85 6E             STA DATAHI
0654  6822  60                RTS
0655  6823
0656  6823  18        SIADD   CLC         ADD DATA
0657  6824  F8                SED
```

```
0658  6825  A5 6D                 LDA DATALO
0659  6827  75 01                 ADC 1,X
0660  6829  95 01                 STA 1,X
0661  682B  A5 6E                 LDA DATAHI
0662  682D  75 00                 ADC 0,X
0663  682F  95 00                 STA 0,X
0664  6831  60                    RTS
0665  6832
0666  6832  A9 80       SIEND     LDA #$80         TURN OFF SWITCH REGISTERS
0667  6834  0D 00 38              ORA VIA
0668  6837  8D 00 38              STA VIA
0669  683A  A9 03                 LDA #$03         RESET SWITCH TIMER
0670  683C  85 1B                 STA SWTIME
0671  683E  A9 01                 LDA #$01         RESET SWITCH INTERRUPT
0672  6840  8D 0D 38              STA VIA+13
0673  6843  60                    RTS
0674  6844
0675  6844
0676  6844
0677  6844
0678  6844              ; **** DATA SWITCH UPDATE ROUTINE ****
0679  6844
0680  6844  20 00 6F    SIDATA    JSR SRIN         READ FUNCTION SWITCHES
0681  6847  A9 00                 LDA #0
0682  6849  85 6D                 STA DATALO
0683  684B  20 00 6F              JSR SRIN         READ DATA SWITCHES
0684  684E  49 FF                 EOR #$FF
0685  6850  A8                    TAY
0686  6851  29 0F                 AND #$0F         MASK MSD SWITCH
0687  6853  85 6E                 STA DATAHI       STORE NEW MSD IN DATAHI
0688  6855  A5 6F                 LDA DATA
0689  6857  29 0F                 AND #$0F
0690  6859  AA                    TAX              STORE OLD MSD IN X-REG
0691  685A  98                    TYA
0692  685B  45 6F                 EOR DATA         TEST NEW DATA FOR CHANGE
0693  685D  F0 42                 BEQ SID5         IF NO CHANGE, GO TO END
0694  685F  C9 08                 CMP #$08
0695  6861  90 13                 BCC SID1         BRANCH IF MSD HAS CHANGED
0696  6863  A5 6F                 LDA DATA
0697  6865  4A                    LSR A            SHIFT OLD LSD OVER & STORE
0698  6866  4A                    LSR A              IN X-REG
0699  6867  4A                    LSR A
0700  6868  4A                    LSR A
0701  6869  AA                    TAX
0702  686A  84 6E                 STY DATAHI
0703  686C  46 6E                 LSR DATAHI
0704  686E  46 6E                 LSR DATAHI       SHIFT NEW LSD OVER IN DATAHI
0705  6870  46 6E                 LSR DATAHI
0706  6872  46 6E                 LSR DATAHI
0707  6874  E6 6D                 INC DATALO       SET DATALO=1
0708  6876  8A          SID1      TXA              DETERMINE DIRECTION OF ROTATION
0709  6877  05 6E                 ORA DATAHI
0710  6879  C9 04                 CMP #$04
0711  687B  D0 06                 BNE SID2         IF <> 4, COMPARE NORMALLY
0712  687D  8A                    TXA
0713  687E  F0 05                 BEQ SID3         IF=0, C=1 & DIR.=CCW
0714  6880  18                    CLC
0715  6881  90 02                 BCC SID3         UNCOND. BRANCH
0716  6883  E4 6E       SID2      CPX DATAHI       CW,C=0; CCW,C=1.
0717  6885  84 6F       SID3      STY DATA         STORE NEW DATA
0718  6887  08                    PHP              SAVE CARRY STATUS
0719  6888  A9 00                 LDA #0
0720  688A  85 6E                 STA DATAHI
0721  688C  A5 6D                 LDA DATALO       BIT 0,DATALO; 1=LSD CHANGE
0722  688E  D0 02                 BNE SID4                      0=MSD CHANGE
0723  6890  E6 6E                 INC DATAHI       SET DATAHI TO INCREMENT
0724  6892  A5 71       SID4      LDA FUNCTN
0725  6894  C9 04                 CMP #$04
0726  6896  F0 0C                 BEQ SIXTK        BRANCH IF FUNCTION=XTK
```

```
0727  6898  C9 40              CMP  #$40
0728  689A  F0 50              BEQ  SIAWP       BRANCH IF FUNCTION=AUTOWP
0729  689C  C9 10              CMP  #$10
0730  689E  B0 75              BCS  SIWP        BRNCH IF FUNCTION=R/D OR F/E
0731  68A0  28                 PLP
0732  68A1  4C 32 68    SID5   JMP  SIEND       IF FUNCTION=VOR OR RNAV
0733  68A4
0734  68A4              ; **** XTK UPDATE ROUTINE ****
0735  68A4
0736  68A4  24 68       SIXTK  BIT  FLAGS       TEST FOR RNAV MODE
0737  68A6  10 04              BPL  SIXTK0      BRANCH IF RNAV MODE
0738  68A8  28                 PLP
0739  68A9  4C 32 68           JMP  SIEND
0740  68AC  A9 40       SIXTK0 LDA  #$40        SET RIGHT FLASHER BIT
0741  68AE  05 75              ORA  PROGWP
0742  68B0  85 75              STA  PROGWP
0743  68B2  A5 6E              LDA  DATAHI      CHANGE TENS INCREMENT TO
0744  68B4  0A                 ASL  A              UNITS INCREMENT
0745  68B5  0A                 ASL  A
0746  68B6  0A                 ASL  A
0747  68B7  0A                 ASL  A
0748  68B8  05 6D              ORA  DATALO
0749  68BA  85 6D              STA  DATALO
0750  68BC  A9 00              LDA  #0
0751  68BE  85 6E              STA  DATAHI
0752  68C0  28                 PLP              RECOVER CARRY
0753  68C1  90 03              BCC  SIXTK1      IF DATA = CW
0754  68C3  20 15 68           JSR  SICOMP
0755  68C6  A2 5A       SIXTK1 LDX  #XTK+1
0756  68C8  20 23 68           JSR  SIADD       UPDATE XTK
0757  68CB  24 5A              BIT  XTK+1
0758  68CD  30 0E              BMI  SIXTK2      IF RESULT IS NEG
0759  68CF  C9 02              CMP  #02         TEST FOR > 20 NM.
0760  68D1  90 16              BCC  SIXTK3      IF NOT OVER
0761  68D3  A9 00              LDA  #0
0762  68D5  85 5B              STA  XTK+2
0763  68D7  A9 02              LDA  #$02
0764  68D9  85 5A              STA  XTK+1       RESET XTK TO 20.0.
0765  68DB  D0 0C              BNE  SIXTK3      UNCOND BRANCH
0766  68DD  C9 98       SIXTK2 CMP  #$98        TEST FOR <= -20 NM.
0767  68DF  B0 08              BCS  SIXTK3      IF >= 98
0768  68E1  A9 00              LDA  #0
0769  68E3  85 5B              STA  XTK+2
0770  68E5  A9 98              LDA  #$98
0771  68E7  85 5A              STA  XTK+1
0772  68E9  4C 32 68    SIXTK3 JMP  SIEND
0773  68EC
0774  68EC              ; **** AUTO WAYPOINT UPDATE ROUTINE ****
0775  68EC
0776  68EC  A9 00       SIAWP  LDA  #0          SET AWP LSB=0
0777  68EE  85 D1              STA  AWPRAD+2
0778  68F0  A5 6E              LDA  DATAHI
0779  68F2  F0 04              BEQ  SIAWP1      IF DATAHI=0
0780  68F4  A9 09              LDA  #$09        CHANGE MSD INC. TO 90.
0781  68F6  85 6E              STA  DATAHI
0782  68F8  28          SIAWP1 PLP              RECOVER CARRY.
0783  68F9  B0 0D              BCS  SIAWP3      IF CCW.
0784  68FB  65 D0              ADC  AWPRAD+1    INC. AWPRAD BY 90'.
0785  68FD  C9 36              CMP  #$36        TEST FOR >360
0786  68FF  90 02              BCC  SIAWP2      IF <360
0787  6901  A9 00              LDA  #0
0788  6903  85 D0       SIAWP2 STA  AWPRAD+1
0789  6905  4C 32 68           JMP  SIEND
0790  6908  A5 D0       SIAWP3 LDA  AWPRAD+1    SUBTRACT 90' FROM AWPRAD
0791  690A  E5 6E              SBC  DATAHI
0792  690C  B0 02              BCS  SIAWP4
0793  690E  A9 27              LDA  #$27
```

```
0794  6910  85 D0        SIAWP4  STA AWPRAD+1
0795  6912  4C 32 68             JMP SIEND
0796  6915
0797  6915
0798  6915                       ; ***** WAYPOINT DATA UPDATE ROUTINE *****
0799  6915
0800  6915  A9 C0        SIWP    LDA #$C0        TEST FOR FLASHER BITS
0801  6917  25 75                AND PROGWP
0802  6919  F0 13                BEQ SIWP2       IF NO FLASHER BITS
0803  691B  A5 75                LDA PROGWP      COMPUTE WP ADDRESS
0804  691D  85 79                STA SITEMP
0805  691F  A0 05                LDY #$05
0806  6921  A9 B0                LDA #$B0
0807  6923  46 79        SIWP1   LSR SITEMP
0808  6925  B0 0B                BCS SIWP3
0809  6927  D8                   CLD
0810  6928  69 08                ADC #$08
0811  692A  F8                   SED
0812  692B  88                   DEY
0813  692C  D0 F5                BNE SIWP1
0814  692E  28           SIWP2   PLP             RESTORE STACK
0815  692F  4C 32 68             JMP SIEND
0816  6932  AA           SIWP3   TAX             SAVE WP ADDRESS IN XREG
0817  6933  A5 71                LDA FUNCTN      TEST FOR RAD/DST OR FRQ/ELV
0818  6935  C9 10                CMP #$10
0819  6937  D0 4F                BNE SIFQEL      BRANCH TO FRQ/ELV ROUTINE
0820  6939  8A                   TXA             TEST FOR PROGWP=AUTOWP
0821  693A  C9 D0                CMP #AWPRAD+1
0822  693C  D0 06                BNE SIWP3A      BRANCH IF NOT AUTOWP
0823  693E  A9 FD                LDA #$FD        RESET AWP DIAG FLAG
0824  6940  25 73                AND DIAG
0825  6942  85 73                STA DIAG
0826  6944  28           SIWP3A  PLP
0827  6945  90 03                BCC SIWP4       BRANCH IF DIR.=CW
0828  6947  20 15 68             JSR SICOMP
0829  694A  24 75        SIWP4   BIT PROGWP
0830  694C  10 1C                BPL SIDST       BRANCH IF RT. FLASHER SET
0831  694E  20 23 68     SIRAD   JSR SIADD       INCREMENT RADIAL
0832  6951  B5 00                LDA 0,X
0833  6953  30 0A                BMI SIRAD1      BRANCH IF RESULT NEG
0834  6955  C9 36                CMP #$36
0835  6957  90 0A                BCC SIRAD2      BRANCH IF NOT OVERANGE
0836  6959  A9 00                LDA #0          IF =360.0,CHANGE TO 0.0
0837  695B  95 00                STA 0,X
0838  695D  F0 08                BEQ SIRAD3      UNCOND BRANCH
0839  695F  A9 35        SIRAD1  LDA #$35        IF NEG CHANGE TO 359.9
0840  6961  95 00                STA 0,X
0841  6963  C6 1B        SIRAD2  DEC SWTIME
0842  6965  10 E7                BPL SIRAD       REPEAT IF SWTIME >=0
0843  6967  4C 32 68     SIRAD3  JMP SIEND
0844  696A  E8           SIDST   INX             SET XREG=WP(X)DST
0845  696B  E8                   INX
0846  696C  20 23 68     SIDST1  JSR SIADD
0847  696F  B5 00                LDA 0,X
0848  6971  30 0A                BMI SIDST2      BRANCH IF RESULT NEG
0849  6973  C9 30                CMP #$30
0850  6975  90 0A                BCC SIDST3      BRANCH IF NOT OVERANGE
0851  6977  A9 00                LDA #0          IF OVERANGE,SET=0
0852  6979  95 00                STA 0,X
0853  697B  F0 08                BEQ SIDST4      UNCOND BRANCH
0854  697D  A9 29        SIDST2  LDA #$29        IF NEG ,SET=MAX RNG
0855  697F  95 00                STA 0,X
0856  6981  C6 1B        SIDST3  DEC SWTIME
0857  6983  10 E7                BPL SIDST1      REPEAT IF SWTIME>=0
0858  6985  4C 32 68     SIDST4  JMP SIEND
0859  6988
0860  6988
0861  6988  E8           SIFQEL  INX             SET XREG=WP(X)FRQ
```

```
0862  6989  E8              INX
0863  698A  E8              INX
0864  698B  E8              INX
0865  698C  24 75           BIT PROGWP
0866  698E  10 3C           BPL SIELV       BRANCH IF FLASHER BITS=ELEV.
0867  6990  A5 6D    SIFRQ  LDA DATALO      SET DATALO=5 IF NEC
0868  6992  F0 02           BEQ SIFRQ1      BRANCH IF DATALO=0
0869  6994  A9 05           LDA #$05
0870  6996  85 6D    SIFRQ1 STA DATALO
0871  6998  28              PLP
0872  6999  90 03           BCC SIFRQ2      BRANCH IF DIR=CW
0873  699B  20 15 68        JSR SICOMP
0874  699E  20 23 68 SIFRQ2 JSR SIADD
0875  69A1  C9 18           CMP #$18        TEST FOR OVERANGE
0876  69A3  90 06           BCC SIFRQ3      BRANCH IF NOT OVERANGE
0877  69A5  A9 08           LDA #$08        IF OVERANGE, SET=108.0
0878  69A7  95 00           STA 0,X
0879  69A9  D0 1A           BNE SIFRQ5      UNCOND BRANCH
0880  69AB  A9 07    SIFRQ3 LDA #$07        TEST FOR UNDERANGE
0881  69AD  D5 00           CMP 0,X
0882  69AF  90 04           BCC SIFRQ4      BRANCH IF NOT UNDERANGE
0883  69B1  A9 17           LDA #$17        IF UNDERANGE, SET=117.95
0884  69B3  95 00           STA 0,X
0885  69B5  B5 01    SIFRQ4 LDA 1,X         TEST LSD=0 OR 5?
0886  69B7  29 0F           AND #$0F
0887  69B9  F0 0A           BEQ SIFRQ5      BRANCH IF LSD=0
0888  69BB  C9 05           CMP #$05
0889  69BD  F0 06           BEQ SIFRQ5      BRANCH IF LSD=5
0890  69BF  A9 F0           LDA #$F0        SET LSD=0.
0891  69C1  35 01           AND 1,X
0892  69C3  95 01           STA 1,X
0893  69C5  C6 1B    SIFRQ5 DEC SWTIME
0894  69C7  10 D5           BPL SIFRQ2      REPEAT IF SWTIME >=0
0895  69C9  4C 32 68        JMP SIEND
0896  69CC
0897  69CC  E8       SIELV  INX             SET XREG=WP(X)ELV
0898  69CD  E8              INX
0899  69CE  28              PLP
0900  69CF  90 06           BCC SIELV1      BRANCH IF DIR=CW.
0901  69D1                ;                 COMPLIMENT DATAHI
0902  69D1  A9 00           LDA #0
0903  69D3  E5 6E           SBC DATAHI
0904  69D5  85 6E           STA DATAHI
0905  69D7  18       SIELV1 CLC
0906  69D8  A5 6E           LDA DATAHI      CHANGE ELEVATION
0907  69DA  75 00           ADC 0,X
0908  69DC  29 0F           AND #$0F
0909  69DE  95 00           STA 0,X
0910  69E0  4C 32 68        JMP SIEND
0911  69E3
0912  69E3                  .FILE FLGROU
0914  69E3
0915  69E3                                ;               20 JUNE 80
0916  69E3
0917  69E3                ; **** FLAG ROUTINES ****
0918  69E3
0919  69E3                  ROUFLG =$0072
0920  69E3                  AWPDST =$00D1
0921  69E3                  AUTOWP =$5600
0922  69E3                  LRSTR  =$5530
0923  69E3                  STEER  =$6B00
0924  69E3                  DMESMO =$5C00
0925  69E3                  NV1SMO =$5B00
0926  69E3                  NV2SMO =$5BB0
0927  69E3
0928  69E3                  *=$6A00
0929  6A00
0930  6A00  A5 72    FLGROU LDA ROUFLG
```

```
0931  6A02  4A              LSR A       TEST FOR AUTOWP FLAG
0932  6A03  90 09           BCC FR1
0933  6A05  A9 FE           LDA #$FE    RESET AWPFLAG
0934  6A07  25 72           AND ROUFLG
0935  6A09  85 72           STA ROUFLG
0936  6A0B  4C 00 56        JMP AUTOWP
0937  6A0E  4A        FR1   LSR A       TEST FOR STEERING FLAG
0938  6A0F  90 0C           BCC FR2
0939  6A11  A9 FD           LDA #$FD    RESET STEERING FLAG
0940  6A13  25 72           AND ROUFLG
0941  6A15  85 72           STA ROUFLG
0942  6A17  20 30 55        JSR LRSTR
0943  6A1A  4C 00 6B        JMP STEER
0944  6A1D  4A        FR2   LSR A       TEST FOR NV1SMO FLAG
0945  6A1E  90 09           BCC FR3
0946  6A20  A9 FB           LDA #$FB    RESET NV1SMO FLAG
0947  6A22  25 72           AND ROUFLG
0948  6A24  85 72           STA ROUFLG
0949  6A26  4C 00 5B        JMP NV1SMO
0950  6A29  4A        FR3   LSR A       TEST FOR NV2SMO FLAG
0951  6A2A  90 09           BCC FR4
0952  6A2C  A9 F7           LDA #$F7    RESET NV2SMO FLAG
0953  6A2E  25 72           AND ROUFLG
0954  6A30  85 72           STA ROUFLG
0955  6A32  4C B0 5B        JMP NV2SMO
0956  6A35  4A        FR4   LSR A       TEST FOR DMESMO FLAG
0957  6A36  90 09           BCC FR5
0958  6A38  A9 EF           LDA #$EF    RESET DMESMO FLAG
0959  6A3A  25 72           AND ROUFLG
0960  6A3C  85 72           STA ROUFLG
0961  6A3E  4C 00 5C        JMP DMESMO
0962  6A41  60        FR5   RTS
0963  6A42                  .FILE STEER
0965  6A42
0966  6A42            ;          15 JULY 80
0967  6A42
0968  6A42            ; **** STEERING ROUTINE ****
0969  6A42
0970  6A42            FLAGS  =$0068
0971  6A42            NAV2   =$004B
0972  6A42            DIAG   =$0073
0973  6A42            ACTWP  =$0074
0974  6A42            MODE   =$0070
0975  6A42            VIA    =$3800
0976  6A42            SROUT  =$6F30
0977  6A42            LR     =$0069
0978  6A42            SMOVOR =$004F
0979  6A42            WPRAD  =$005B
0980  6A42            FUNCTN =$0071
0981  6A42            PSHBUT =$007A
0982  6A42            RMIANG =$007B
0983  6A42            BTW    =$005F
0984  6A42
0985  6A42                   *=$6B00
0986  6B00
0987  6B00  A9 C3     STEER  LDA #$C3    SET:REF CONT=OFF=0 , LOC=OFF=0
0988  6B02  25 68            AND FLAGS      DIAG FLG=NO DIAG=0,STEER FLG=NO DIAG=
0989  6B04  09 04            ORA #$04
0990  6B06  AA               TAX
0991  6B07  A9 08            LDA #$08    TEST FUNCTION=RNAV
0992  6B09  25 71            AND FUNCTN
0993  6B0B  F0 09            BEQ ST0     BRANCH IF FUNCTN<>RNAV
0994  6B0D  A9 04            LDA #$04    TEST TEST=1
0995  6B0F  25 7A            AND PSHBUT
0996  6B11  F0 03            BEQ ST0     BRANCH IF NO TEST
0997  6B13  4C 6B 6B         JMP ST5
0998  6B16  8A        ST0    TXA
```

```
0999  6B17  24 68            BIT FLAGS       TEST FOR R/M
1000  6B19  50 17            BVC ST2         BRANCH IF NO R/M
1001  6B1B  24 73            BIT DIAG        TEST NAV1 DIAG
1002  6B1D  10 06            BPL ST1         BRANCH IF NO NAV1 DIAG
1003  6B1F  29 F8            AND #$F8        RESET STEER DIAG FLAG & T/F
1004  6B21  A0 80            LDY #$80        CENTER L/R NEEDLE
1005  6B23  84 69            STY LR
1006  6B25  AA         ST1   TAX
1007  6B26  A9 60            LDA #$60        TEST FOR RNAV DIAG
1008  6B28  25 73            AND DIAG
1009  6B2A  F0 3F            BEQ ST5         BRANCH IF NO RNAV DIAG
1010  6B2C  8A               TXA
1011  6B2D  09 08            ORA #$08        SET DIAG FLAG=DIAG (1)
1012  6B2F  AA               TAX
1013  6B30  D0 39            BNE ST5         UNCOND. BRANCH
1014  6B32  AA         ST2   TAX
1015  6B33  24 68            BIT FLAGS       TEST FOR VOR OR RNAV
1016  6B35  30 1E            BMI ST3         BRANCH IF VOR
1017  6B37  A9 10            LDA #$10        TEST FOR ACTWP=AUTOWP
1018  6B39  25 74            AND ACTWP
1019  6B3B  F0 06            BEQ ST2A        BRANCH IF NOT AUTOWP
1020  6B3D  A9 02            LDA #$02        TEST FOR AUTOWP DIAG
1021  6B3F  25 73            AND DIAG
1022  6B41  D0 06            BNE ST2B        BRANCH IF AUTOWP DIAG
1023  6B43  A9 A0      ST2A  LDA #$A0        TEST FOR RNAV DIAG
1024  6B45  25 73            AND DIAG
1025  6B47  F0 22            BEQ ST5         BRANCH IF NO DIAG
1026  6B49  8A         ST2B  TXA
1027  6B4A  29 F8            AND #$F8        SET STEER FLAG=DIAG (0) & RESET T/F
1028  6B4C  09 08            ORA #$08        SET DIAG FLAG =DIAG (1)
1029  6B4E  AA               TAX
1030  6B4F  A9 80            LDA #$80        CENTER L/R NEEDLE
1031  6B51  85 69            STA LR
1032  6B53  D0 16            BNE ST5         UNCOND BRANCH
1033  6B55  24 73      ST3   BIT DIAG        TEST FOR NAV1 DIAG
1034  6B57  10 08            BPL ST4         BRANCH IF NO NAV1 DIAG
1035  6B59  8A               TXA
1036  6B5A  29 F8            AND #$F8        SET STEER=DIAG & RESET T/F
1037  6B5C  AA               TAX
1038  6B5D  A9 80            LDA #$80        CENTER L/R NEEDLE
1039  6B5F  85 69            STA LR
1040  6B61  A9 20      ST4   LDA #$20        TEST FOR DME DIAG
1041  6B63  25 73            AND DIAG
1042  6B65  F0 04            BEQ ST5         BRANCH IF NO DME DIAG
1043  6B67  8A               TXA
1044  6B68  09 08            ORA #$08        SET DIAG FLAG=DIAG
1045  6B6A  AA               TAX
1046  6B6B  A9 20      ST5   LDA #$20        TEST FOR LOC
1047  6B6D  25 70            AND MODE
1048  6B6F  F0 04            BEQ ST6         BRANCH IF NOT LOC
1049  6B71  8A               TXA
1050  6B72  09 10            ORA #$10        SET LOC FLAG
1051  6B74  AA               TAX
1052  6B75  24 73      ST6   BIT DIAG        TEST FOR NAV1 DIAG
1053  6B77  30 04            BMI ST6A        BRANCH IF NAV1 DIAG
1054  6B79  8A               TXA
1055  6B7A  09 20            ORA #$20        TURN REF. CONTROL ON
1056  6B7C  AA               TAX
1057  6B7D  86 68      ST6A  STX FLAGS
1058  6B7F
1059  6B7F  A5 7A            LDA PSHBUT      SET UP RMI ANGLE REG'S.
1060  6B81  4A               LSR A           TEST FOR PRES POS
1061  6B82  90 14            BCC ST7
1062  6B84  A5 52            LDA SMOVOR+3    MOVE PRES POS TO RMI
1063  6B86  85 7D            STA RMIANG+2
1064  6B88  A5 51            LDA SMOVOR+2
1065  6B8A  18               CLC             DERIVE RECIP. OF SMOVOR
```

```
1066  6B8B  69 18              ADC #$18
1067  6B8D  C9 36              CMP #$36
1068  6B8F  90 02              BCC ST7A
1069  6B91  E9 36              SBC #$36
1070  6B93  85 7C        ST7A  STA RMIANG+1
1071  6B95  4C AD 6B           JMP STROUT
1072  6B98  A2 61        ST7   LDX #BTW+2
1073  6B9A  24 68              BIT FLAGS        TEST FOR VOR
1074  6B9C  30 06              BMI ST8
1075  6B9E  29 02              AND #$02         TEST FOR "TEST"
1076  6BA0  F0 02              BEQ ST8          BRANCH IF NOT TEST
1077  6BA2  A2 5D              LDX #WPRAD+2     DEFAULT TO  RNAV
1078  6BA4  B5 00        ST8   LDA 0,X
1079  6BA6  85 7D              STA RMIANG+2
1080  6BA8  CA                 DEX
1081  6BA9  B5 00              LDA 0,X
1082  6BAB  85 7C              STA RMIANG+1
1083  6BAD
1084  6BAD  78           STROUT SEI
1085  6BAE  A5 68              LDA FLAGS        SHIFT OUT FLAGS REG
1086  6BB0  20 30 6F           JSR SROUT
1087  6BB3  A5 69              LDA LR           SHIFT OUT L/R
1088  6BB5  20 30 6F           JSR SROUT
1089  6BB8  A5 7C              LDA RMIANG+1     SHIFT OUT RMI MSB
1090  6BBA  20 30 6F           JSR SROUT
1091  6BBD  A5 7D              LDA RMIANG+2     SHIFT OUT RMI LSB
1092  6BBF  20 30 6F           JSR SROUT
1093  6BC2  A9 04              LDA #$04         STROBE DATA INTO STEERING LATCHES
1094  6BC4  0D 00 38           ORA VIA
1095  6BC7  8D 00 38           STA VIA
1096  6BCA  A9 FB              LDA #$FB
1097  6BCC  2D 00 38           AND VIA
1098  6BCF  8D 00 38           STA VIA
1099  6BD2  58                 CLI
1100  6BD3  60                 RTS
1101  6BD4              .FILE RIURD
1102  6BD4
1103  6BD4
1104  6BD4              ;       18 JUNE 80
1105  6BD4
1106  6BD4              ;;********************************************
1107  6BD4              ;* IF RIU IS CONNECTED BIT 7 OF MSB=0.
1108  6BD4              ;* IF R/M IS ACTIVATED BIT 6 OF MSB=1.
1109  6BD4              ;* IF RIU IS NOT CONNECTED  MSB=$FF
1110  6BD4              ;********************************************
1111  6BD4
1112  6BD4              NBYT   =$0006
1113  6BD4              NAV2   =$004B
1114  6BD4              ACALT  =$004D
1115  6BD4              FLAGS  =$0068
1116  6BD4              ROUFLG =$0072
1117  6BD4
1118  6BD4              COMP   =$5020
1119  6BD4
1120  6BD4              VIA    =$3800
1121  6BD4
1122  6BD4                     *=$6C00
1123  6C00
1124  6C00  A9 32        RIURD LDA #$32         SET CLOCK FREQ=12 KHZ
1125  6C02  8D 08 38           STA VIA+8        (DEV SYS =$32)
1126  6C05  78                 SEI
1127  6C06  A9 F7              LDA #$F7         TURN ON A/N CLOCK & DATA
1128  6C08  2D 00 38           AND VIA
1129  6C0B  8D 00 38           STA VIA
1130  6C0E  A2 30              LDX #$30         DELAY
1131  6C10  CA           RIU0  DEX
1132  6C11  D0 FD              BNE RIU0
1133  6C13  A9 04              LDA #$04         TURN ON S.R. IN ACR
1134  6C15  0D 0B 38           ORA VIA+11
```

```
1135  6C18  8D 0B 38           STA VIA+11
1136  6C1B  8D 0A 38           STA VIA+10    START S.R.
1137  6C1E  20 6C 6C           JSR SRINE
1138  6C21  85 4C              STA NAV2+1
1139  6C23  C9 FF              CMP #$FF
1140  6C25  F0 0F               BEQ RIU1     BRANCH IF RIU NOT INSTALLED
1141  6C27  20 6C 6C           JSR SRINE
1142  6C2A  85 4D              STA NAV2+2
1143  6C2C  20 6C 6C           JSR SRINE
1144  6C2F  85 4E              STA ACALT+1
1145  6C31  20 6C 6C           JSR SRINE
1146  6C34  85 4F              STA ACALT+2
1147  6C36  A9 08       RIU1   LDA #$08      TURN OFF A/N CLOCK & DATA
1148  6C38  0D 00 38           ORA VIA
1149  6C3B  8D 00 38           STA VIA
1150  6C3E  A9 E3              LDA #$E3      TURN OFF S.R. IN ACR
1151  6C40  2D 0B 38           AND VIA+11
1152  6C43  8D 0B 38           STA VIA+11
1153  6C46  58                 CLI
1154  6C47  24 4C              BIT NAV2+1    TEST NAV2 DATA VALID
1155  6C49  10 01              BPL RIU1A     BRANCH IF DATA VALID
1156  6C4B  60                 RTS
1157  6C4C  24 4E       RIU1A  BIT ACALT+1   TEST ACALT NEG
1158  6C4E  10 09              BPL RIU2      BRANCH IF ACALT POS
1159  6C50  A9 02              LDA #$02      COMP ACALT IF NEG
1160  6C52  85 06              STA NBYT
1161  6C54  A2 4F              LDX #ACALT+2
1162  6C56  20 20 50           JSR COMP
1163  6C59  A9 BF       RIU2   LDA #$BF      MOVE R/M FLAG
1164  6C5B  25 68              AND FLAGS     RESET R/M FLAG
1165  6C5D  24 4C              BIT NAV2+1    TEST R/M FLAG
1166  6C5F  50 02              BVC RIU3      BRANCH IF R/M FLAG RESET
1167  6C61  09 40              ORA #$40      SET R/M FLAG
1168  6C63  85 68       RIU3   STA FLAGS
1169  6C65  A9 08              LDA #$08
1170  6C67  05 72              ORA ROUFLG    SET NAV2 SMOOTH FLAG IN ROUFLAG
1171  6C69  85 72              STA ROUFLG
1172  6C6B  60                 RTS
1173  6C6C
1174  6C6C  A9 04       SRINE  LDA #$04      LOOP UNTIL S.R. FLAG
1175  6C6E  2D 0D 38           AND VIA+13
1176  6C71  F0 F9              BEQ SRINE
1177  6C73  AD 0A 38           LDA VIA+10    READ S.R.
1178  6C76  60                 RTS
1179  6C77              .FILE KCAOUT
1181  6C77
1182  6C77              ;      20 JUNE 80
1183  6C77
1184  6C77              DTW    =$0061
1185  6C77              VIA    =$3800
1186  6C77
1187  6C77                     *=$6CA0
1188  6CA0
1189  6CA0  78          KCAOUT SEI           DISABLE INTERRUPTS
1190  6CA1  A9 F7              LDA #$F7      SET A/N CLOCK (PB3) LOW
1191  6CA3  2D 00 38           AND VIA
1192  6CA6  8D 00 38           STA VIA
1193  6CA9  18                 CLC           ADD OFFSET TO DTW
1194  6CAA  A5 63              LDA DTW+2
1195  6CAC  69 02              ADC #$02
1196  6CAE  A8                 TAY           AND STORE IN X & Y
1197  6CAF  A5 62              LDA DTW+1
1198  6CB1  69 00              ADC #$0
1199  6CB3  AA                 TAX
1200  6CB4  18          KCA1   CLC           SUBTRACT .1NM FROM DTW EACH LOOP
1201  6CB5  98                 TYA
1202  6CB6  E9 00              SBC #$0
```

```
1203  6CB8  A8              TAY
1204  6CB9  EA              NOP
1205  6CBA  8A              TXA
1206  6CBB  E9 00           SBC #$0
1207  6CBD  AA              TAX
1208  6CBE  D0 F4           BNE KCA1      BRANCH IF X NOT=0
1209  6CC0  18       KCA2   CLC
1210  6CC1  98              TYA
1211  6CC2  E9 00           SBC #$0
1212  6CC4  A8              TAY
1213  6CC5  F0 06           BEQ KCA3      BRANCH WHEN Y=0
1214  6CC7  8A              TXA
1215  6CC8  E9 00           SBC #$0
1216  6CCA  AA              TAX
1217  6CCB  F0 F3           BEQ KCA2      UNCOND. BRANCH
1218  6CCD  A9 EF    KCA3   LDA #$EF      SET INFO CLOCK (PB4) LOW
1219  6CCF  2D 00 38        AND VIA
1220  6CD2  8D 00 38        STA VIA
1221  6CD5  A2 04           LDX #$04      SET DELAY TIME
1222  6CD7  CA       KCA4   DEX
1223  6CD8  D0 FD           BNE KCA4      DELAY
1224  6CDA  A9 18           LDA #$18      RESET A/N & INFO CLOCKS HIGH
1225  6CDC  0D 00 38        ORA VIA
1226  6CDF  8D 00 38        STA VIA
1227  6CE2  58              CLI           ENABLE INTERRUPTS
1228  6CE3  60              RTS
1229  6CE4             .FILE INFOUT
1231  6CE4
1232  6CE4            ;        13 JUNE 80
1233  6CE4
1234  6CE4            I1     =$002F
1235  6CE4            SIND   =$0033
1236  6CE4            SFLGS  =$0035
1237  6CE4            ACTWP  =$0074
1238  6CE4            VIA    =$3800
1239  6CE4
1240  6CE4                   *=$6D00
1241  6D00
1242  6D00  A0 00     DOUT   LDY #0        FORMAT WAYPOINT INFO
1243  6D02  84 34            STY SIND+1
1244  6D04  A5 74            LDA ACTWP
1245  6D06  85 35            STA SFLGS
1246  6D08  78               SEI
1247  6D09  A9 B7            LDA #$B7      SET WP NO'S. & INDICATE
1248  6D0B  C8       DOUT1   INY           ACTIVE WAYPOINT.
1249  6D0C  AA               TAX
1250  6D0D  98               TYA
1251  6D0E  46 35            LSR SFLGS
1252  6D10  90 02            BCC DOUT2
1253  6D12  09 A0            ORA #$A0
1254  6D14  95 00    DOUT2   STA 0,X
1255  6D16  8A               TXA
1256  6D17  D8               CLD
1257  6D18  18               CLC
1258  6D19  69 08            ADC #$08      INCREMENT XREG TO NEXT WP ADD.
1259  6D1B  F8               SED
1260  6D1C  C0 05            CPY #$05
1261  6D1E  D0 EB            BNE DOUT1
1262  6D20           ;                     SET UP FOR SHIFT OUT
1263  6D20
1264  6D20  A9 32            LDA #$32      SET T2 CLOCK FREQ. = 12 KHZ
1265  6D22  8D 08 38         STA VIA+8
1266  6D25  A9 14            LDA #$14      SET ACR FOR T2 SHIFT OUT
1267  6D27  0D 0B 38         ORA VIA+11
1268  6D2A  8D 0B 38         STA VIA+11
1269  6D2D  A9 EF            LDA #$EF      TURN ON INFO CLOCK (PB4)
1270  6D2F  2D 00 38         AND VIA
```

```
1271  6D32  8D 00 38            STA VIA
1272  6D35                      ;           DO DATA OUTPUT
1273  6D35
1274  6D35  AD 95 6D            LDA TABADD      SET UP TABLE INDIRECT POINTER
1275  6D38  85 30               STA I1+1
1276  6D3A  AD 96 6D            LDA TABADD+1
1277  6D3D  85 31               STA I1+2
1278  6D3F  A0 00        DOUT3  LDY #0
1279  6D41  B1 30               LDA (I1+1),Y    LOAD DATA BASE ADDRESS
1280  6D43  C9 FF               CMP #$FF        TEST FOR END OF TABLE
1281  6D45  F0 24               BEQ DOUT6       BRANCH IF END
1282  6D47  85 33               STA SIND        SET INDIRECT ADDRESS
1283  6D49  E6 30               INC I1+1        ADVANCE TABLE POINTER TO NO. OF BYTES
1284  6D4B  B1 30               LDA (I1+1),Y    SET Y=NO. OF BYTES
1285  6D4D  A8                  TAY
1286  6D4E  B1 33        DOUT4  LDA (SIND),Y    LOAD DATA
1287  6D50  20 87 6D            JSR TRND        DO DATA TURN-AROUND
1288  6D53  C0 27               CPY #$27        TEST FOR FIRST BYTE
1289  6D55  F0 07               BEQ DOUT5A      BRANCH IF FIRST BYTE
1290  6D57  A9 04        DOUT5  LDA #$04        LOOP UNTIL S.R. FLAG
1291  6D59  2D 0D 38            AND VIA+13
1292  6D5C  F0 F9               BEQ DOUT5       BRANCH IF NO FLAG
1293  6D5E  A5 35        DOUT5A LDA SFLGS       LOAD TURNED AROUND DATA
1294  6D60  8D 0A 38            STA VIA+10      START S.R.
1295  6D63  88                  DEY             ADVANCE YREG TO NEXT BYTE
1296  6D64  10 E8               BPL DOUT4       BRANCH IF MORE BYTES
1297  6D66  E6 30               INC I1+1        ADVANCE TABLE POINTER TO NEXT ADDRESS
1298  6D68  4C 3F 6D            JMP DOUT3
1299  6D6B                      ;           END ROUTINE
1300  6D6B
1301  6D6B  A9 04        DOUT6  LDA #$04        LOOP UNTIL LAST S.R. FLAG
1302  6D6D  2D 0D 38            AND VIA+13
1303  6D70  F0 F9               BEQ DOUT6
1304  6D72  8D 0D 38            STA VIA+13      RESET LAST S.R. FLAG
1305  6D75  A9 E3               LDA #$E3        TURN OFF S.R. IN ACR
1306  6D77  2D 0B 38            AND VIA+11
1307  6D7A  8D 0B 38            STA VIA+11
1308  6D7D  A9 10               LDA #$10        TURN OFF INFO CLOCK (PB4)
1309  6D7F  0D 00 38            ORA VIA
1310  6D82  8D 00 38            STA VIA
1311  6D85  58                  CLI
1312  6D86  60                  RTS
1313  6D87
1314  6D87  48           TRND   PHA             TURN DATA AROUND ROUTINE
1315  6D88  A9 08               LDA #$08
1316  6D8A  85 36               STA SFLGS+1     SET UP BIT COUNTER=8
1317  6D8C  68                  PLA
1318  6D8D  6A           TRND1  ROR A
1319  6D8E  26 35               ROL SFLGS
1320  6D90  C6 36               DEC SFLGS+1
1321  6D92  D0 F9               BNE TRND1
1322  6D94  60                  RTS
1323  6D95
1324  6D95  97 6D        TABADD .WORD TABLE
1325  6D97  B0           TABLE  .BYT $B0,$27    W.P. INFO (5-1)
1325  6D98  27
1326  6D99  50                  .BYT $50,$07    SMODME,SMOVOR
1326  6D9A  07
1327  6D9B  58                  .BYT $58,$03    XTK,OBS
1327  6D9C  03
1328  6D9D  64                  .BYT $64,$03    TTG,GSP
1328  6D9E  03
1329  6D9F  68                  .BYT $68,$01    LR,FLAGS
1329  6DA0  01
1330  6DA1  6B                  .BYT $6B,$01    RMICOS,RMISIN
1330  6DA2  01
1331  6DA3  60                  .BYT $60,$03    DTW,BTW
```

```
1331  6DA4  03
1332  6DA5  FF                    .BYT $FF
1333  6DA6
1334  6DA6                  .FILE SUBROU
1335  6DA6
1336  6DA6
1337  6DA6              ;         20 JUNE 80
1338  6DA6
1339  6DA6              IND0   =$0000
1340  6DA6              TEMP1  =$000A
1341  6DA6
1342  6DA6              VIA    =$3800
1343  6DA6
1344  6DA6              ; *** SHIFT REG. INPUT SUBROUTINE ***
1345  6DA6              ;          INTERNAL REGISTERS
1346  6DA6              ;
1347  6DA6                     *=$6F00
1348  6F00
1349  6F00  A9 03       SRIN   LDA #$03       LOAD T2L-L
1350  6F02  8D 08 38           STA VIA+8
1351  6F05  A9 04              LDA #$04       SET ACR FOR S.R. READ
1352  6F07  0D 0B 38           ORA VIA+11      UNDER CONTROL OF T2.
1353  6F0A  8D 0B 38           STA VIA+11
1354  6F0D  AD 0A 38           LDA VIA+10     START SHIFTING
1355  6F10  A9 04       SRIN1  LDA #$04       WAIT FOR S.R. FLAG
1356  6F12  2D 0D 38           AND VIA+13
1357  6F15  F0 F9              BEQ SRIN1
1358  6F17  A9 E3              LDA #$E3       TURN OFF S.R. (ACR)
1359  6F19  2D 0B 38           AND VIA+11
1360  6F1C  8D 0B 38           STA VIA+11
1361  6F1F  AD 0A 38           LDA VIA+10     READ S.R.
1362  6F22  60                 RTS
1363  6F23              ;
1364  6F23
1365  6F23              ;********** SHIFT REGISTER OUTPUT ROUTINE **********
1366  6F23
1367  6F23              ;       ENTER WITH OUTPUT BYTE IN ACC.
1368  6F23              ;
1369  6F23                     *=$6F30
1370  6F30
1371  6F30  48          SROUT  PHA
1372  6F31  A9 03              LDA #$03       SET T2L-L = 3.
1373  6F33  8D 08 38           STA VIA+8
1374  6F36  A9 14              LDA #$14       SET ACR OF VIA FOR T2 SR OUT
1375  6F38  0D 0B 38           ORA VIA+11
1376  6F3B  8D 0B 38           STA VIA+11
1377  6F3E  68                 PLA
1378  6F3F  8D 0A 38           STA VIA+10     WRITE TO SR TO START SHIFTING
1379  6F42  A9 04       SROUT1 LDA #$04       LOOP UNTIL SR FLAG=1.
1380  6F44  2D 0D 38           AND VIA+13
1381  6F47  F0 F9              BEQ SROUT1
1382  6F49  A9 E3              LDA #$E3       TURN OFF SR IN ACR
1383  6F4B  2D 0B 38           AND VIA+11
1384  6F4E  8D 0B 38           STA VIA+11
1385  6F51  60                 RTS
1386  6F52
1387  6F52              ;************* PULSE PORT PA ROUTINE *********
1388  6F52
1389  6F52              ; GENERATES A POSITIVE PULSE ON THE LINE
1390  6F52              ; OF PORT "PA" OF THE 6522 WHICH IS
1391  6F52              ;   IN THE ACCUM ON ENTRY.
1392  6F52
1393  6F52                     *=$6F60
1394  6F60
1395  6F60  48          PULSPA PHA
1396  6F61  0D 0F 38           ORA VIA+15
1397  6F64  8D 0F 38           STA VIA+15
1398  6F67  68                 PLA
1399  6F68  49 FF              EOR #$FF
```

```
1400  6F6A  2D 0F 38           AND VIA+15
1401  6F6D  8D 0F 38           STA VIA+15
1402  6F70  60                 RTS
1403  6F71
1404  6F71              ; **** COMPUTE WP ADDRESS SUBROUTINE ****
1405  6F71
1406  6F71                     *=$6F80
1407  6F80
1408  6F80  85 0A       COMPWP STA TEMP1    ENTER WITH WP INFO IN ACC.
1409  6F82  A0 05              LDY #$05
1410  6F84  A9 AF              LDA #$AF
1411  6F86  46 0A       CWP1   LSR TEMP1
1412  6F88  B0 07              BCS CWP2
1413  6F8A  D8                 CLD
1414  6F8B  69 08              ADC #$08
1415  6F8D  F8                 SED
1416  6F8E  88                 DEY
1417  6F8F  D0 F5              BNE CWP1
1418  6F91  85 00       CWP2   STA IND0
1419  6F93  60                 RTS          RETURNS WITH WP ADDRESS IN IND0.
1420  6F94
1421  6F94              ;************DISPLAY LEADING ZERO BLANKING ********
1422  6F94              ;
1423  6F94              ;      LEADING ZERO BLANKING ROUTINE
1424  6F94              ;      ENTER WITH MSB ADDRESS IN XREG
1425  6F94              ;      ROUTINE TEST & BLANKS TWO BYTES
1426  6F94              ;
1427  6F94                     *=$6FA0
1428  6FA0
1429  6FA0  B5 00       ZBLANK LDA 0,X      TEST FIRST BYTE
1430  6FA2  A8                 TAY
1431  6FA3  29 F0              AND #$F0
1432  6FA5  D0 18              BNE ZB1      BRANCH IF MSD OF MSB NOT=0.
1433  6FA7  98                 TYA
1434  6FA8  09 F0              ORA #$F0     BLANK MSD OF MSB
1435  6FAA  A8                 TAY
1436  6FAB  29 0F              AND #$0F     TEST LSD OF MSB
1437  6FAD  D0 10              BNE ZB1
1438  6FAF  A9 FF              LDA #$FF     BLANK MSB
1439  6FB1  95 00              STA 0,X
1440  6FB3  E8                 INX
1441  6FB4  B5 00              LDA 0,X
1442  6FB6  A8                 TAY
1443  6FB7  29 F0              AND #$F0     TEST MSD OF LSB
1444  6FB9  D0 04              BNE ZB1
1445  6FBB  98                 TYA
1446  6FBC  09 F0              ORA #$F0     BLANK MSD OF LSB
1447  6FBE  A8                 TAY
1448  6FBF  94 00       ZB1    STY 0,X
1449  6FC1  60                 RTS
1450  6FC2
1451  6FC2
1452  6FC2                     *=$6FFC
1453  6FFC
1454  6FFC  00 60              .WOR $6000,$6680
1454  6FFE  80 66
1455  7000
1456  7000                     .END RAMREG

ERRORS = 0000 (0000)
END OF ASSEMBLY
```

What is claimed is:

1. A navigation device for use with a conventional aircraft navigation system and conventional HSI/CDI having OBS in providing navigational information to waypoint locations defined with respect to a given VORTAC station, said device comprising:
   memory means for storing digital data representing waypoints;
   means for reading data from the navigation system and for determining the present position of the aircraft with respect to a VORTAC station;
   means for reading from the OBS, the intended course of the aircraft;
   automatic radial means for automatically determining whether a predetermined radial of the VORTAC station intersects the aircraft's intended course and, if so, for determining the location of such intersection which defines a waypoint; and
   means for automatically entering, into said memory means data representing said waypoint.

2. A device according to claim 1 further including navigation display means providing information for use in navigating to the waypoint.

3. A device according to claim 2 wherein the navigation display means displays the bearing and range of the waypoint.

4. A device according to claim 2 or 3 further including means for selecting any one of four (4) cardinal radials (0°, 90°, 180° or 270°) as said predetermined radial.

5. A device according to claim 4 wherein the navigation display means comprises means for displaying data in polar coordinates representing the bearing and range defining a waypoint.

6. A device according to claim 4 wherein the navigation display means comprises means for diplaying data in polar coordinates representing bearing and range to the waypoint.

7. A device according to claim 1 or 2 further including means for displaying data representing the location of waypoint determined by said automatic radial means.

8. A method for automatically generating aircraft navigational information comprising the steps of:
   establishing an intended aircraft course line;
   receiving a VORTAC radio station;
   first automatically determining whether a predetermined radial of said VORTAC radio station intersects the intended course line;
   second, if the predetermined radial intersects the intended course line, automatically determining the distance from the VORTAC radio station, along the predetermined radial, to the intended course line thus automatically locating the position of the intersection, to automtically define a waypoint at the intersection; and
   automatically displaying information for use in navigating to said waypoint.

9. A method according to claim 8 further including repeating the steps of first and second determining for at least two radials of the VORTAC station; and
   selecting a convenient waypoint from among those so determined, and the performing the displaying step.

10. A method according to claim 8 and 9 further including the steps of:
    storing, in a memory, an automatically determined waypoint; and
    recalling the waypoint so stored for later navigational usage.

11. An RNAV device for use with a conventional navigation receiver and an HSI/CDI having OBS comprising:
    memory means for entering and storing data defining at least two (2) waypoints;
    means for automatically reading data from the navigation system and determining the present position of the aircraft with respect to the VORTAC station;
    means for automatically reading from the OBS, the intended course of the aircraft;
    cardinal radial means for automatically determining whether a predetermined radial of the VORTAC station intersects the aircraft's intended course and, if so, the location of such intersection, the intersection thus automatically defining a cardinal waypoint;
    means for automatically entering, into said memory means, data representating the cardinal waypoint;
    means for selecting either of the at least two waypoints, or the automatically determined cardinal waypoint; and
    means for facilitating navigation to the thus selected waypoint.

12. An RNAV device according to claim 11 further including means for displaying data representing the selected waypoint.

13. An RNAV device according to claim 12 wherein the means for displaying comprises means for displaying polar coordinate data.

14. An RNAV device according to claim 11 further including means for displaying data representing the bearing and range to the selected waypoint.

15. An RNAV device comprising:
    automatic waypoint determining means for automatically providing digital data signals representing the location with respect to a ground-based navigational radio fix of an intersection between the line of an aircraft's intended course and one of four predetermined orthogonal radial bearing lines from said ground-based navigational radio fix; and
    RNAV utilization means for automatically receiving said digital data signals and utilizing them to facilitate aircraft navigation towards said automatically determined location.

16. An RNAV device as in claim 15 further comprising:
    means for automatically determining further digital data signals representing the location with respect to a ground-based navigational radio station of an aircraft present position; and
    said RNAV utilization means also being adapted to automatically receive said further digital data signals and to selectively utilize them subsequently to facilitate aircraft navigation back towards said present position.

17. An RNAV device as in claim 15 or 16 wherein said automatic waypoint determining means includes for automatically providing said digital data signals for each of the four cardinal radials 0°, 90°, 180° and 270°.

18. An RNAV device as in claim 15 or 16 including display means for visually displaying a numerical representation or said digital data signals and of said further digital data signals.

19. An RNAV device as in claim 15 or 16 wherein said automatic waypoint determining means includes means for automatically selecting the radial most nearly orthogonal to the selected path of flight.

20. An RNAV device as in claim 15 or 16 wherein said automatic waypoint determining means includes means for automatically selecting the radial most nearly aligned with the projected path of flight if not more than a predetermined maximum value of range from the aircraft.

21. An RNAV device comprising:
automatic waypoint determining means for automatically providing digital data signals representing the location with respect to a ground-based navigational radio fix of an intersection between the line of an aircraft's intended course and a particular radial bearing line from said ground-based navigational radio fix; and
RNAV utilization means for automatically receiving said digital data signals and utilizing them to facilitate aircraft navigation towards said automatically determined location,
said automatic waypoint determining means including means for determining if said intersection exists and, if not, for providing unique predetermined digital data signals values indicative thereof.

22. An RNAV device comprising:
automatic waypoint determining means for automatically providing digital data signals representing the location with respect to a ground-based navigational radio fix of an intersection between the line of an aircraft's intended course and a particular radial bearing line from said ground-based navigational radio fix;
RNAV utilization means for automatically receiving said digital data signals and utilizing them to facilitate aircraft navigation towards said automatically determined location;
means for automatically determining further digital data signals representing the location with respect to a ground-based navigational radio station of an aircraft present position;
said RNAV utilization means also being adapted to automatically receive said further digital data signals and selectively utilizing them subsequently to facilitate aircraft navigation back towards said present position; and
said automatic waypoint determining means including means for determining if said intersection exists and, if not, for providing unique predetermined digital data signal values indicative thereof.

23. An RNAV device as in claim 21 or 22 wherein said automatic waypoint determining means includes means for determining if said intersection is more than a predetermined distance from the aircraft's present position and, if so, for providing a unique predetermined digital data signal values indicative thereof.

24. An RNAV device comprising:
automatic waypoint determining means for automatically providing digital data signals representing the location with respect to a ground-based navigational radio fix of an intersection between the line of an aircraft's intended course and a particular radial bearing line from said ground-based navigational radio fix; and
RNAV utilization means for automatically receiving said digital data signals and utilizing them to facilitate aircraft navigation towards said automatically determined location,
said automatic waypoint determining means including means for determining if said intersection is more than a predetermined distance from the aircraft's present position and, if so, for providing unique predetermined digital data signal values indicative thereof.

25. An RNAV device comprising:
automatic waypoint determining means for automatically providing digital data signals representing the location with respect to a ground-based navigational radio fix of an intersection between the line of an aircraft's intended course and a particular radial bearing line from said ground-based navigational radio fix;
RNAV utilization means for automatically receiving said digital data signals and utilizing them to facilitate aircraft navigation towards said automatically determined location;
means for automatically determining further digital data signals representing the location with respect to a ground-based navigational radio station of an aircraft present position;
said RNAV utilization means also being adapted to automatically receive said further digital data signals and selectively utilizing them subsequently to facilitate aircraft navigation back towards said present position; and
said automatic waypoint determining means including means for determining if said intersection is more than a predetermined distance from the aircraft's present position and, if so, for providing unique predetermined digital data signal values indicative thereof.

26. RNAV apparatus comprising:
adjustable waypoint defining means for manually defining and storing plural predetermined waypoints;
waypoint selection means for selecting and using one of said stored waypoints as an active RNAV waypoint;
automatic waypoint defining means for automatically defining a further waypoint at the intersection of an aircraft's intended course line and a predetermined radial bearing line from a ground-based radio navigation station; and
automatic waypoint selection means for selecting and using said further waypoint as the active RNAV waypoint.

27. RNAV apparatus as in claim 26 wherein said automatic waypoint defining means includes further means for automatically defining and storing for subsequent selective use said further waypoint as the aircraft's present position with respect to a ground-based radio navigation station.

28. RNAV apparatus as in claim 26 or 27 wherein said adjustable waypoint defining means, said automatic waypoint selection means comprise:
respectively associated manually activated electric switch contacts connected to a firmware controlled microprocessor device which monitors the state of said switch contacts as well as the state of other provided radio navigational signal inputs representing the aircraft's intended relative course line and its present location with respect to said station and, in response thereto, selectively provides electrical output signals representing said waypoints and the deviation of said aircraft from said intended course line;

digital display devices for selectively displaying any one of said waypoints; and a visual indicator device for visually portraying said deviation.

29. RNAV apparatus as in claim 28 wherein said digital display devices selectively display the aircraft's intended course line.

30. An RNAV device for use with a conventional aircraft navigation system and conventional HSI/CDI having OBS in providing navigational information to waypoint locations defined with respect to a navigational radio station, comprising:

memory means for storing digital data representing a waypoint;

RNAV utilization means for receiving data from said navigation receiver indicating the present position of the aircraft and OBS data from said HSI/CDI representing an intended course and utilizing them to facilitate aircraft navigation towards said waypoint, including means for determining (a) bearing and range to said waypoint and (b) ground speed and time-to-waypoint;

digital display means for (a) normally displaying bearing and range to said waypoint and (b) selectively displaying ground speed and time-to-waypoint;

adjustable waypoint defining means for manually defining and storing plural predetermined waypoints;

waypoint selection means for selecting and using one of said stored waypoints as the active RNAV waypoint;

automatic waypoint defining means for automatically defining a further waypoint at the intersection of an aircraft's intended course line and a predetermined radial bearing line from a ground-based radio navigation station; and automatic waypoint selection means for selecting and using said further waypoint as the active RNAV waypoint.

31. A method for navigating an aircraft comprising the steps of:

automatically providing digital data signals representing the location with respect to a ground based navigational radio fix of an intersection between the line of an aircraft intended course and one of four predetermined orthogonal radial bearing lines from said ground based navigational radio fix; and automatically receiving said digital data signals and utilizing them to facilitate aircraft navigation toward the automatically determined location.

32. A method according to claim 31 further including the step of automatically determining further digital data signals representing the location with respect to a ground based navigational radio station of an aircraft's present position;

wherein the step of automatically receiving and utilizing includes the step of automatically receiving the further digital data signals and selectively utilizing them subsequently to facilitate aircraft navigation back toward the present position.

33. A method according to claim 31 or 32 wherein said step of automatically providing includes the step of automatically providing the digital data signals for each of the four caridnal radials, 0°, 90°, 180° and 270°.

34. A method according to claim 31 or 32 further including the step of displaying a numerical representation of the digital data signals and the further digital data signals.

35. A method for navigating an aircraft comprising the steps of:

automatically providing digital data signals representing the location with respect to a ground based navigational radio fix of an intersection between the line of an aircraft intended course and a particular radial bearing line from said ground based navigational radio fix; and automatically receiving said digital data signals and utilizing them to facilitate aircraft navigation toward the automatically determined location, the step of automatically providing including the step of determining whether an intersection exists and if not, providing a unique predetermined digital data signal indicative thereof.

36. A method for navigating an aircraft comprising the steps of:

automatically providing digital data signals representing the location with respect to a ground based navigational radio fix of an intersection between the line of an aircraft intended course and a particular radial bearing line from said ground based navigational radio fix;

automatically receiving said digital data signals and utilizing them to facilitate aircraft navigation toward the automatically determined location;

automatically determining further digital data signals representing the location with respect to a ground based navigational radio station of an aircraft's present position;

wherein the step of automatically receiving and utilizing includes the step of automatically receiving the further digital data signals and selectively utilizing them subsequently to facilitate aircraft navigation back toward the present position, and wherein the step of automatically providing includes the step of determining whether an intersection exists and if not, providing a unique predetermined digital data signal indicative thereof.

37. A method according to claim 35 or 36 wherein said step of automatically providing includes the step of determining whether the intersection is more than a predetermined distance from the aircraft's present position and, if so, providing a unique predetermined digital data signal indicative thereof.

38. A method for navigating an aircraft comprising the steps of:

automatically providing digital data signals representing the location with respect to a ground based navigational radio fix of an intersection between the line of an aircraft intended course and a particular radial bearing line from said ground based navigational radio fix; and automatically receiving said digital data signals and utilizing them to facilitate aircraft navigation toward the automatically determined location, said step of automatically providing including the step of determining whether the intersection is more than a predetermined distance from the aircraft's present position and, if so, providing a unique predetermined digital data signal indicative thereof.

39. A method for navigating an aircraft comprising the steps of:

automatically providing digital data signals representing the location with respect to a ground based navigational radio fix of an intersection between the line of an aircraft intended course and a particular radial bearing line from said ground based navigational radio fix;

automatically receiving said digital data signals and utilizing them to facilitate aircraft navigation toward the automatically determined location;

automatically determining further digital data signals representing the location with respect to a ground based navigational radio station of an aircraft's present position;

wherein the step of automatically receiving and utilizing includes the step of automatically receiving the further digital data signals and selectively utilizing them subsequently to facilitate aircraft navigation back toward the present position, and wherein said step of automatically providing includes the step of determining whether the intersection is more than a predetermined distance from the aircraft's present position and, if so, providing a unique predetermined digital data signal indicative thereof.

40. A method for area navigation comprising the steps of:

manually defining and storing plural predetermined waypoints;

selecting and using one of the stored waypoints as an active RNAV waypoint;

automatically defining a further waypoint at the intersection of an aircraft's intended course line and a predetermined radial bearing line from a ground based radio navigation station; and selecting and using the further waypoint as the active RNAV waypoint.

41. A method according to claim 40 wherein the step of automatically defining includes the step of automatically defining and storing for subsequent selective use the further waypoint as the aircraft's present position with respect to a ground based radio navigation station.

42. A method for area navigation comprising the steps of:

storing digital data representing a waypoint;

receiving data from a navigation system indicating the present position of an aircraft and OBS data from an HSI/CDI representing an intended course and utilizing them to facilitate aircraft navigation towards the waypoint including the steps of determining (a) bearing and range to the waypoint and (b) ground speed and time-to-waypoint;

normally displaying bearing and range to the waypoint;

selectively displaying ground speed and time-to-waypoint;

manually defining and storing plural predetermined waypoints;

automatically defining a further waypoint at the intersection of an aircraft's intended course line in a predetermined radial bearing line from a ground based radio navigtation station; and selecting and using the further waypoint as the active RNAV waypoint.

* * * * *